US012691681B2

(12) United States Patent
Kawakami et al.

(10) Patent No.: US 12,691,681 B2
(45) Date of Patent: Jul. 28, 2026

(54) HEAD UNIT AND LIQUID EJECTING APPARATUS

(71) Applicant: SEIKO EPSON CORPORATION, Tokyo (JP)

(72) Inventors: Masayuki Kawakami, Matsumoto (JP); Kenichi Oe, Matsumoto (JP); Shunsuke Kasai, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 18/413,095

(22) Filed: Jan. 16, 2024

(65) Prior Publication Data

US 2024/0253351 A1 Aug. 1, 2024

(30) Foreign Application Priority Data

Jan. 17, 2023 (JP) ................................ 2023-005296

(51) Int. Cl.
*B41J 2/045* (2006.01)
*B41J 2/14* (2006.01)

(52) U.S. Cl.
CPC ....... *B41J 2/04588* (2013.01); *B41J 2/04563* (2013.01); *B41J 2/04573* (2013.01); *B41J 2/04581* (2013.01); *B41J 2/14274* (2013.01)

(58) Field of Classification Search
None
See application file for complete search history.

(56) References Cited

U.S. PATENT DOCUMENTS

2011/0249050 A1* 10/2011 Ozawa ................. B41J 2/04563 347/10
2015/0266295 A1* 9/2015 Miyazaki ............... B41J 2/1646 347/71
2022/0258472 A1* 8/2022 Hirai ...................... H10N 30/50

FOREIGN PATENT DOCUMENTS

JP 2014-008680 A 1/2014
JP 2015009364 A * 1/2015
JP 2022-124599 A 8/2022

OTHER PUBLICATIONS

Taniyama, MachineTranslationofJP-2015009364-A, 2015 (Year: 2015).*

* cited by examiner

*Primary Examiner* — Scott A Richmond
(74) *Attorney, Agent, or Firm* — Spencer Fane LLP

(57) ABSTRACT

A head unit includes: a print head that ejects the liquid by receiving a logic signal and the drive signal; and a temperature information output circuit that outputs the temperature information signal indicating a temperature of the print head, in which the print head includes: a piezoelectric element driven by receiving the drive signal; a pressure chamber substrate provided with a pressure chamber having a volume that changes due to deformation of the vibration plate; and a temperature detection section configured to detect the head temperature information corresponding to a temperature of the pressure chamber and to output the head temperature information as a head temperature signal, and the temperature information output circuit outputs the temperature information signal based on the head temperature signal acquired during a period when a logic level of the logic signal does not change.

10 Claims, 19 Drawing Sheets

FIG. 13

| [SIH, SIM, SIL] | Sa | | Sb | | | Sc | | |
|---|---|---|---|---|---|---|---|---|
| | tp1 | tp2 | ts1 | ts2 | ts3 | ts1 | ts2 | ts3 |
| LD [ 1 , 1 , 0 ] | H | H | L | L | L | L | L | L |
| MD [ 1 , 0 , 0 ] | H | L | L | L | L | L | L | L |
| SD [ 0 , 1 , 0 ] | L | H | L | L | L | L | L | L |
| ND [ 0 , 0 , 0 ] | L | L | L | L | L | L | L | L |
| CD [ 1 , 1 , 1 ] | L | L | H | L | H | L | H | L |

FIG. 18

| | | |
|---|---|---|
| Ap=1 | tnv < Tth1 | RS = 2 [EJECTION ABNORMALITY (AIR BUBBLES)] |
| | Tth1 ≤ tnv ≤ Tth2 | RS = 1 [NORMAL] |
| | Tth2 < tnv ≤ Tth3 | RS = 3 [EJECTION ABNORMALITY (FOREIGN MATTER)] |
| | Tth3 < tnv | RS = 4 [EJECTION ABNORMALITY (THICKENING)] |
| Ap=0 | – | RS = 5 [EJECTION ABNORMALITY] |

HEAD UNIT AND LIQUID EJECTING APPARATUS

The present application is based on, and claims priority from JP Application Serial Number 2023-005296, filed Jan. 17, 2023, the disclosure of which is hereby incorporated by reference herein in its entirety.

BACKGROUND

1. Technical Field

The present disclosure relates to a head unit and a liquid ejecting apparatus.

2. Related Art

A liquid ejecting apparatus having a configuration including a print head having a piezoelectric element, a pressure chamber, and a nozzle communicating with the pressure chamber, is known. The print head ejects a liquid supplied to the pressure chamber from the nozzle by changing a volume of the pressure chamber by driving the piezoelectric element. A technology of the liquid ejecting apparatus including such a print head, which implements ejection control suitable for a temperature of an ink by driving the piezoelectric element based on the temperature of the ink stored in the print head, is known.

For example, JP-A-2022-124599 discloses a technology in which a temperature detection section that detects a temperature of a pressure chamber in which ink is stored is provided in a print head having a piezoelectric element, the pressure chamber, and a nozzle so that a temperature difference between the temperature detected by the temperature detection section and the temperature in the pressure chamber can be reduced and accuracy of detecting the temperature of the ink stored in the pressure chamber is enhanced.

However, in the configuration in which the temperature detection section is provided in the print head, such as the liquid ejecting apparatus disclosed in JP-A-2022-124599, the technology disclosed in JP-A-2022-124599 is insufficient in terms of improving acquisition accuracy of the temperature of the print head and there is room for improvement.

SUMMARY

An aspect of a head unit according to the present disclosure is a head unit that ejects a liquid by receiving a drive signal corrected based on a temperature information signal, the head unit including: a print head that ejects the liquid by receiving a logic signal and the drive signal; and a temperature information output circuit that outputs the temperature information signal indicating a temperature of the print head, in which the print head includes: a piezoelectric element including a first electrode, a second electrode, and a piezoelectric body, having the piezoelectric body that is located between the first electrode and the second electrode in a stacking direction in which the first electrode, the second electrode, and the piezoelectric body are stacked, and driven by receiving the drive signal; a vibration plate located on one side of the piezoelectric element in the stacking direction and deformed due to drive of the piezoelectric element; a pressure chamber substrate located on one side of the vibration plate in the stacking direction and provided with a pressure chamber having a volume that changes due to deformation of the vibration plate; a nozzle for ejecting the liquid according to change in the volume of the pressure chamber; and a temperature detection section located on another side of the vibration plate in the stacking direction to detect head temperature information corresponding to a temperature of the pressure chamber and output the head temperature information as a head temperature signal, the logic signal is a signal for controlling ejection of the liquid from the print head, and the temperature information output circuit outputs the temperature information signal based on the head temperature signal acquired during a period when a logic level of the logic signal does not change.

According to an aspect of the present disclosure, there is provided a liquid ejecting apparatus including: a drive signal output circuit that outputs a drive signal corrected based on a temperature information signal; and a head unit that ejects a liquid by receiving the drive signal, in which the head unit includes: a print head that ejects the liquid by receiving a logic signal and the drive signal; and a temperature information output circuit that outputs the temperature information signal indicating a temperature of the print head, the print head includes: a piezoelectric element including a first electrode, a second electrode, and a piezoelectric body, having the piezoelectric body that is located between the first electrode and the second electrode in a stacking direction in which the first electrode, the second electrode, and the piezoelectric body are stacked, and driven by receiving the drive signal; a vibration plate located on one side of the piezoelectric element in the stacking direction and deformed due to drive of the piezoelectric element; a pressure chamber substrate located on one side of the vibration plate in the stacking direction and provided with a pressure chamber having a volume that changes due to deformation of the vibration plate; a nozzle for ejecting the liquid according to change in the volume of the pressure chamber; and a temperature detection section located on another side of the vibration plate in the stacking direction to detect head temperature information corresponding to a temperature of the pressure chamber and output the head temperature information as a head temperature signal, the logic signal is a signal for controlling ejection of the liquid from the print head, and the temperature information output circuit outputs the temperature information signal based on the head temperature signal acquired during a period when a logic level of the logic signal does not change.

BRIEF DESCRIPTION OF THE DRAWINGS

FIG. 13 is a diagram illustrating table contents in a decoder.

FIG. 18 is a diagram illustrating an example of a determination logic of an ejection state of ink from a nozzle by a determination section.

DESCRIPTION OF EMBODIMENTS

Figure 1:
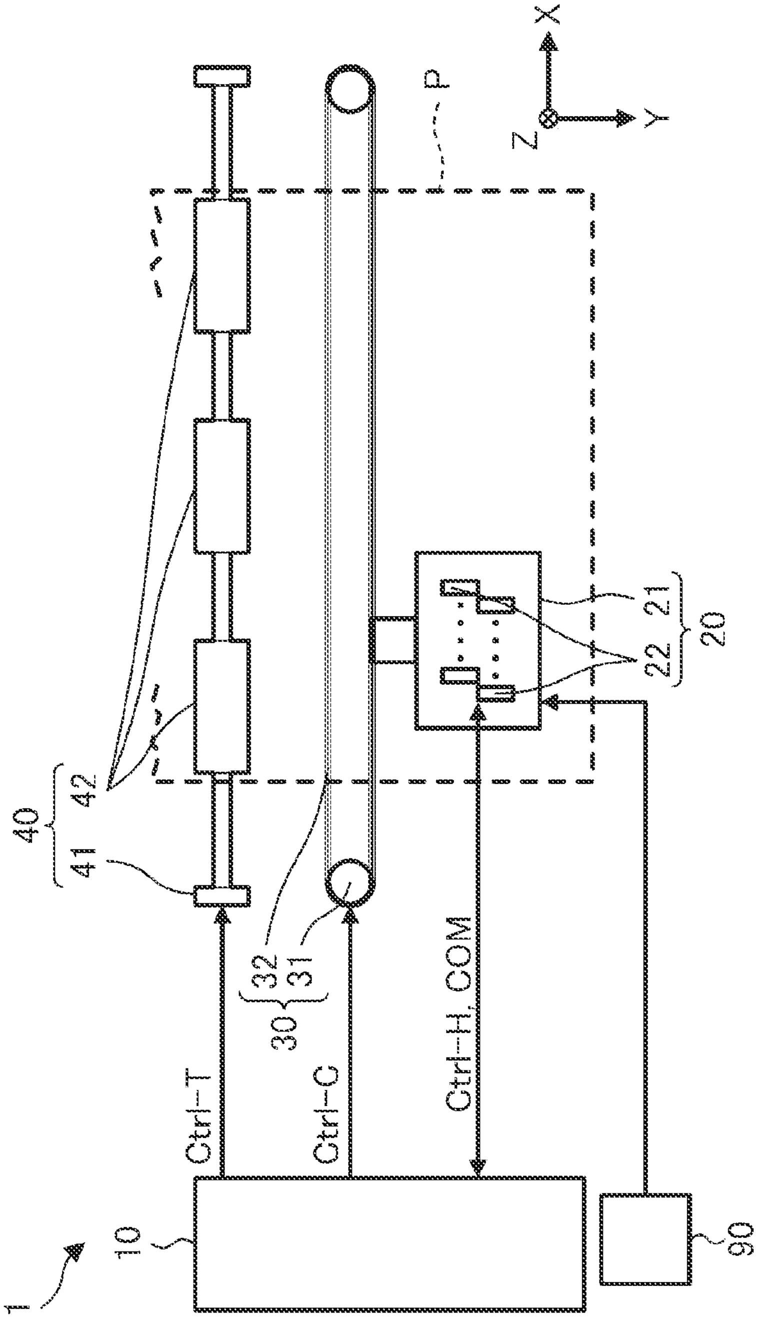
FIG. 1 is a diagram illustrating a schematic configuration of a liquid ejecting apparatus.

Hereinafter, preferable embodiments of the present disclosure will be described with reference to the drawings. The drawing to be used is for convenience of description. In addition, the embodiments which will be described below do not inappropriately limit the contents of the present disclosure described in the claims. Not all of the configurations which will be described below are necessarily essential components of the present disclosure.

1. Structure of Liquid Ejecting Apparatus Structure of Liquid Ejecting Apparatus FIG. 1 is a diagram illustrating a schematic configuration of a liquid ejecting apparatus 1. The liquid ejecting apparatus 1 according to the present embodiment is a serial printing-type ink jet printer in which a carriage 21 on which a print head 22 ejecting ink as an example of a liquid is mounted reciprocates along a scanning axis and ejects the ink to a medium P that is transported in a transport direction to form a desired image on the medium P. In addition, as the medium P used in the liquid ejecting apparatus 1, any printing target such as a printing paper, a resin film, or a cloth may be used. The liquid ejecting apparatus 1 is not limited to the serial printing-type ink jet printer, and may be a line printing-type ink jet printer. In addition, the liquid ejecting apparatus 1 is not limited to an ink jet printer, and may be a coloring material ejecting apparatus used for manufacturing a color filter such as a liquid crystal display, an electrode material ejecting apparatus used for forming an electrode such as an organic EL display and a field emission display (FED), a bioorganic substance ejecting apparatus used for manufacturing a biochip, a stereolithography apparatus, a textile printing apparatus, and the like.

In the following description, an X axis, a Y axis, and a Z axis, which are three spatial axes orthogonal to each other, will be used for description. In the following description, when respective directions along the X axis, the Y axis, and the Z axis are specified, the tip side of an arrow indicating the direction along the X axis illustrated in the drawings is referred to as a +X side, and the starting point side thereof is referred to as a −X side, the tip side of an arrow indicating the direction along the Y axis illustrated in the drawings is referred to as a +Y side, and the starting point side thereof is referred to as a −Y side, and the tip side of an arrow indicating the direction along the Z axis illustrated in the drawings is referred to as a +Z side, and the starting point side thereof may be referred to as a −Z side.

As illustrated in FIG. 1, the liquid ejecting apparatus 1 includes a control unit 10, a head unit 20, a moving unit 30, a transport unit 40, and an ink container 90.

A plurality of types of ink to be ejected to the medium P are stored in the ink container 90. As the ink container 90 in which such ink is stored, an ink cartridge, a bag-shaped ink pack made of a flexible film, an ink tank capable of replenishing ink, and the like may be used.

The control unit 10 includes a processing circuit such as a central processing unit (CPU) or a field programmable gate array (FPGA), and a storage circuit such as a semiconductor memory, and controls each element of the liquid ejecting apparatus 1 including the head unit 20.

The head unit 20 includes a carriage 21 and a plurality of print heads 22. The carriage 21 is fixed to an endless belt 32 of the moving unit 30 to be described later. The plurality of print heads 22 are mounted on the carriage 21. In addition, a control signal Ctrl-H and a drive signal COM, which are output by the control unit 10, are input to each of the plurality of print heads 22. Furthermore, the ink stored in the ink container 90 is supplied to each of the plurality of print heads 22 via a tube (not illustrated) or the like. The print head 22 ejects the ink supplied from the ink container 90 based on the input control signal Ctrl-H and drive signal COM. In this case, the direction from the −Z side to the +Z side along the Z axis, which is the direction along the Z axis, in which the print head 22 ejects the ink, may be referred to as an ejection direction.

The moving unit 30 includes a carriage motor 31 and the endless belt 32. The carriage motor 31 is operated based on a control signal Ctrl-C input from the control unit 10. The endless belt 32 extends along the X axis and rotates according to an operation of the carriage motor 31. As a result, the carriage 21 fixed to the endless belt 32 reciprocates along the X axis. That is, the moving unit 30 reciprocates the plurality of print heads 22 mounted on the carriage 21 along the X axis. In the following description, the direction along the X axis, in which the plurality of print heads 22 mounted on the carriage 21 move, may be referred to as a scanning direction.

The transport unit 40 includes a transport motor 41 and transport rollers 42. The transport motor 41 operates based on a control signal Ctrl-T input from the control unit 10. The transport rollers 42 rotate according to an operation of the transport motor 41 in a state where the medium P is pinched therebetween. As a result, the medium P pinched between the transport rollers 42 is transported from the −Y side toward the +Y side along the Y axis. That is, the transport unit 40 transports the medium P from the −Y side toward the +Y side along the Y axis. In the following description, the direction from the −Y side toward the +Y side, in which the medium P is transported, may be referred to as a transport direction.

In the liquid ejecting apparatus 1 configured as described above, the moving unit 30 controls the reciprocation of the carriage 21 along the scanning direction, and the transport unit 40 controls the transport of the medium P in the direction along the transport direction. The print head 22 mounted on the carriage 21 ejects the ink in conjunction with the reciprocation of the carriage 21 along the scanning direction and the transport of the medium P in the transport direction. Accordingly, the ink ejected by the print head 22 lands on any surface of the medium P. As a result, a desired image is formed at the medium P.

Structure of Head Unit

Figure 2:
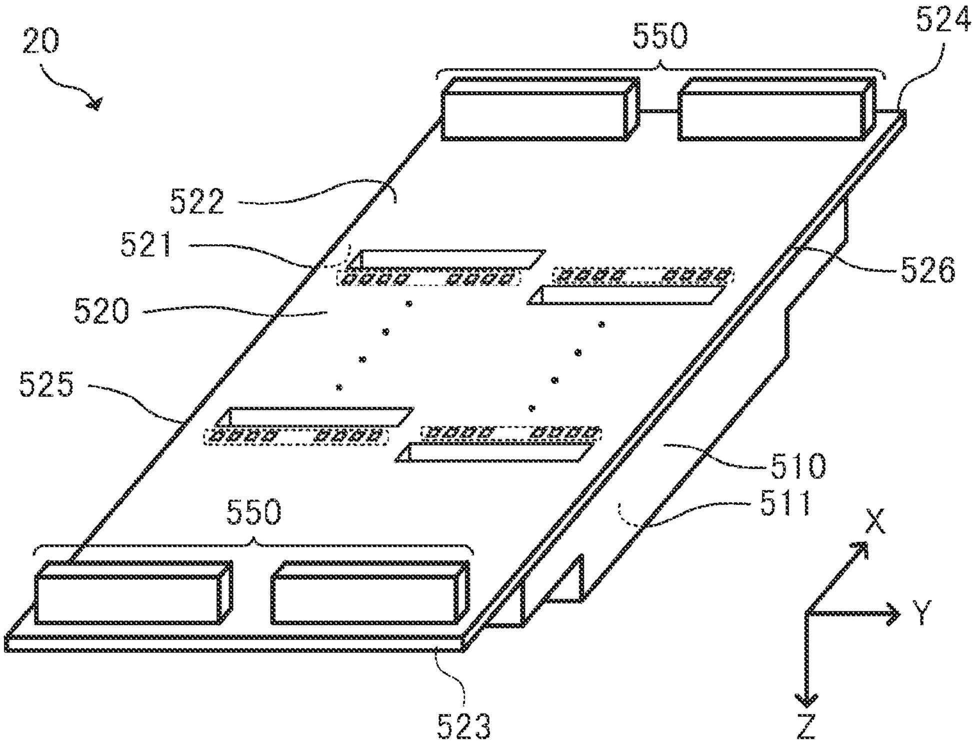
FIG. 2 is a diagram illustrating a structure of a head unit.

Next, a structure of the head unit 20 will be described. FIG. 2 is a diagram illustrating a structure of the head unit 20. As illustrated in FIG. 2, the head unit 20 includes a head 510 and a head substrate 520.

The head substrate 520 has a surface 521 and a surface 522 different from the surface 521. A plurality of connectors 550 are provided on the surface 522 of the head substrate 520. In addition, the head 510 is provided on a side of the surface 521 of the head substrate 520. The head 510 is provided with the plurality of print heads 22. In addition, an ink ejection surface 511 on which the ink is ejected is located on a surface on a lower side of the head 510 in the Z direction. In the present embodiment, the description in which the head 510 is provided with 12 print heads 22 will be made. In this case, when 12 print heads 22 are described separately, the 12 print heads 22 may be referred to as print heads 22-1 to 22-12.

Figure 3:
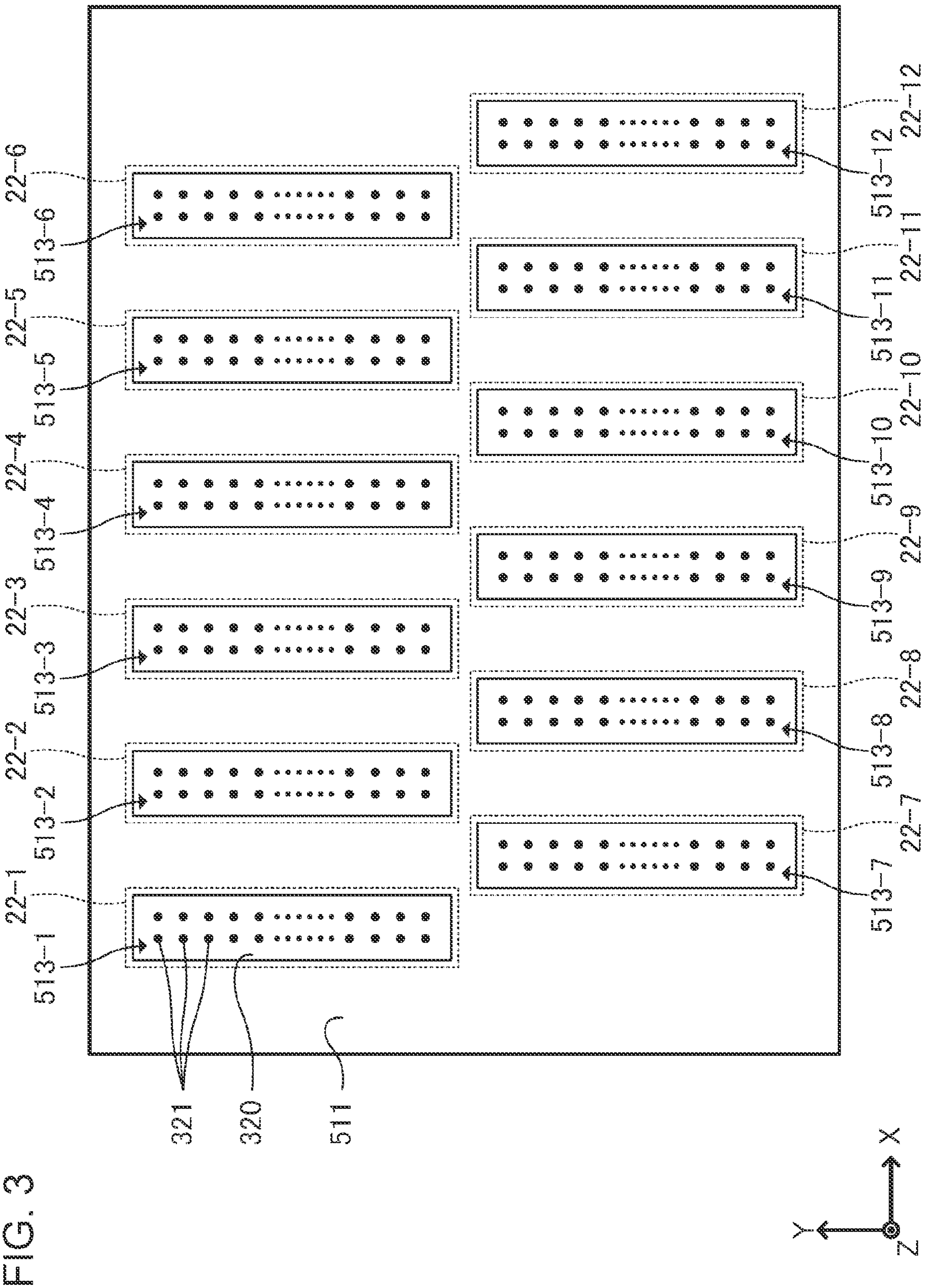
FIG. 3 is a diagram illustrating a configuration of an ink ejection surface of a head.

FIG. 3 is a diagram illustrating a configuration of the ink ejection surface 511 of the head 510. As illustrated in FIG. 3, openings 513-1 to 513-12 are formed in the ink ejection surface 511. The openings 513-1 to 513-6 are arranged in the order of the openings 513-1, 513-2, 513-3, 513-4, 513-5, and 513-6 from the −X side to the +X side along the X axis. The openings 513-7 to 513-12 are located on the −Y side of the openings 513-1 to 513-6 arranged along the X axis, and are arranged in the order of the openings 513-7, 513-8, 513-9, 513-10, 513-11, and 513-12 from the −X side to the +X side along the X axis.

At least a part of the print heads 22-1 to 22-12 of the head unit 20 are exposed from the openings 513-1 to 513-12, respectively. Specifically, a nozzle plate 320, which is at least a part of the print head 22-1 and on which a plurality of nozzles 321 of the print head 22-1 are formed, to be described later is exposed from the opening 513-1. In this case, in the print head 22-1, two nozzle rows, which are formed at the nozzle plate 320 by the plurality of nozzles 321, are located so as to be arranged in parallel along the Y axis. Similarly, the nozzle plate 320, which is at least a part of the print heads 22-2 to 22-12 and on which the plurality of nozzles 321 of each of the print heads 22-2 to 22-12 are formed, to be described later is exposed from each of the openings 513-2 to 513-12. In this case, in each of the print heads 22-2 to 22-12, two nozzle rows, which are formed at the nozzle plate 320 by the plurality of nozzles 321, are located so as to be arranged in parallel along the Y axis.

FIG. 3 illustrates a case where nozzle two nozzle rows are formed at the nozzle plate 320 of each of the print heads 22-1 to 22-12 along the Y axis, but the nozzle row formed at the nozzle plate 320 is not particularly limited to two nozzle rows, and may be one or three or more rows.

Figure 4:
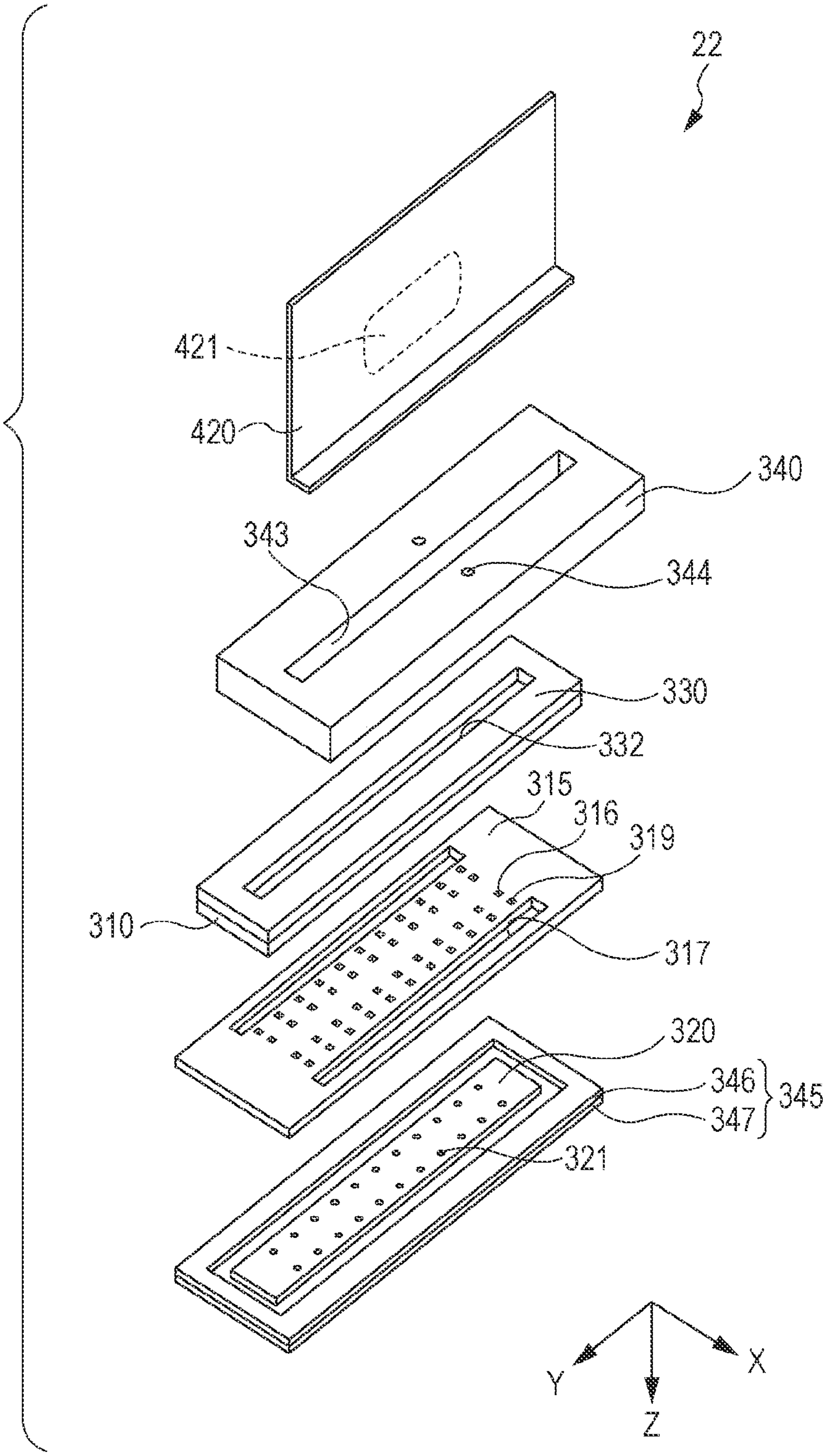
FIG. 4 is an exploded perspective view illustrating a structure of a print head.
Figure 5:
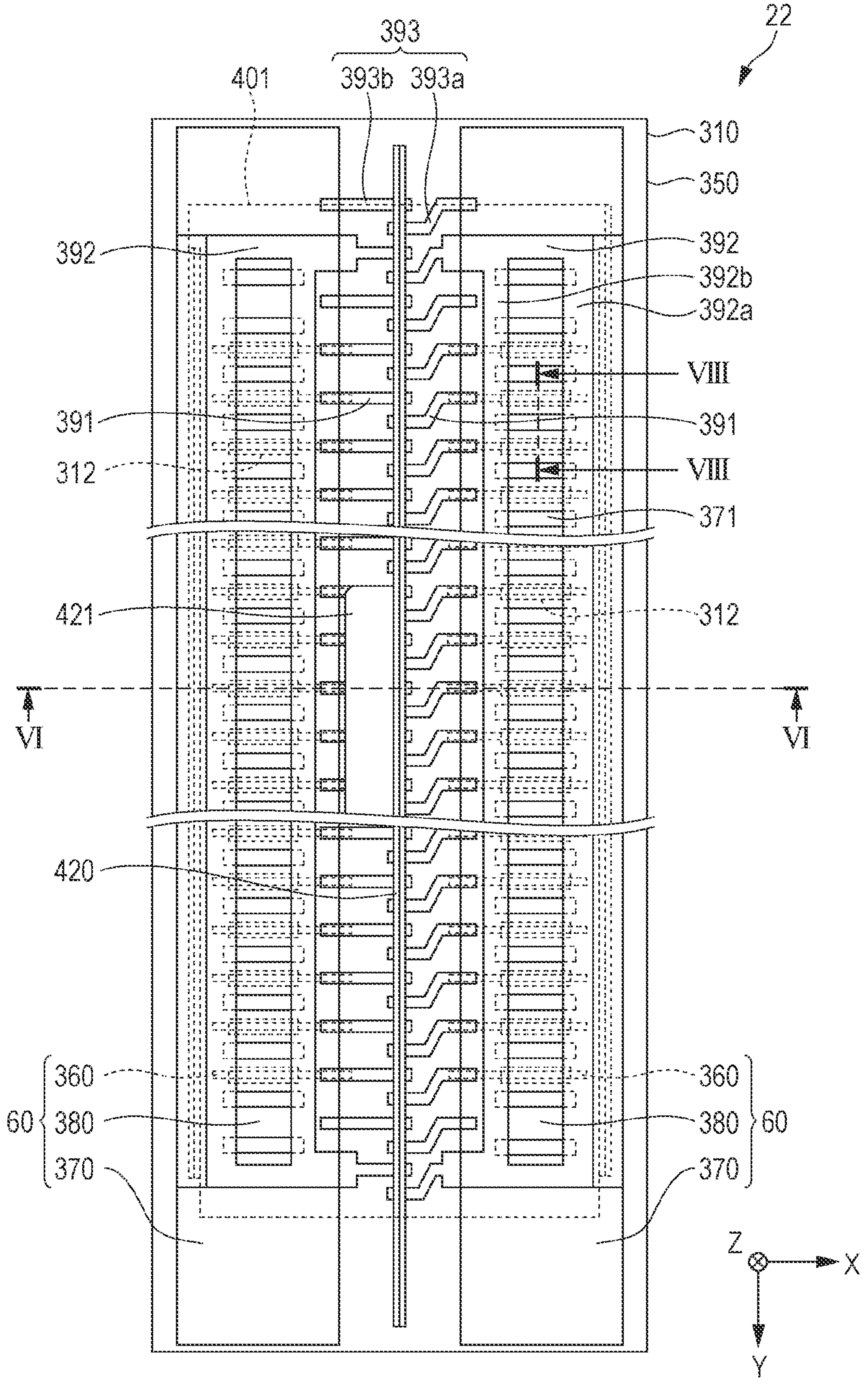
FIG. 5 is a plan view of the print head.
Figure 6:
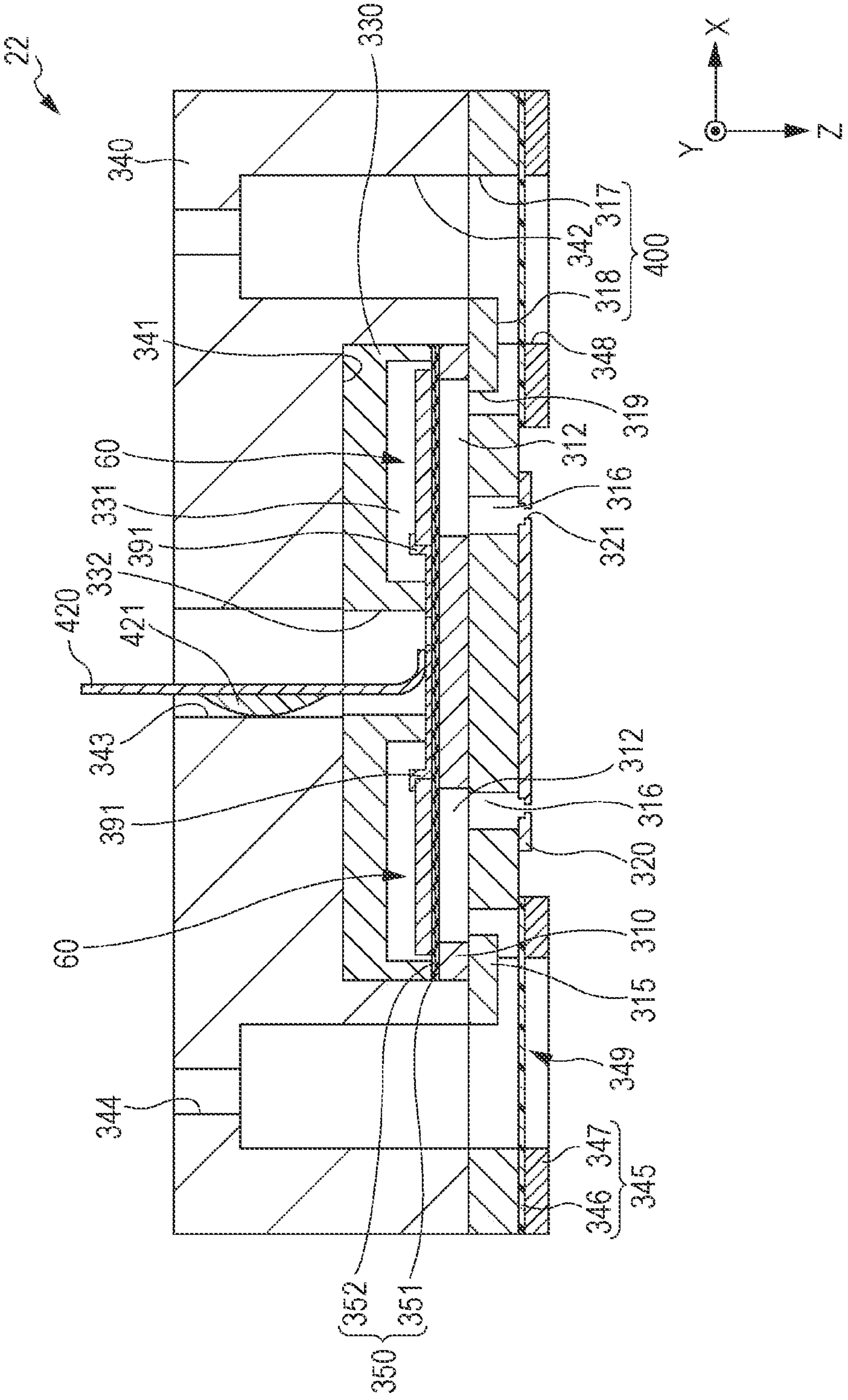
FIG. 6 is a sectional view taken along line VI-VI in FIG. 5.
Figure 7:
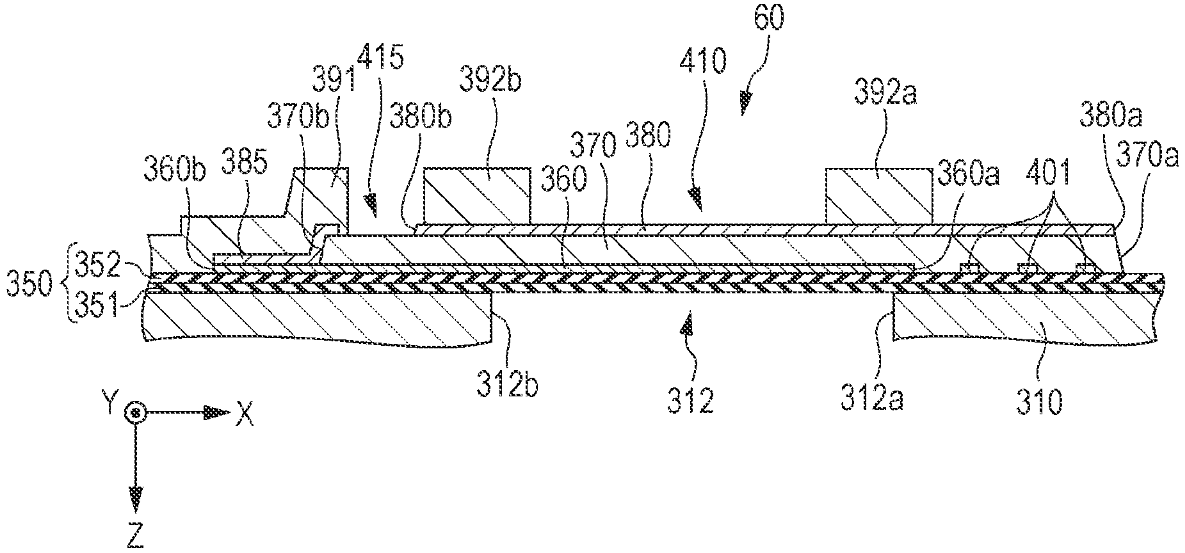
FIG. 7 is a detailed view of a main portion of a configuration in FIG. 6.
Figure 8:
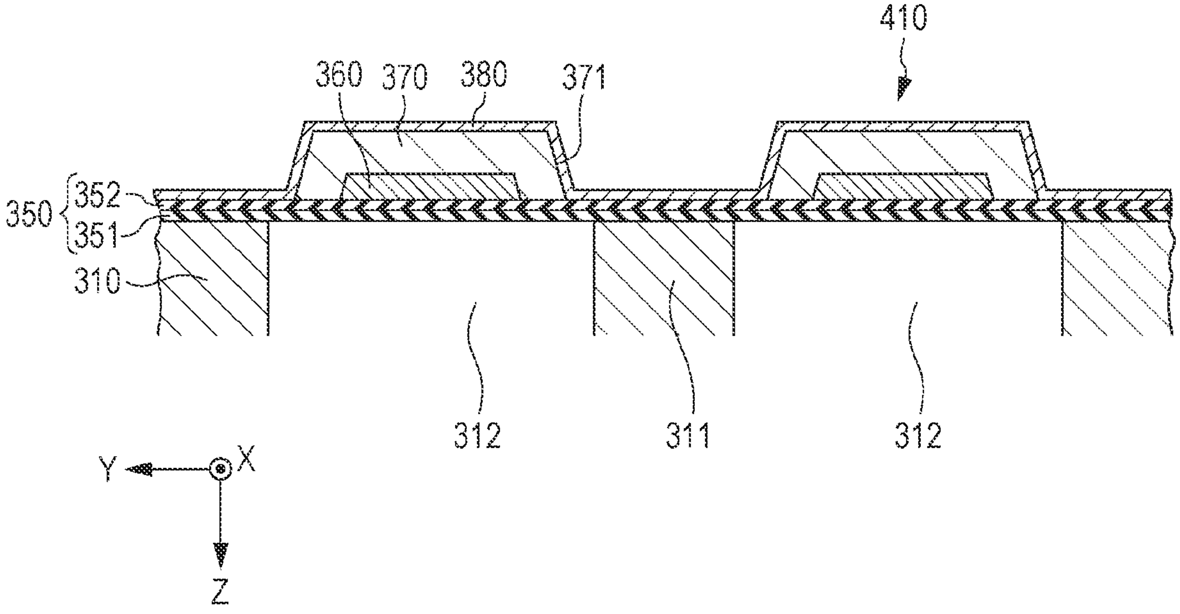
FIG. 8 is a sectional view taken along line VIII-VIII in FIG. 5.

A specific example of a structure of the print head 22 of the head 510, which is the print head 22 of the head unit 20, will be described herein. FIG. 4 is an exploded perspective view illustrating a structure of the print head 22, FIG. 5 is a plan view of the print head 22, FIG. 6 is a sectional view taken along line VI-VI in FIG. 5, FIG. 7 is a detailed view of a main portion of a configuration in FIG. 6, and FIG. 8 is a sectional view taken along line VIII-VIII in FIG. 5.

As illustrated in FIG. 4, the print head 22 includes a pressure chamber substrate 310, a communication plate 315, a nozzle plate 320, a compliance substrate 345, a vibration plate 350 to be described later, a piezoelectric element 60 to be described later, a protective substrate 330, a case member 340, and a wiring substrate 420.

The pressure chamber substrate 310 includes, for, example, a silicon substrate, a glass substrate, a SOI substrate, various ceramic substrate, and the like. As illustrated in FIG. 5, on the pressure chamber substrate 310, two rows of the pressure chambers formed by arranging a plurality of pressure chambers 312 in parallel along the Y axis are formed along the X axis. In this case, of the two rows of the pressure chambers, a pressure chamber row located on the +X side may be referred to as a first pressure chamber row, and a pressure chamber row located on the −X side may be referred to as a second pressure chamber row. Although FIG. 5 is a plan view of the print head 22, a peripheral configuration of the pressure chamber substrate 310 is particularly illustrated, and configurations of the protective substrate 330 and the case member 340 are not illustrated.

Further, the plurality of pressure chambers 312 constituting the first pressure chamber and the plurality of pressure chambers 312 constituting the second pressure chamber are disposed on a straight line along the Y axis such that the positions thereof along the X axis are the same position. In addition, the pressure chambers 312 located adjacent to each other along the Y axis are partitioned by a partition wall 311 illustrated in FIG. 8. The arrangement of the pressure chamber 312 is not limited to the above-described arrangement, but for example, the plurality of pressure chambers 312 constituting the first pressure chamber and the plurality of pressure chambers 312 constituting the second pressure chamber may be so-called staggered arrangement where positions thereof along the X axis are shifted every other one.

The pressure chamber 312 is formed in a rectangular shape, for example, in which a length in the direction along the X axis is longer than a length in the direction along the Y axis in a plan view from the +Z side. A shape of the pressure chamber 312 in a plan view from the +Z side is not particularly limited to the rectangular shape, and may be a parallel quadrilateral shape, a polygonal shape, a circular shape, an oval shape, or the like.

As illustrated in FIGS. 4 and 6, the communication plate 315, the nozzle plate 320, and the compliance substrate 345 are stacked on the +Z side of the pressure chamber substrate 310.

The communication plate 315 is provided with a nozzle communication path 316 via which the pressure chamber 312 and the nozzle 321 communicate with each other. The communication plate 315 is provided with a first manifold portion 317 and a second manifold portion 318 that form a part of a manifold 400 serving as a common liquid chamber for communicating with the plurality of pressure chambers 312. The first manifold portion 317 is provided to penetrate the communication plate 315 in the direction along the Z axis. The second manifold portion 318 is provided to be open on the surface on the +Z side without penetrating the communication plate 315 in the direction along the Z axis.

The communication plate 315 is provided with a supply communication path 319, which communicates with one end portion of the pressure chamber 312 in the direction along the X axis, independently of each of the pressure chambers 312. The supply communication path 319 causes the second manifold portion 318 to communicate with each of the pressure chambers 312, and supplies the ink supplied to the manifold 400 to each pressure chamber 312.

As the communication plate 315, a silicon substrate, a glass substrate, an SOI substrate, various ceramic substrates, a metal substrate, or the like may be used. Examples of the metal substrate include a stainless steel substrate. In this case, the communication plate 315 and the pressure chamber substrate 310 are preferably made of materials having substantially the same thermal expansion coefficient. As a result, when temperatures of the pressure chamber substrate 310 and the communication plate 315 change, the risk of warpage of the pressure chamber substrate 310 and the communication plate 315 is reduced due to a difference between the thermal expansion coefficients.

The nozzle plate 320 is provided on a surface of the communication plate 315 opposite to the pressure chamber substrate 310, that is, on the surface of the communication plate 315 on +Z side. The nozzle plate 320 is formed with the nozzle 321 that communicates with each of the pressure chambers 312 via the nozzle communication path 316. In addition, the nozzle plate 320 is provided with two nozzle rows, in which the plurality of nozzles 321 are arranged in parallel in the direction along the Y axis while being separated in the direction along the X axis. The two nozzle rows are located corresponding to each of the first pressure chamber row and the second pressure chamber row described above. In this case, the description in which the plurality of nozzles 321 of each nozzle row are disposed such that the positions thereof in the direction along the X axis are the same position is made. However, the arrangement of the nozzles 321 is not particularly limited thereto, and for example, the nozzles 321 arranged in parallel in the direction along the Y axis may be disposed at every other positions shifted in the direction along the X axis.

The material of the nozzle plate 320 is not particularly limited, and for example, a silicon substrate, a glass substrate, an SOI substrate, various ceramic substrates, and a metal substrate can be used. In addition, examples of the metal substrate include a stainless steel substrate. As a material of the nozzle plate 320, an organic substance such as a polyimide resin may be used. In this case, the nozzle plate 320 and the communication plate 315 are preferably made of materials having substantially the same thermal expansion coefficient. As a result, when the temperatures of the nozzle plate 320 and the communication plate 315 change, the risk of warpage of the nozzle plate 320 and the communication plate 315 is reduced due to a difference in the thermal expansion coefficient.

The compliance substrate 345 is provided together with the nozzle plate 320 opposite to the pressure chamber substrate 310 of the communication plate 315, that is, on the surface of the communication plate 315 on the +Z side. The compliance substrate 345 is located around the nozzle plate 320 in the print head 22 and seals openings of the first manifold portion 317 and the second manifold portion 318. In addition, the compliance substrate 345 includes a sealing film 346 formed of a flexible thin film and a fixed substrate 347 made of a hard material such as metal. In the compliance substrate 345, opening portions 348 that are completely removed in a thickness direction of the fixed substrate 347 are formed in a region facing the manifold 400. That is, one surface of the manifold 400 is formed with the compliance portion 349 sealed only by the sealing film 346 of the compliance substrate 345.

On the other hand, the vibration plate 350 and the piezoelectric element 60 that causes a pressure change in the ink within the pressure chamber 312 due to bending and deforming of the vibration plate 350, are stacked opposite to the nozzle plate 320 of the pressure chamber substrate 310, that is, on the −Z side of the pressure chamber substrate 310. FIG. 6 is a view for explaining the overall configuration of the print head 22, in which a configuration of the piezoelectric element 60 is illustrated in a simplified manner.

Moreover, the protective substrate 330 having substantially the same size as that of the pressure chamber substrate 310 is bonded to the surface of the pressure chamber substrate 310 on the −Z side via an adhesive or the like. The protective substrate 330 has a holding portion 331 that is a space for protecting the piezoelectric element 60. The holding portions 331 are provided independently for each row of the piezoelectric elements 60 disposed to be arranged in the direction along the Y axis, and two holding portions 331 are formed to be arranged in parallel in the direction along the X axis corresponding to the piezoelectric element 60. The protective substrate 330 is provided with a through-hole 332 formed therethrough in the direction along the Z axis between the two holding portions 331 disposed in parallel in the direction along the X axis.

The case member 340 for defining the manifold 400 communicating with the plurality of pressure chambers 312 together with the pressure chamber substrate 310 is fixed on the protective substrate 330. The case member 340 has substantially the same shape as that of the communication plate 315 described above in a plan view from the −Z side, and is bonded to the protective substrate 330 and also bonded to the communication plate 315.

Such a case member 340 has an accommodation portion 341 that is a space having a depth capable of accommodating the pressure chamber substrate 310 and the protective substrate 330 on the side of the protective substrate 330. The accommodation portion 341 has an opening area wider than the surface of the protective substrate 330 bonded to the pressure chamber substrate 310. The opening surface of the accommodation portion 341 on the side of the nozzle plate 320 is sealed by the communication plate 315 in a state in which the pressure chamber substrate 310 and the protective substrate 330 are accommodated in the accommodation portion 341.

Moreover, third manifold portions 342 are defined on both of the outsides of the accommodation portion 341, respectively, in the direction along the X axis of the case member 340. The first manifold portion 317 and the second manifold portion 318 provided in the communication plate 315 and the third manifold portions 342 provided in the case member 340 constitute the manifold 400. The manifold 400 is continuously provided in the direction along the Y axis, and the supply communication paths 319 through which each of the pressure chambers 312 and the manifold 400 communicate with each other are disposed in parallel in the direction along the Y axis.

The case member 340 is provided with a supply port 344 that communicates with the manifolds 400 to supply ink to each of the manifolds 400. The case member 340 is provided with a coupling port 343 that communicates with the through-hole 332 of the protective substrate 330 and into which the wiring substrate 420 is inserted.

The print head 22 of the present embodiment takes in the ink stored in the ink container 90 from the supply port 344. Then, after the inside of the print head 22 from the manifold 400 to the nozzle 321 is filled with the ink, the vibration plate 350 is bent and deformed along with the drive of the piezoelectric element 60, so that the pressure in each pressure chamber 312 increases, and the ink stored inside the print head 22 is ejected from each nozzle 321.

Next, a configuration of the pressure chamber substrate 310 including the vibration plate 350 and the piezoelectric element 60 described above, which are stacked and formed at the −Z side, will be described. The print head 22 has an individual lead electrode 391, a common lead electrode 392, a measurement lead electrode 393, and resistance wiring 401 as constituents stacked on the −Z side of the pressure chamber substrate 310, in addition to the vibration plate 350 and the piezoelectric element 60 described above.

As illustrated in FIGS. 6 to 8, the vibration plate 350 includes an elastic film 351, which is made of silicon oxide, provided on the side of the pressure chamber substrate 310, and an insulator film 352, which is made of a zirconium oxide film, provided on the elastic film 351. The liquid flow path of the pressure chamber 312 or the like is formed through anisotropic etching of the pressure chamber substrate 310 from the surface on the +Z side, and the surface of the liquid flow path of the pressure chamber 312 or the like on the −Z side is formed of the elastic film 351. A configuration of the vibration plate 350 is not particularly limited. The vibration plate 350 may be formed of, for example, either the elastic film 351 or the insulator film 352, and may further include other films other than the elastic film 351 and the insulator film 352. Examples of a material of the other film include silicon and silicon nitride.

The piezoelectric element 60 causes a pressure change in the ink within the pressure chamber 312. The piezoelectric element 60 has an electrode 360, a piezoelectric body 370, and an electrode 380 sequentially stacked from the +Z side to the −Z side. That is, the piezoelectric element 60 includes the electrode 360, the electrode 380, and the piezoelectric body 370, and the piezoelectric body 370 is provided between the electrode 360 and the electrode 380 in direction along the Z axis in which the electrode 360, the electrode 380, and the piezoelectric body 370 are stacked.

Both the electrode 360 and the electrode 380 are electrically coupled to the wiring substrate 420. In addition, an integrated circuit 421 is mounted on the wiring substrate 420. A signal based on the drive signal COM output from the integrated circuit 421 is supplied to the electrode 360, and a signal with a constant potential is supplied to the electrode 380. As a result, a potential difference based on a voltage value of the drive signal COM is generated between the electrode 360 and the electrode 380, and the piezoelectric body 370 is deformed according to the potential difference. When the piezoelectric body 370 is deformed, the vibration plate 350 of the piezoelectric element 60 is deformed or vibrated, resulting in change of a volume of the pressure chamber 312. Accordingly, the pressure is applied to the ink accommodated in the pressure chamber 312, and the ink is ejected from the nozzle 321 via the nozzle communication path 316.

In the following description, when the potential difference is generated between the electrode 360 and the electrode 380 in the piezoelectric element 60, a portion where piezoelectric distortion occurs in the piezoelectric body 370 may be referred to as an active portion 410, and a portion where piezoelectric distortion does not occur in the piezoelectric body 370 may be referred to as a non-active portion 415. That is, in the piezoelectric element 60, a portion where the piezoelectric body 370 is interposed between the electrode 360 and the electrode 380 corresponds to the active portion 410, and a portion where the piezoelectric body 370 is not interposed between the electrode 360 and the electrode 380 corresponds to the non-active portion 415. When the piezoelectric element 60 is driven, a portion that is displaced in the direction along the Z axis may be referred to as a flexible portion, and a portion that is not displaced in the direction along the Z axis may be referred to as a non-flexible portion. That is, in the piezoelectric element 60, a portion that faces the pressure chamber 312 in the direction along the Z axis corresponds to the flexible portion, and a portion outside the pressure chamber 312 corresponds to the non-flexible portion. In the following description, the active portion 410 may be referred to as a non-passive portion, and the non-active portion 415 may be referred to as a passive portion.

Generally, one electrode of the active portion 410 is configured as an independent individual electrode for each active portion 410, and the other electrode is configured as a common electrode common to a plurality of active portions 410. In the present embodiment, the electrode 360 is configured as an individual electrode, and the electrode 380 is configured as a common electrode.

Specifically, the electrode 360 is located on the +Z side of the piezoelectric body 370 and is cut corresponding to the pressure chamber 312 to constitute an individual electrode that is independent for each active portion 410. The electrode 360 is individually provided for the plurality of pressure chambers 312. In this case, a width of the electrode 360 in the direction along the Y axis is formed narrower than a width of the pressure chamber 312 in the direction along the Y axis. That is, an end portion of the electrode 360 is located inside the region facing the pressure chamber 312 in direction along the Y axis. Meanwhile, an end portion **360*a* of the electrode 360 on the +X side and an end portion 360*b* thereof on the −X side are disposed outside the pressure chamber 312. For example, in the first pressure chamber row, the end portion 360*a* of the electrode 360 is further located on the +X side compared to an end portion 312*a* of the pressure chamber 312 on the +X side, and the end portion 360*b* of the electrode 360 is further located on the −X side compared to an end portion 312*b* of the pressure chamber 312** on the −X side.

A material of the electrode 360 is not particularly limited, and, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, platinum (Pt) is used as the electrode 360.

As illustrated in FIG. 5, the piezoelectric body 370 is continuously provided in the direction along the Y axis with a length in the direction along the X axis as a predetermined length. That is, the piezoelectric body 370 has a predetermined thickness and is continuously provided in the direction in which the pressure chambers 312 are arranged in parallel. A thickness of the piezoelectric body 370 is not particularly limited, and may be about 1000 nanometers to 4000 nanometers.

As illustrated in FIG. 7, a length of the piezoelectric body 370 in the direction along the X direction is larger than a length of the pressure chamber 312 in the direction along the X axis that is a longitudinal direction. Therefore, on both sides of the pressure chamber 312 in the direction along the X axis, the piezoelectric body 370 extends to the outside of the pressure chamber 312. As described above, the piezoelectric body 370 extends to the outside of the pressure chamber 312 in the direction along the X axis, and thus the strength of the vibration plate 350 is improved. Therefore, when the active portion 410 is driven to displace the piezoelectric element 60, it is possible to suppress the occurrence of cracks or the like in the vibration plate 350 or the piezoelectric element 60.

As illustrated in FIG. 7, an end portion **370*a* of the piezoelectric body 370 on the +X side is further located on the +X side that is an outer side compared to the end portion 360*a* of the electrode 360 in the first pressure chamber row. That is, the end portion 360*a* of the electrode 360 is covered with the piezoelectric body 370. On the other hand, the end portion 370*b* of the piezoelectric body 370 in the direction along the −X side is further located on the +X side that is an inner side compared to the end portion 360*b*** of the electrode

360, and the end portion 360*b* of the electrode 360 is not covered with the piezoelectric body 370.

Further, as illustrated in FIGS. 5 and 8, the piezoelectric body 370 is formed with a groove portion 371 which is a portion having a thickness smaller than that of other regions corresponding to each partition wall 311. The groove portion 371 of the present embodiment is formed by completely removing the piezoelectric body 370 in the direction along the Z axis. That is, the fact that the piezoelectric body 370 has a portion having a thickness smaller than other regions includes a case where the piezoelectric body 370 is completely removed in direction along the Z axis. Of course, the piezoelectric body 370 may be formed smaller than the other portions on a bottom surface of the groove portion 371.

The length of the groove portion 371 in direction along the Y axis, that is, a width of the groove portion 371 is the same as or larger than the width of the partition wall 311. In the present embodiment, the width of the groove portion 371 is larger than the width of the partition wall 311. Such groove portion 371 is formed to have a rectangular shape in plan view from the −Z side. Obviously, the shape of the groove portion 371 in plan view from the −Z side is not limited to the rectangular shape, and may be a polygonal shape of pentagon or more, a circular shape, an elliptical shape, or the like.

By providing the groove portion 371 in the piezoelectric body 370, the rigidity of the portion of the vibration plate 350 facing the end portion of the pressure chamber 312 in the direction along the Y axis, that is, a so-called arm portion of the vibration plate 350 is suppressed, and thus the piezoelectric element 60 can be favorably displaced.

Examples of the piezoelectric body 370 include a crystal film having a perovskite structure formed at the electrode 360 and made of a ferroelectric ceramic material exhibiting an electromechanical conversion action, that is, a so-called perovskite type crystal. As a material of the piezoelectric body 370, for example, a ferroelectric piezoelectric material such as lead zirconate titanate (PZT) or a material to which a metal oxide such as niobium oxide, nickel oxide, or magnesium oxide is added may be used. Specifically, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead magnesium niobate zirconate ($Pb(Zr,Ti)(Mg,Nb)O_3$), or the like may be used. In the present embodiment, lead zirconate titanate (PZT) is used as the piezoelectric body 370.

The material of the piezoelectric body 370 is not limited to a lead-based piezoelectric material containing lead, and a lead-free piezoelectric material containing no lead may also be used. Examples of the non-lead-based piezoelectric material include bismuth ferrate (($BiFeO_3$), abbreviated to "BFO"), barium titanate (($BaTiO_3$), abbreviated to "BT"), potassium sodium niobate ($(K,Na)(NbO_3)$, abbreviated to "KNN"), potassium sodium lithium niobate ($(K,Na,Li)(NbO_3)$), potassium sodium lithium tantalate niobate ($(K,Na,Li)(Nb,Ta)O_3$), bismuth potassium titanate ($(Bi_{1/2}K_{1/2})TiO_3$, abbreviated to "BKT"), bismuth sodium titanate ($(Bi_{1/2}Na_{1/2})TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{1-x})TiO_3]$-$(1-x)[BiFeO_3]$, abbreviated to "BKT-BF"), a composite oxide containing bismuth, iron, barium, and titanium and having a perovskite structure ($(1-x)[BiFeO_3]$-$x[BaTiO_3]$, abbreviated to "BFO-BT"), and a material ($(1-x)[Bi(Fe_{1-y}M_y)O_3]$-$x[BaTiO_3]$, M being Mn, Co, or Cr), which is obtained by adding metals such as manganese, cobalt, and chromium to the composite oxide.

As illustrated in FIGS. 5, 7, and 8, the electrode 380 is provided on the −Z side opposite to the electrode 360 with respect to the piezoelectric body 370, and is configured as a common electrode that is common to the plurality of active portions 410. That is, the electrode 380 is provided in common to the plurality of pressure chambers 312. The electrode 380 is continuously provided in the direction along the Y axis with a length in the direction along the X axis as a predetermined length. The electrode 380 is also provided on the inner surface of the groove portion 371, that is, on the side surface of the groove portion 371 of the piezoelectric body 370, and on the insulator film 352 which is the bottom surface of the groove portion 371. Regarding the inside of the groove portion 371, the electrode 380 may be provided only on a part of the inner surface of the groove portion 371, or does not need to be provided over the entire surface of the inner surface of the groove portion 371.

As illustrated in FIG. 7, in the first pressure chamber row, an end portion 380*a* of the electrode 380 on the +X side is further disposed on the +X side so as to be the outside compared to the end portion 360*a* of the electrode 360 covered with the piezoelectric body 370. That is, the end portion 380*a* of the electrode 380 is further located on the +X side that is an outer side compared to the end portion 312*a* of the pressure chamber 312, and is further located on the +X side that is an outer side compared to the end portion 360*a* of the electrode 360. In the present embodiment, the end portion 380*a* of the electrode 380 substantially coincides with the end portion 370*a* of the piezoelectric body 370 in the direction along the X axis. Accordingly, the end portion of the active portion 410 on the +X side, that is, a boundary between the active portion 410 and the non-active portion 415 is defined by the end portion 360*a* of the electrode 360.

On the other hand, an end portion 380*b* of the electrode 380 on the −X side is further disposed on the −X side that is an outer side compared to the end portion 312*b* of the pressure chamber 312 on the −X side, and is further disposed on the +X side that is an inner side compared to the end portion 370*b* of the piezoelectric body 370. As described above, the end portion 370*b* of the piezoelectric body 370 is further located on the inner side that is the +X side compared to the end portion 360*b* of the electrode 360. Therefore, the end portion 380*b* of the electrode 380 is further located on the piezoelectric body 370 that is the +X side compared to the end portion 360*b* of the electrode 360. There is a portion to which the surface of the piezoelectric body 370 is exposed on the end portion 380*b* of the electrode 380 on the −X side.

As described above, the end portion 380*b* of the electrode 380 is further disposed on the +X side compared to the end portion 370*b* of the piezoelectric body 370 and the end portion 360*b* of the electrode 360. Therefore, the end portion of the active portion 410 on the −X side, that is, the boundary between the active portion 410 and the non-active portion 415 is defined by the end portion 380*b* of the electrode 380.

A material of the electrode 380 is not particularly limited, but, similar to the electrode 360, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, iridium (Ir) is used as the electrode 380.

On the outer side of the end portion 380*b* of the electrode 380, that is, further on the −X side of the end portion 380*b* of the electrode 380, a wiring portion 385 that is formed at the same layer as the electrode 380 but is electrically decoupled from the electrode 380 is provided. The wiring portion 385 is formed from above of the piezoelectric body 370 to above of the electrode 360 extending further to the −X side of the piezoelectric body 370 in a state in which the wiring portion 385 is spaced not to be in contact with the end portion 380*b* of the electrode 380. The wiring portion 385 is provided independently for each active portion 410. That is, a plurality of wiring portions 385 are disposed at predetermined intervals in the direction along the Y axis. The wiring portion 385 may be formed at a layer different from that of the electrode 380, but is preferably formed at the same layer as the electrode 380. As a result, manufacturing steps of the wiring portion 385 can be simplified and the cost can be reduced.

For the electrode 360 and the electrode 380 configuring the piezoelectric element 60, the individual lead electrode 391 is electrically coupled to the electrode 360 and the common lead electrode 392 that is a driving common electrode is electrically coupled to the electrode 380. The flexible wiring substrate 420 is electrically coupled to the end portions of the individual lead electrode 391 and the common lead electrode 392 on the opposite side to the end portions coupled to the piezoelectric element 60. The control unit 10, the temperature information output circuit 26, and a plurality of wiring patterns for coupling to a plurality of circuits (not illustrated) are formed at the wiring substrate 420. In the present embodiment, the wiring substrate 420 is configured with, for example, a flexible printed circuit (FPC). As the wiring substrate 420, any flexible substrate such as flexible flat cable (FFC) may be used instead of an FPC.

In the present embodiment, the individual lead electrode 391 and the common lead electrode 392 extend to be exposed in the through-hole 332 formed in the protective substrate 330, and are electrically coupled to the wiring substrate 420 in the through-hole 332. Then, the integrated circuit 421 that outputs a signal for driving the piezoelectric element 60 is mounted on the wiring substrate 420.

In the present embodiment, the individual lead electrode 391 and the common lead electrode 392 are formed at the same layer so as to be electrically decoupled to each other. As a result, manufacturing steps can be simplified and the cost can be reduced compared with when the individual lead electrode 391 and the common lead electrode 392 are individually formed. Obviously, the individual lead electrode 391 and the common lead electrode 392 may be formed at different layers.

A material of the individual lead electrode 391 and the common lead electrode 392 is not particularly limited as long as the material is conductive. For example, gold (Au), copper (Cu), titanium (Ti), tungsten (W), nickel (Ni), chromium (Cr), platinum (Pt), aluminum (Al), and the like may be used. In the present embodiment, gold (Au) is used as the individual lead electrode 391 and the common lead electrode 392. The individual lead electrode 391 and the common lead electrode 392 may have an adhesion layer for improving the adhesion with the electrode 360, the electrode 380, and the vibration plate 350.

The individual lead electrode 391 is provided for each active portion 410, that is, for each first electrode 360. As illustrated in FIG. 7, in the first pressure chamber row, the individual lead electrode 391 is coupled to the vicinity of the end portion 360*b* of the electrode 360 provided on the outside of the piezoelectric body 370 via the wiring portion 385, and is drawn out to the −X side to above of the pressure chamber substrate 310 and actually to above of the vibration plate 350.

On the other hand, as illustrated in FIG. 5, in the first pressure chamber row, the common lead electrode 392 is drawn out to the −X side from above of the electrode 380 constituting the common electrode on the piezoelectric body 370 to above of the vibration plate 350, at both end portions in the direction along the Y axis. The common lead electrode 392 has an extension portion 392*a* and an extension portion 392*b*. As illustrated in FIGS. 5 and 7, in the first pressure chamber row, the extension portion 392*a* extends in the direction along the Y axis in a region corresponding to the end portion 312*a* of the pressure chamber 312, and the extension portion 392*b* extends in the direction along the Y axis to a region corresponding to the end portion 312*b* of the pressure chamber 312. The extension portion 392*a* and the extension portion 392*b* are continuously provided on the plurality of active portions 410 in the direction along the Y axis.

The extension portion 392*a* and the extension portion 392*b* extend from the inside of the pressure chamber 312 to the outside of the pressure chamber 312 in the direction along the X axis. In the present embodiment, the active portion 410 of the piezoelectric element 60 extends to the outside of the pressure chamber 312 at both end portions of the pressure chamber 312 in the direction along the X axis, and the extension portion 392*a* and the extension portion 392*b* extend to the outside of the pressure chamber 312 on the active portion 410.

As illustrated in FIG. 7, the resistance wiring 401 is provided on the surface of the vibration plate 350 on the −Z side. The resistance wiring 401 detects the temperature of the pressure chamber 312 by using the characteristic that an electrical resistance value changes depending on the temperature. As a material of the resistance wiring 401, a material having an electrical resistance value that is temperature dependent is used, for example, gold (Au), platinum (Pt), iridium (Ir), aluminum (Al), copper (Cu), titanium (Ti), tungsten (W), nickel (Ni), and chromium (Cr) may be used. Among these, platinum (Pt) has a large change in resistance value due to temperature, and has high stability and accuracy. Furthermore, platinum (Pt) also has a high linear property of the change in resistance value depending on the temperature change. From this viewpoint, platinum (Pt) is preferably used as the material of the resistance wiring 401. That is, the resistance wiring 401 preferably include platinum (Pt). In addition, in the present embodiment, the resistance wiring 401 is stacked and formed at the surface of the vibration plate 350 on the −Z side so as to be the same layer with the electrode 360 and electrically decoupled to the electrode 360.

As illustrated in FIG. 5, one end of the resistance wiring 401 is coupled to a measurement lead electrode 393*a*, and the other end of the resistance wiring 401 is coupled to a measurement lead electrode 393*b*. The resistance wiring 401 is located between the vibration plate 350 and the piezoelectric body 370 in the direction along the Z axis while being covered with the piezoelectric body 370. The measurement lead electrodes 393*a* and 393*b* are electrically coupled to the wiring substrate 420. As a result, the resistance wiring 401 outputs a signal of a voltage value based on a change in an electrical resistance value according to the temperature change of the pressure chamber 312 from the print head 22 via the wiring substrate 420.

The resistance wiring 401 includes a first pressure chamber row side meandering pattern located on the +X side in the direction along the X axis and a second pressure chamber row side meandering pattern located on the −X side in the direction along the X axis. The first pressure chamber row side meandering pattern meanders in the direction along the Y axis at a position overlapping the supply communication path 319 communicating with each pressure chamber 312 constituting the first pressure chamber row when viewed from the −Z side. The second pressure chamber row side meandering pattern meanders in the direction along the Y axis at a position overlapping the supply communication path 319 communicating with each pressure chamber 312 constituting the second pressure chamber row when viewed from the −Z side. That is, the resistance wiring 401 includes the first pressure chamber row side meandering pattern and the second pressure chamber row side meandering pattern, in which the first pressure chamber row side meandering pattern is located corresponding to the first pressure chamber row, and the second pressure chamber row side meandering pattern is located corresponding to the second pressure chamber row.

As illustrated in FIGS. 6 and 7, a distance between the end portion of the pressure chamber 312 on the −Z side and the resistance wiring 401 in the direction along the Z axis is smaller than a dimension of the pressure chamber 312 in the direction along the Z axis. For example, in the first pressure chamber row, the longest distance in the direction along the X axis between the end portion 312*a* of the pressure chamber 312 on the +X side and the resistance wiring 401 is smaller than the dimension of the pressure chamber 312 in the direction along the X axis. Therefore, the electrical resistance value of the resistance wiring 401 is likely to change in response to a temperature change of the pressure chamber 312.

In the present embodiment, the measurement lead electrode 393 including the measurement lead electrode 393*a* and the measurement lead electrode 393*b* is formed at the same layer as the individual lead electrode 391 and the common lead electrode 392, but is electrically decoupled. As a result, manufacturing steps can be simplified and the cost can be reduced compared with when the measurement lead electrode 393 is individually formed with the individual lead electrode 391 and the common lead electrode 392. Of course, the measurement lead electrode 393 may be formed at a layer different from the individual lead electrode 391 and the common lead electrode 392.

A material of the measurement lead electrode 393 is not particularly limited as long as the material is conductive. For example, gold (Au), copper (Cu), titanium (Ti), tungsten (W), nickel (Ni), chromium (Cr), platinum (Pt), and aluminum (Al) may be used. In the present embodiment, gold (Au) is used as the measurement lead electrode 393. A material of the measurement lead electrode 393 is the same as the material of the individual lead electrode 391 and the common lead electrode 392. The measurement lead electrode 393 may have an adhesion layer that improves adhesion to the resistance wiring 401 and the vibration plate 350.

As described above, in the present embodiment, the measurement lead electrode 393 extends to be exposed in the through-hole 332 formed in the protective substrate 330, and is electrically coupled to the wiring substrate 420 in the through-hole 332. As a result, the signal of the voltage value corresponding to the electrical resistance value of the resistance wiring 401, which is changed depending on the temperature of the pressure chamber 312, is output from the print head 22 via the wiring substrate 420.

As described above, each of the print heads 22-1 to 22-12 of the head unit 20 in the present embodiment includes: the piezoelectric element 60 including the electrode 360, the electrode 380, and the piezoelectric body 370, having the piezoelectric body 370 that is located between the electrode 360 and the electrode 380 in the direction along the Z axis in which the electrode 360, the electrode 380, and the piezoelectric body 370 are stacked, and driven by receiving the drive signal COM; the vibration plate 350 located on the +Z side that is one side of the piezoelectric element 60 in the direction along the Z axis, and deformed by the drive of the piezoelectric element 60; the pressure chamber substrate 310 located on the +Z side that is one side of the vibration plate 350 in the direction along the Z axis, and provided with the pressure chamber 312 having a volume that changes due to the deformation of the vibration plate 350; the nozzle 321 for ejecting the ink according to the change in volume of the pressure chamber 312; and the resistance wiring 401 located on the −Z side that is the other side of the vibration plate 350 in the direction along the Z axis, to output the signal of the voltage value according to the temperature of the pressure chamber 312, in which the resistance wiring 401 is stacked on the vibration plate 350.

The print head 22 configured as described above detects the temperature of the ink stored in the pressure chamber 312 based on the electrical resistance value of the resistance wiring 401 provided close to the pressure chamber 312. Accordingly, the detection accuracy of the temperature of the pressure chamber 312, which is detected by the resistance wiring 401, is improved. As a result, the control unit 10 can perform ejection control of the ink from the print head 22 suitable for the temperature of the ink in the pressure chamber 312. Furthermore, since at least a part of the resistance wiring 401 is stacked on the vibration plate 350, the resistance wiring 401 can be disposed closer to the pressure chamber 312. Therefore, the detection accuracy of the temperature of the pressure chamber 312 in the resistance wiring 401 is further improved. As a result, the control unit 10 can perform ejection control of the ink from the print head 22 that is more suitable for the temperature of the ink in the pressure chamber 312.

Figure 9:
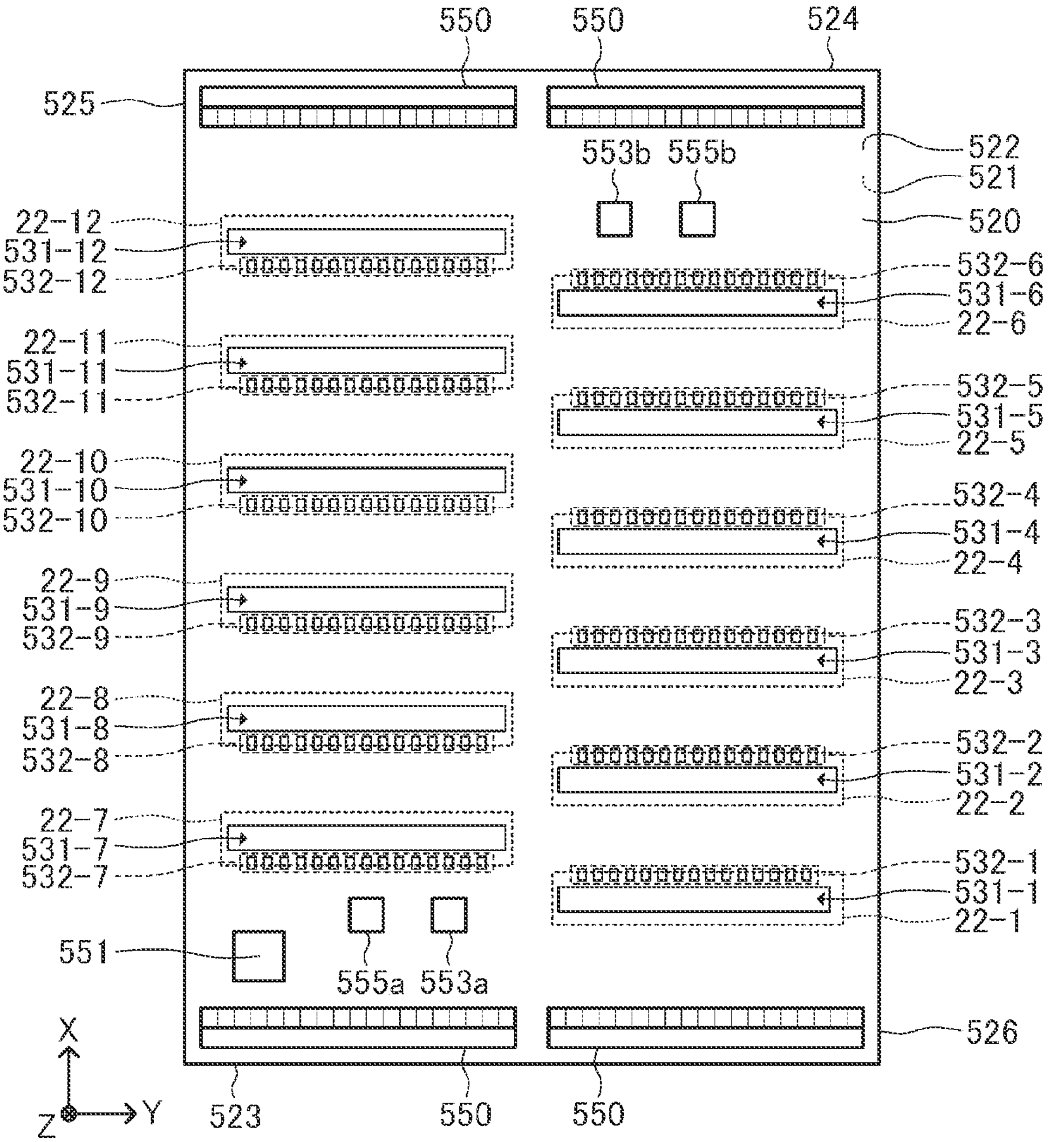
FIG. 9 is a plan view illustrating a case where a head substrate is viewed from a surface.

Next, a configuration of the head substrate 520 will be described with reference to FIG. 9. FIG. 9 is a plan view illustrating a case where the head substrate 520 is viewed from the surface 521. The head substrate 520 has a substantially rectangular shape formed by a side 523, a side 524 facing the side 523 in the X direction, a side 525, and a side 526 facing the side 525 in the Y direction. The shape of the head substrate 520 is not limited to the rectangular shape, and may be, for example, a polygonal shape such as a hexagon or an octagon, and further, may be formed in notches, arcs, or the like. That is, the head substrate 520 has the side 523, the side 524 which is different from the side 523, the side 525 which intersects with the side 523 and the side 524, and the side 526 which intersects the side 523 and the side 524 and is different from the side 525. The intersection of the side 523, the side 524, the side 525, and side 526 herein includes that a virtual extension line of the side 525 intersects with a virtual extension line of the side 523 and a virtual extension line of the side 524, and a virtual extension line of the side 526 intersects with the virtual extension line of the side 523 and the virtual extension line of the side 524.

The head substrate 520 is provided with FPC insertion holes 531-1 to 531-12, electrode groups 532-1 to 532-12, a plurality of connectors 550, and integrated circuits 551, 553*a*, 553*b*, 555*a*, and 555*b*.

Each of the electrode groups 532-1 to 532-12 includes a plurality of electrodes arranged in parallel along the Y direction. The electrode groups 532-1 to 532-6 are arranged in parallel in the order of the electrode groups 532-1, 532-2, 532-3, 532-4, 532-5, and 532-6 along the side 526 from the side 523 toward the side 524. The electrode groups 532-7 to 532-12 are arranged in parallel in the order of the electrode groups 532-7, 532-8, 532-9, 532-10, 532-11, and 532-12 along the side 525 from the side 523 toward the side 524.

The FPC insertion holes 531-1 to 531-12 are through-holes formed through the surface 521 and the surface 522 of the head substrate 520. The FPC insertion holes 531-1 to 531-6 are arranged in parallel in the order of the FPC insertion holes 531-1, 531-2, 531-3, 531-4, 531-5, and 531-6 along the side 526 from the side 523 toward the side 524. In this case, the FPC insertion hole 531-1 is located toward the side 523 of the electrode group 532-1, the FPC insertion hole 531-2 is located between the electrode group 532-1 and the electrode group 532-2, the FPC insertion hole 531-3 is located between the electrode group 532-2 and the electrode group 532-3, the FPC insertion hole 531-4 is located between the electrode group 532-3 and the electrode group 532-4, the FPC insertion hole 531-5 is located between the electrode group 532-4 and the electrode group 532-5, and the FPC insertion hole 531-6 is located between the electrode group 532-5 and the electrode group 532-6.

Moreover, the FPC insertion holes 531-7 to 531-12 are arranged in parallel in the order of the FPC insertion holes 531-7, 531-8, 531-9, 531-10, 531-11, and 531-12 along the side 525 from the side 523 toward the side 524. In this case, the FPC insertion hole 531-7 is located between the electrode group 532-7 and electrode group 532-8, the FPC insertion hole 531-8 is located between the electrode group 532-8 and electrode group 532-9, the FPC insertion hole 531-9 is located between the electrode group 532-9 and electrode group 532-10, the FPC insertion hole 531-10 is located between the electrode group 532-10 and electrode group 532-11, the FPC insertion hole 531-11 is located between the electrode group 532-11 and electrode group 532-12, and the FPC insertion hole 531-12 is located toward the side 524 of the electrode group 532-12.

The wiring substrate 420 of each of the print heads 22-1 to 22-12 of the head 510, which is provided on a side of the surface 521 of the head substrate 520, is inserted through the corresponding FPC insertion holes 531-1 to 531-12, and is electrically coupled to the electrode groups 532-1 to 532-12 provided on the surface 522 of the head substrate 520. That is, the head unit 20 includes the head substrate 520 to which the print heads 22-1 to 22-12 are coupled.

Specifically, the wiring substrate 420 of the print head 22-1 is inserted through the FPC insertion hole 531-1 and is electrically coupled to the plurality of electrodes of the electrode group 532-1. The wiring substrate 420 of the print head 22-2 is inserted through the FPC insertion hole 531-2 and is electrically coupled to the plurality of electrodes of the electrode group 532-2. The wiring substrate 420 of the print head 22-3 is inserted through the FPC insertion hole 531-3 and is electrically coupled to the plurality of electrodes of the electrode group 532-3. The wiring substrate 420 of the print head 22-4 is inserted through the FPC insertion hole 531-4 and is electrically coupled to the plurality of electrodes of the electrode group 532-4. The wiring substrate 420 of the print head 22-5 is inserted through the FPC insertion hole 531-5 and is electrically coupled to the plurality of electrodes of the electrode group 532-5. The wiring substrate 420 of the print head 22-6 is inserted through the FPC insertion hole 531-6 and is electrically coupled to the plurality of electrodes of the electrode group 532-6. The wiring substrate 420 of the print head 22-7 is inserted through the FPC insertion hole 531-7 and is electrically coupled to the plurality of electrodes of the electrode group 532-7. The wiring substrate 420 of the print head 22-8 is inserted through the FPC insertion hole 531-8 and is electrically coupled to the plurality of electrodes of the electrode group 532-8. The wiring substrate 420 of the print head 22-9 is inserted through the FPC insertion hole 531-9 and is electrically coupled to the plurality of electrodes of the electrode group 532-9. The wiring substrate 420 of the print head 22-10 is inserted through the FPC insertion hole 531-10 and is electrically coupled to the plurality of electrodes of the electrode group 532-10. The wiring substrate 420 of the print head 22-11 is inserted through the FPC insertion hole 531-11 and is electrically coupled to the plurality of electrodes of the electrode group 532-11. The wiring substrate 420 of the print head 22-12 is inserted through the FPC insertion hole 531-12 and is electrically coupled to the plurality of electrodes of the electrode group 532-12.

That is, the print heads 22-1 to 22-6 are located in parallel in the order of the print heads 22-1, 22-2, 22-3, 22-4, 22-5, and 22-6 along the side 526 from the side 523 toward the side 524, and the print heads 22-7 to 22-12 are located in parallel in the order of the print heads 22-7, 22-8, 22-9, 22-10, 22-11, and 22-12 along the side 525 from the side 523 toward the side 524. In other words, the print heads 22-1, 22-2, and 22-3 and the print heads 22-7, 22-8, and 22-9 are located closer to side 523 than the side 524, and the print heads 22-4, 22-5, and 22-6 and the print heads 22-10, 22-11, and 22-12 are located closer to the side 524 than the side 523.

Some of the plurality of connectors 550 are located toward the side 523 of the electrode groups 532-1 to 532-12 and the FPC insertion holes 531-1 to 531-12 and are located along the side 523, and some of the different plurality of connectors 550 are located toward the side 524 of the electrode groups 532-1 to 532-12 and the FPC insertion holes 531-1 to 531-12 and are located along the side 524.

The integrated circuits 551, 553*a*, and 555*a* are located between the connector 550 located along the side 523 among the plurality of connectors 550 and the electrode groups 532-1 to 532-12 and the FPC insertion holes 531-1 to 531-12. In addition, the integrated circuits 553*a* and 555*b* are located between the connector 550 located along the side 524 among the plurality of connectors 550 and the electrode groups 532-1 to 532-12 and the FPC insertion holes 531-1 to 531-12.

In this case, the integrated circuit 551 is, for example, a microcomputer or a field programmable gate array (FPGA) and constitutes at least a part of an output control circuit 750 to be described later, the integrated circuit 553*a* is, for example, a multiplexer and constitutes at least a part of a temperature information selection circuit 710*a* to be described later, the integrated circuit 553*b* is, for example, a multiplexer and constitutes at least a part of a temperature information selection circuit 710*b* to be described later, the integrated circuit 555*a* is, for example, an operational amplifier and constitutes at least a part of an amplification circuit 720*a* to be described later, and the integrated circuit 555*b* includes, for example, an operational amplifier and constitutes at least a part of an amplification circuit 720*b* to be described later.

The control signal Ctrl-H and the drive signal COM output by the control unit 10 are input to the head unit 20 configured as described above via the connector 550. The control signal Ctrl-H and the drive signal COM input to the head unit 20 propagate through the wiring pattern provided on the head substrate 520 and are input to the print heads 22-1 to 22-12 of the head 510. Then, each of the print heads 22-1 to 22-12 ejects the ink based on the input control signal Ctrl-H and drive signal COM. The ink ejected from the print heads 22-1 to 22-12 lands on the medium P, and accordingly, a desired image is formed at the medium P.

Figure 10:
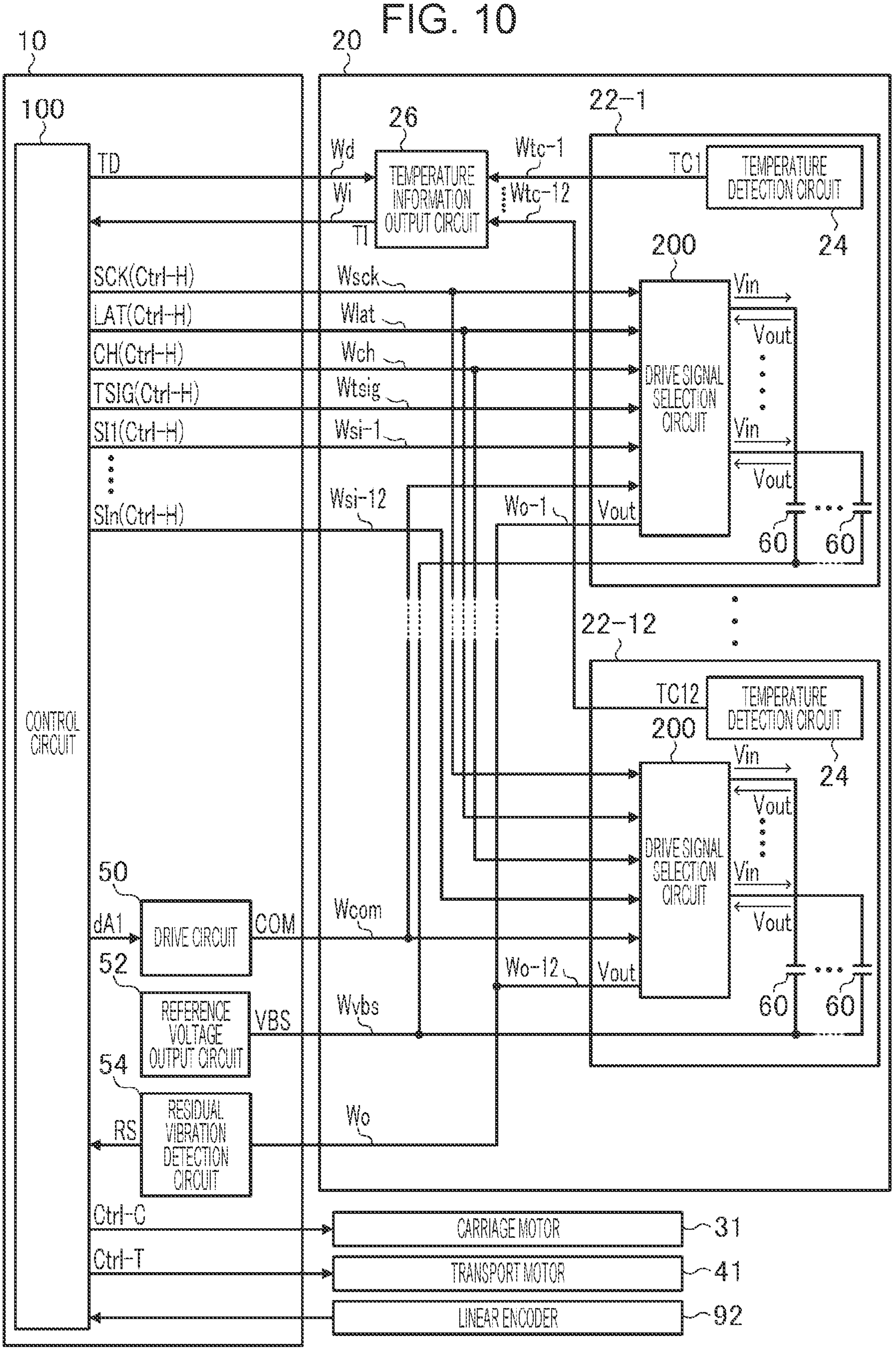
FIG. 10 is a diagram illustrating a functional configuration of the liquid ejecting apparatus.

2. Functional Configuration of Liquid Ejecting Apparatus Functional Configuration of Liquid Ejecting Apparatus Next, a functional configuration of the liquid ejecting apparatus 1 will be described. FIG. 10 is a diagram illustrating a functional configuration of the liquid ejecting apparatus 1. As illustrated in FIG. 10, the liquid ejecting apparatus 1 includes the control unit 10, the head unit 20, the carriage motor 31, the transport motor 41, and a linear encoder 92.

The control unit 10 includes a drive circuit 50, a reference voltage output circuit 52, a residual vibration detection circuit 54, and a control circuit 100. For example, the control circuit 100 includes a processing circuit such as a CPU and an FPGA and a storage circuit such as a semiconductor memory. An image information signal including image data or the like is input to the control circuit 100 from an external device such as a host computer that is communicatively coupled to the outside of the liquid ejecting apparatus 1. The control circuit 100 generates various signals for controlling the liquid ejecting apparatus 1 based on the input image information signal, and outputs the various signals to corresponding configurations.

As a specific example, in addition to the image information signal described above, a detection signal based on a scanning position of the above-described carriage 21 of the head unit 20 is input from the linear encoder 92 to the control circuit 100. As a result, the control circuit 100 grasps a scanning position of the head unit 20 including the print head 22, which is the scanning position of the carriage 21. The control circuit 100 generates various signals according to the input image information signal and the grasped scanning position of the head unit 20, and outputs the signals to the corresponding configurations.

Specifically, the control circuit 100 generates a control signal Ctrl-C for controlling movement of the head unit 20 along a scanning axis according to the scanning position of the head unit 20, and outputs the control signal Ctrl-C to the carriage motor 31. As a result, the carriage motor 31 is operated, and movement of the head unit 20 mounted on the carriage 21 along the scanning axis and a scanning position thereof are controlled. The control circuit 100 generates the control signal Ctrl-T for controlling transport of the medium P, and outputs the control signal Ctrl-T to the transport motor 41. As a result, the transport motor 41 is operated, and movement of the medium P in the transport direction is controlled. The control signal Ctrl-C may be input to the carriage motor 31 after being signal-converted via a driver circuit (not illustrated), and the control signal Ctrl-T may be input to the transport motor 41 after being signal-converted via a driver circuit (not illustrated).

Moreover, the control circuit 100 generates print data signals SI1 to SI12, a change signal CH, a latch signal LAT, a clock signal SCK, and an inspection timing signal SIG as the control signal Ctrl-H for controlling the head unit 20 based on the image information signal input from the external device and the scanning position of the head unit 20, and outputs the print data signals SI1 to SI12, the change signal CH, the latch signal LAT, the clock signal SCK, and the inspection timing signal TSIG to the head unit 20. Furthermore, the control circuit 100 generates a temperature acquisition request signal TD for acquiring the temperature of the head unit 20 at a predetermined timing, and outputs the temperature acquisition request signal TD to the head unit 20. In this case, a temperature information signal TI, which is a temperature information signal TI corresponding to the output temperature acquisition request signal TD and includes information about the temperature of the head unit 20, is input to the control circuit 100. The control circuit 100 grasps the temperature of the head unit 20 and corrects the control signals Ctrl-H, Ctrl-C, and Ctrl-T based on the input temperature information signal TI, and outputs the corrected control signals Ctrl-H, Ctrl-C, and Ctrl-T to the corresponding configurations.

Accordingly, the liquid ejecting apparatus 1 and the head unit 20 are controlled according to the temperature of the print head 22. As a result, the ejection accuracy of the ink ejected from the liquid ejecting apparatus 1 and the head unit 20 is improved.

Moreover, the control circuit 100 generates a reference drive signal dA1 that is a digital signal and outputs the reference drive signal dA1 to the drive circuit 50 as the control signal Ctrl-H. The drive circuit 50 generates a drive signal COM having a signal waveform defined by the reference drive signal dA1 as the drive signal COM, and outputs the drive signal COM to the head unit 20.

Specifically, the reference drive signal dA1 output by the control circuit 100 is input to the drive circuit 50. The drive circuit 50 converts the input reference drive signal dA1 into a digital/analog signal, and then performs class D amplification on the converted analog signal to generate a drive signal COM and output the drive signal COM to the head unit 20. That is, the control circuit 100 outputs the reference drive signal dA1 as the control signal Ctrl-H corrected based on the input temperature information signal TI, and the drive circuit 50 outputs the drive signal COM corrected according to the reference drive signal dA1 corrected based on the temperature information signal TI. In this case, the reference drive signal dA1 output by the control circuit 100 is described as a digital signal that defines a signal waveform of the drive signal COM, but the reference drive signal dA1 may define the signal waveform of the drive signal COM or may be an analog signal. In addition, the drive circuit 50 may perform class A amplification, class B amplification, and class AB amplification on the signal waveform defined by the reference drive signal dA1 to generate the drive signal COM.

The reference voltage output circuit 52 generates a reference voltage signal VBS and outputs the reference voltage signal VBS to the head unit 20. The reference voltage signal VBS is a signal having a constant voltage value as a reference for driving the piezoelectric element 60, and is supplied to the electrode 380 that is a common electrode. The voltage value of such a reference voltage signal VBS may be, for example, a constant signal at a ground potential, or may be constant at a potential of 5.5 V, 6 V, or the like.

A residual vibration signal Vout output by a drive signal selection circuit 200, which will be described below, of the head unit 20 is input to the residual vibration detection circuit 54. The residual vibration detection circuit 54 determines the ejection state of the ink from the print head 22 by using at least one of the amplitude, frequency, cycle, and the like of the input residual vibration signal Vout. The residual vibration detection circuit 54 generates a determination result signal RS including a determination result based on the residual vibration signal Vout and outputs the determination result signal RS to the control circuit 100.

The print data signals SI1 to SI12, the change signal CH, the latch signal LAT, the clock signal SCK, the inspection timing signal TSIG, the drive signal COM, the reference voltage signal VBS, and the temperature acquisition request signal TD are input to the head unit 20 as described above. Further, the head unit 20 generates the temperature information signal TI and the residual vibration signal Vout, and outputs the temperature information signal TI and the residual vibration signal Vout to the control unit 10. In this case, the print data signal SI1, the change signal CH, the latch signal LAT, the clock signal SCK, the inspection timing signal TSIG, the drive signal COM, the reference voltage signal VBS, and the temperature acquisition request signal TD, which are input to the head unit 20, propagate through the wiring pattern formed at the above-described head substrate 520 and are input to the corresponding configuration, and the temperature information signal TI and the residual vibration signal Vout, which are generated in the head unit 20, propagate through the wiring pattern formed at the head substrate 520 and are output from the head unit 20.

The head unit 20 includes the print heads 22-1 to 22-12 and the temperature information output circuit 26. In addition, each of the print heads 22-1 to 22-12 includes the drive signal selection circuit 200, the temperature detection circuit 24, and a plurality of piezoelectric elements 60. In this case, the temperature information output circuit 26 and the wiring substrate 420 of each of the print heads 22-1 to 22-12 are electrically coupled to the above-described head substrate 520. Accordingly, the print data signals SI1 to SI12, the change signal CH, the latch signal LAT, the clock signal SCK, the inspection timing signal TSIG, the drive signal COM, the reference voltage signal VBS, and the temperature acquisition request signal TD are input to each of the print heads 22-1 to 22-12 and the temperature information output circuit 26, and the temperature information signal TI and the residual vibration signal Vout, which are output from either one of the print heads 22-1 to 22-12 or the temperature information output circuit 26, are output from the head unit 20.

The print data signal SI1 that propagates through wiring Wsi-1 provided on the head substrate 520, the change signal CH that propagates through wiring Wch provided on the head substrate 520, the latch signal LAT that propagates through wiring Wlat provided on the head substrate 520, the clock signal SCK that propagates wiring Wsck provided on the head substrate 520, the inspection timing signal TSIG that propagates wiring Wtsig provided on the head substrate 520, the drive signal COM that propagates wiring Wcom provided on the head substrate 520, and the reference voltage signal VBS that propagates through wiring Wvbs provided on the head substrate 520 are input to the print head 22-1.

The clock signal SCK, the latch signal LAT, the change signal CH, the print data signal SI1, the inspection timing signal TSIG, and the drive signal COM, which are input to the print head 22-1, propagate through the wiring substrate 420, and are input to the drive signal selection circuit 200. The drive signal selection circuit 200 selects or does not select a signal waveform of the drive signal COM based on the input clock signal SCK, latch signal LAT, change signal CH, print data signal SI1, and inspection timing signal TSIG, so that a drive signal Vin corresponding to each of the plurality of piezoelectric elements 60 is generated. Then, the drive signal selection circuit 200 outputs the generated drive signal Vin to each electrode 360 that is an individual electrode and is one end of each corresponding piezoelectric element 60 via the wiring substrate 420. In this case, the reference voltage signal VBS that propagates through the wiring substrate 420 is commonly input to the electrode 380 that is the other end of the plurality of piezoelectric elements 60 and is a common electrode. Then, each of the plurality of piezoelectric elements 60 is displaced by a potential difference between the drive signal Vin input to the electrode 360 and the reference voltage signal VBS input to the electrode 380. As a result, an amount of ink, corresponding to the displacement of the piezoelectric element 60, is ejected from the corresponding nozzle 321 of the print head 22-1.

Moreover, the drive signal selection circuit 200 acquires the residual vibration signal Vout generated after the piezoelectric element 60 is driven based on the clock signal SCK, the latch signal LAT, the change signal CH, the print data signal SI1, and the inspection timing signal TSIG. Then, the drive signal selection circuit 200 outputs the input residual vibration signal Vout. The residual vibration signal Vout output by the drive signal selection circuit 200 propagates through wiring Wo-1 and wiring Wo provided on the head substrate 520, and is output from the head unit 20.

In the print head 22-1 configured as described above, at least a part of the drive signal selection circuit 200 is mounted on the wiring substrate 420 of the print head 22-1 as the integrated circuit 421 described above.

Further, the temperature detection circuit 24 of the print head 22-1 detects the temperature of the print head 22-1. Then, the temperature detection circuit 24 acquires head temperature information tc1 of the voltage value according to the detected temperature of the print head 22-1, and generates a head temperature signal TC1 including the acquired head temperature information tc1. Then, the head temperature signal TC1 generated by the temperature detection circuit 24 propagates through wiring Wtc-1 provided on the head substrate 520, and is input to the temperature information output circuit 26. At least a part of the temperature detection circuit 24 that detects the temperature of the print head 22-1 is provided on the print head 22-1 as the resistance wiring 401 described above. That is, the head temperature information tc1 of the voltage value according to the temperature of the print head 22-1 output by the temperature detection circuit 24 includes the voltage value that changes depending on the resistance value of the resistance wiring 401 that changes due to the temperature. In other words, the temperature detection circuit 24 including the resistance wiring 401 detects the head temperature information tc1 corresponding to the temperature of the pressure chamber 312, and outputs the head temperature information tc1 as the head temperature signal TC1.

Moreover, the print heads 22-2 to 22-12 have the same configuration as the print head 22-1 except that the input signals and the output signals are different, and execute the same operation. Specifically, the print data signal SIi that propagates through wiring Wsi-i provided on the head substrate 520, the change signal CH that propagates through wiring Wch provided on the head substrate 520, the latch signal LAT that propagates through wiring Wlat provided on the head substrate 520, the clock signal SCK that propagates wiring Wsck provided on the head substrate 520, the inspection timing signal TSIG that propagates wiring Wtsig provided on the head substrate 520, the drive signal COM that propagates wiring Wcom provided on the head substrate 520, and the reference voltage signal VBS that propagates through wiring Wvbs provided on the head substrate 520 are input to the print head **22-*i* (i is any of 2 to 12). Then, the drive signal selection circuit 200 of the print head 22**-*i* selects or does not select a signal waveform of the drive signal COM based on the input clock signal SCK, latch signal LAT, change signal CH, print data signal SIi, and inspection timing signal TSIG, to generate the drive signal Vin corresponding to each of the plurality of piezoelectric elements 60 and output the drive signal Vin to the electrode 360 of the corresponding piezoelectric element 60, and to acquire the residual vibration signal Vout generated after the piezoelectric element 60 is driven and output the residual vibration signal Vout. Then, the residual vibration signal Vout output by the drive signal selection circuit 200 propagates through wiring Wo-i and wiring Wo provided on the head substrate 520, and is output from the head unit 20.

Moreover, the temperature detection circuit 24 of the print head 22-*i* acquires head temperature information tci of the voltage value in response to the temperature of the print head 22-*i*, and generates a head temperature signal TCi including the acquired head temperature information tci. The head temperature signal TCi generated by the temperature detection circuit 24 propagates through wiring Wtc-i provided on the head substrate 520, and is input to the temperature information output circuit 26. In this case, at least a part of the drive signal selection circuit 200 of the print head 22-*i* is mounted on the wiring substrate 420 of the print head 22-*i* as the integrated circuit 421 described above, and at least a part of the temperature detection circuit 24 of the print head 22-*i* is provided on the print head 22-*i* as the resistance wiring 401 described above.

In the following description, when it is not necessary to distinguish the print heads 22-1 to 22-12, the description is made in which the clock signal SCK, the latch signal LAT, the change signal CH, the print data signal SI serving as the print data signals SI1 to SI12, the inspection timing signal TSIG, the drive signal COM, and the reference voltage signal VBS are input to the print head 22. Then, the description is made in which the temperature detection circuit 24 of the print head 22 acquires the head temperature information TC as the head temperature information tc1 to tc12 of the voltage value in response to the temperature of the print head 22, and the print head 22 outputs the head temperature signal TC as the head temperature signals TC1 to TC12 including the acquired head temperature information tc.

The head temperature signals TC1 to TC12, which are output by the print heads 22-1 to 22-12, respectively, and propagate through the wirings Wtc-1 to Wtc-12, and the temperature acquisition request signal TD, which is output by the control circuit 100 and propagates through the wiring Wd provided on the head substrate 520, are input to the temperature information output circuit 26. The temperature information output circuit 26 generates the temperature information signal TI from signals based on the head temperature information tc1 to tc12 according to the input temperature acquisition request signal TD, and outputs the temperature information signal TI. The temperature information signal TI propagates through the wiring Wi provided on the head substrate 520 and is input to the control circuit 100.

As described above, in the liquid ejecting apparatus 1 of the present embodiment, the control circuit 100 outputs the control signal Ctrl-H, which includes the clock signal SCK, the latch signal LAT, the change signal CH, the print data signal SI, and the inspection timing signal TSIG, corrected based on the temperature information signal TI, and the drive circuit 50 outputs the drive signal COM corrected based on the temperature information signal TI. In addition, the head unit 20 ejects the ink by receiving the control signal Ctrl-H and the drive signal COM. In addition, the head unit 20 also includes the print heads 22-1 to 22-12 that eject the ink by receiving the control signal Ctrl-H and the drive signal COM, and the temperature information output circuit 26 that outputs the temperature information signal TI indicating the temperature of the print heads 22-1 to 22-12.

Configuration and Operation of Drive Signal Selection Circuit

Next, the configuration and operation of the drive signal selection circuit 200 will be described. As described above, the drive signal selection circuit 200 selects or does not select the signal waveform of the drive signal COM, which is output by the drive circuit 50, based on the input clock signal SCK, print data signal SI, latch signal LAT, change signal CH, and inspection timing signal TSIG, to generate the drive signal Vin, supply the drive signal Vin to the corresponding piezoelectric element 60, and acquire the residual vibration signal Vout generated after the piezoelectric element 60 is driven, and output the residual vibration signal Vout to the residual vibration detection circuit 54.

Figure 11:
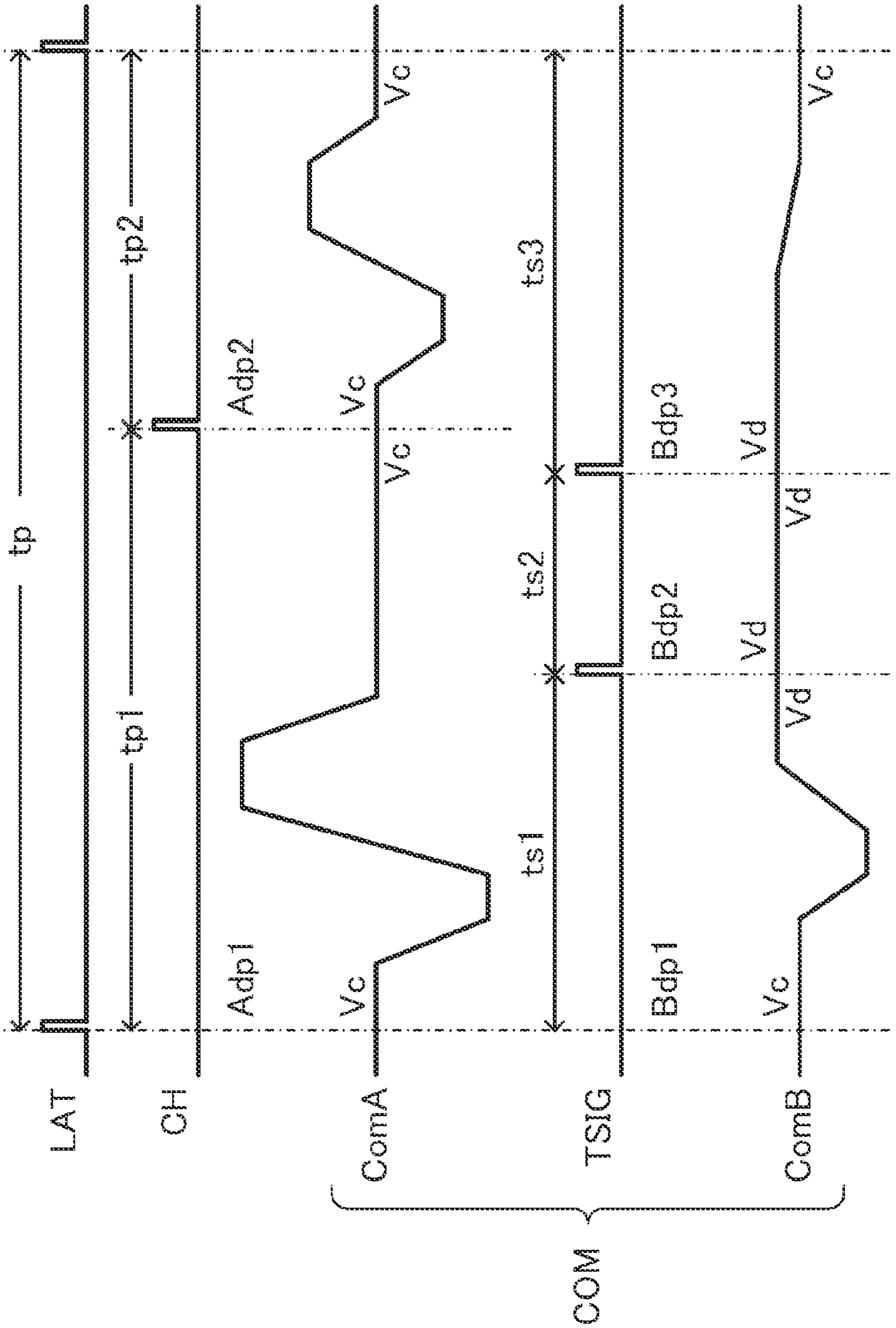
FIG. 11 is a diagram illustrating an example of a drive signal.

When describing the details of the drive signal selection circuit 200, a specific example of the drive signal COM output by the drive circuit 50 will be described. FIG. 11 is a diagram illustrating an example of the drive signal COM. As illustrated in FIG. 11, the drive signal COM includes a drive signal ComA and a drive signal ComB.

The drive signal ComA includes a signal waveform for expressing four gradations of "large dot LD", "medium dot MD", "small dot SD", and "non-recording ND" on the medium P. Specifically, the drive circuit 50 outputs the drive signal ComA including a drive waveform Adp1 and a drive waveform Adp2 in a print cycle tp until the latch signal LAT rises again after the latch signal LAT rises.

The drive waveform Adp1 of the drive signal ComA is disposed in a period tp1 from the rise of the latch signal LAT to the rise of the change signal CH in the print cycle tp. The drive waveform Adp1 is a signal waveform in which a voltage value is started with a voltage Vc and the voltage value ends with the voltage Vc after the voltage value changes such that the piezoelectric element 60 is driven, and is a signal waveform in which the piezoelectric element 60 is driven such that a predetermined amount of ink is ejected from the corresponding nozzle 321 when the drive waveform Adp1 is supplied to the electrode 360 of the piezoelectric element 60.

The drive waveform Adp2 of the drive signal ComA is disposed in a period tp2 from the rise of the change signal CH to the next rise of the latch signal LAT within the print cycle tp. The drive waveform Adp2 is a signal waveform in which a voltage value is started with a voltage Vc and the voltage value ends with the voltage Vc after the voltage value changes such that the piezoelectric element 60 is driven, and is a signal waveform in which the piezoelectric element 60 is driven such that the ink an amount of ink that is smaller than the predetermined amount is ejected from the corresponding nozzle 321 when the drive waveform Adp2 is supplied to the electrode 360 of the piezoelectric element 60.

In the following description, an amount of a predetermined amount of ink that is ejected from the corresponding nozzle 321 when the drive waveform Adp1 is supplied to the electrode 360 of the piezoelectric element 60 may be referred to as a medium amount, and an amount of ink that is smaller than the predetermined amount ejected from the corresponding nozzle 321 when the drive waveform Adp2 is supplied to the electrode 360 of the piezoelectric element 60 may be referred to as a small amount.

The drive signal ComB includes a signal waveform for performing the "inspection CD" on the nozzle 321 to be inspected among the plurality of nozzles 321. Specifically, the drive circuit 50 outputs, as the drive signal COM, the drive signal ComB including drive waveforms Bdp1, Bdp2, and Bdp3 within the print cycle tp.

The drive waveform Bdp1 of the drive signal ComB is disposed within a period ts1 from the rise of the latch signal LAT to the rise of the inspection timing signal TSIG in the print cycle tp. The drive waveform Bdp1 is a signal waveform in which a voltage value is started with a voltage Vc and the voltage value ends with the voltage Vd after the voltage value changes such that the piezoelectric element 60 is driven, and is a signal waveform in which the piezoelectric element 60 is driven such that the ink is not ejected from the corresponding nozzle 321 when the drive waveform Bdp1 is supplied to the electrode 360 of the piezoelectric element 60.

The drive waveform Bdp2 of the drive signal ComB is disposed within a period ts2 from the rise of the inspection timing signal TSIG for defining the period ts1 to the next rise of the inspection timing signal TSIG in the print cycle tp. The drive waveform Bdp2 has a signal waveform in which a voltage value is constant at a voltage Vd, and when the drive waveform Bdp2 is supplied to the electrode 360 of the piezoelectric element 60, the piezoelectric element 60 is not driven, and the ink is not ejected from the corresponding nozzle 321.

A drive waveform Bdp3 of the drive signal ComB is disposed within a period ts3 from the rise of the inspection timing signal TSIG for defining the period ts2 to the next rise of the latch signal LAT in the print cycle tp. The drive waveform Bdp3 is a signal waveform in which a voltage value is started with a voltage Vd, and then the voltage value ends with the voltage Vc, and when the drive waveform Bdp3 is supplied to the electrode 360 of the piezoelectric element 60, the piezoelectric element 60 is not driven, and the ink is not ejected from the corresponding nozzle 321.

The drive circuit 50 generates, as the drive signals COM, the drive signal ComA including the drive waveforms Adp1 and Adp2 for expressing four gradations of "large dot LD", "medium dot MD", "small dot SD", and "non-recording ND" on the medium P, and the drive signal ComB including the drive waveforms Bdp1, Bdp2 and Bdp3 for performing "inspection CD" on the nozzle 321 to be inspected among the plurality of nozzles 321, to output the drive signals ComA and ComB to the drive signal selection circuit 200. That is, the drive signal COM output by the drive circuit 50 includes the drive signal ComA and the drive signal ComB, in which the drive signal ComA includes the drive waveform Adp1 and the drive waveform Adp2, and the drive signal ComB includes the drive waveform Bdp1, the drive waveform Bdp2, and the drive waveform Bdp3.

The signal waveform of the drive signal COM illustrated in FIG. 11 is an example, and signal waveforms of various shapes are used according to a moving speed of the carriage 21 mounted with the print head 22, the type of medium P, the structure of the piezoelectric element 60, the characteristics of the ink, and the like.

The clock signal SCK, the print data signal SI, the latch signal LAT, the change signal CH, the inspection timing signal TSIG, and the drive signal COM are input to the drive signal selection circuit 200. Then, the drive signal selection circuit 200 selects or does not select the drive waveforms Adp1 and Adp2 of the drive signal ComA and the drive waveforms Bdp1, Bdp2, and Bdp3 of the drive signal Comb of the drive signal COM, which is output by the drive circuit 50, based on the clock signal SCK, the print data signal SI, the latch signal LAT, the change signal CH, and the inspection timing signal TSIG, to generate the drive signal Vin, supply the drive signal Vin to the corresponding piezoelectric element 60, acquire the residual vibration signal Vout generated after the piezoelectric element 60 is driven, and output the residual vibration signal Vout to the residual vibration detection circuit 54.

Figure 12:
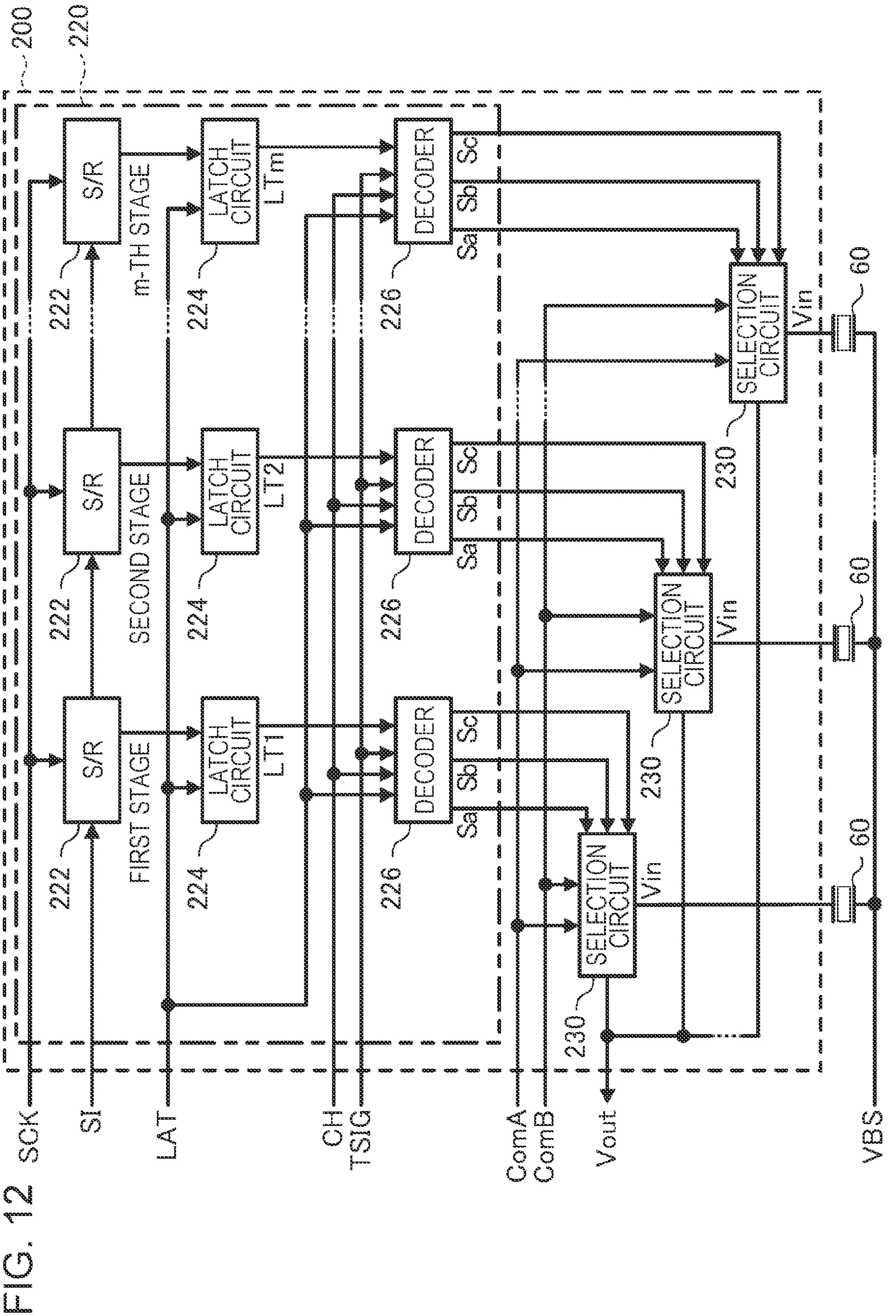
FIG. 12 is a diagram illustrating a functional configuration of a drive signal selection circuit.

FIG. 12 is a diagram illustrating a functional configuration of the drive signal selection circuit 200. As illustrated in FIG. 12, the drive signal selection circuit 200 includes a selection control circuit 220 and a plurality of selection circuits 230.

The clock signal SCK, the print data signal SI, the latch signal LAT, the change signal CH, and the inspection timing signal TSIG are input to the selection control circuit 220. Then, the selection control circuit 220 generates selection signals Sa, Sb, and Sc corresponding to the periods tp1, tp2, and tp1 to ts3, respectively, based on the clock signal SCK, the print data signal SI, the latch signal LAT, the change signal CH, and the inspection timing signal TSIG, to output the selection signals Sa, Sb, and Sc.

The selection control circuit 220 has a set of a shift register 222, a latch circuit 224, and a decoder 226 corresponding to each of the plurality of piezoelectric elements 60. In the following description, the description is made in which the print head 22 has m piezoelectric elements 60 and m nozzles 321. That is, the selection control circuit 220 of the drive signal selection circuit 200 has m sets of the shift register 222, the latch circuit 224, and the decoder 226. In other words, the selection control circuit 220 includes m shift registers 222, m latch circuits 224, and m decoders 226.

The print data signal SI includes 3-bit print data Sid [SIH, SIM, SIL] for selecting whether to drive the piezoelectric element 60 in the "large dot LD", the "medium dot MD", the "small dot SD", the "non-recording ND", or the "inspection CD", which is serially included corresponding to each of m piezoelectric elements 60. That is, the print data signal SI is a serial signal with a total of 3 m bits or more.

The print data signal SI is input to the selection control circuit 220 in synchronization with the clock signal SCK. The m shift registers 222 of the selection control circuit 220 hold the 3-bit print data SId [SIH, SIM, SIL] of the input print data signal SI corresponding to the piezoelectric element 60.

Specifically, the m shift registers 222 are coupled in cascade corresponding to each of the m piezoelectric elements 60. The print data signal SI that is serially input to the selection control circuit 220 is sequentially transferred to a subsequent stage of m shift register 222 coupled in cascade according to the clock signal SCK. Then, when the supply of the clock signal SCK to the selection control circuit 220 is stopped, 3-bit print data SId [SIH, SIM, SIL] corresponding to m piezoelectric elements 60 are held in m shift registers 222 corresponding to the m piezoelectric elements 60. In the following description, in order to distinguish m shift registers 222 coupled in cascade, the m shift registers 222 may be referred to as a first stage, a second stage, . . . , and m-th stage in the order from an upstream to a downstream in which the print data signal SI is supplied.

Each of m latch circuits 224 simultaneously latches the 3-bit print data SId [SIH, SIM, SIL] held by the corresponding shift register 222 at the rise of the latch signal LAT.

The print data SId [SIH, SIM, SIL] latched by m latch circuits 224 is input to the corresponding decoder 226. Each of m decoders 226 decodes the input print data SId [SIH, SIM, SIL], thereby generating the selection signals Sa, Sb, Sc corresponding to the "large dot LD", the "medium dot MD", the "small dot SD", the "non-recording ND", and the "inspection CD", and outputting the selection signals Sa, Sb, Sc to the corresponding selection circuit 230.

FIG. 13 is a diagram illustrating an example of decoding contents in the decoder 226. As illustrated in FIG. 13, when the print data SId [SIH, SIM, SIL]=[1, 1, 0] indicating the "large dot LD" is input to the decoder 226, the decoder 226 outputs a logic level of the selection signal Sa as a H level and a H level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3.

Further, when the print data Sid [SIH, SIM, SIL]=[1, 0, 0] indicating the "medium dot MD" is input to the decoder 226, the decoder 226 outputs a logic level of the selection signal Sa as a H level and an L level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3.

Further, when the print data Sid [SIH, SIM, SIL]=[0, 1, 0] indicating the "small dot SD" is input to the decoder 226, the decoder 226 outputs a logic level of the selection signal Sa as an L level and a H level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3.

Further, when the print data Sid [SIH, SIM, SIL]=[0, 0, 0] indicating the "non-recording ND" is input to the decoder 226, the decoder 226 outputs a logic level of the selection signal Sa as an L level and an L level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3.

Further, when the print data Sid [SIH, SIM, SIL]=[1, 1, 1] indicating the "inspection CD" is input to the decoder 226, the decoder 226 outputs a logic level of the selection signal Sa as an L level and an L level within the periods tp1 and tp2, outputs a logic level of the selection signal Sb as a H level, an L level, and a H level within the periods ts1, ts2, and ts3, and outputs a logic level of the selection signal Sc as an L level, a H level, and an L level within the periods ts1, ts2, and ts3.

As described above, the selection control circuit 220 generates the selection signals Sa, Sb, and Sc having logic levels, respectively, corresponding to the m piezoelectric elements 60. Then, the selection control circuit 220 outputs the generated selection signals Sa, Sb, and Sc to the corresponding selection circuits 230.

Figure 14:
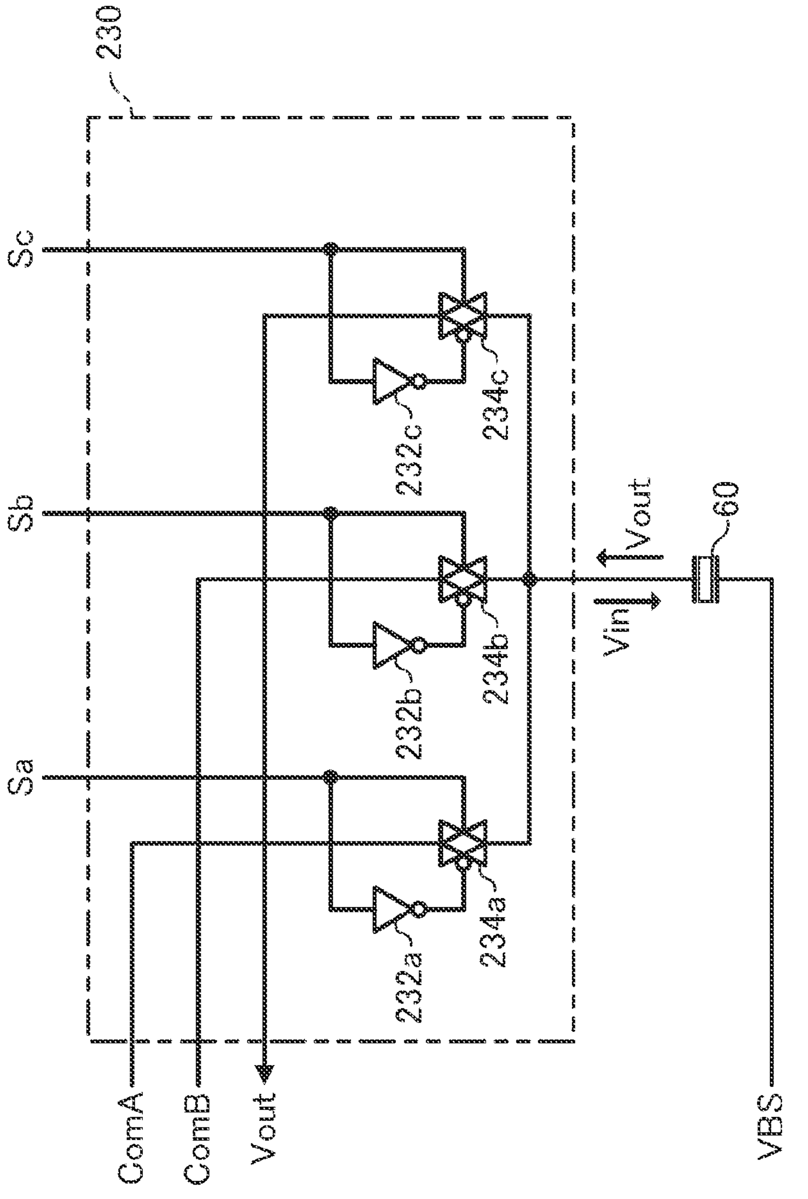
FIG. 14 is a diagram illustrating a configuration of a selection circuit corresponding to one piezoelectric element.

The selection circuit 230 is provided corresponding to each of m piezoelectric elements 60. That is, the drive signal selection circuit 200 includes m selection circuits 230. FIG. 14 is a diagram illustrating a configuration of the selection circuit 230 corresponding to one piezoelectric element 60. As illustrated in FIG. 14, the selection circuit 230 include logic inversion circuits 232*a*, 232*b*, and 232*c* and transfer gates 234*a*, 234*b*, and 234*c*.

The selection signal Sa is supplied to the positive control end of the transfer gate 234*a*, is logically inverted by the logic inversion circuit 232*a*, and is supplied to the negative control end of the transfer gate 234*a*. The selection signal Sb is supplied to the positive control end of the transfer gate 234*b*, is logically inverted by the logic inversion circuit 232*b*, and is supplied to the negative control end of the transfer gate 234*b*. The selection signal Sc is supplied to the positive control end of the transfer gate 234*c*, is logically inverted by the logic inversion circuit 232*c*, and is supplied to the negative control end of the transfer gate 234*c*.

Moreover, the drive signal ComA is supplied to an input end of the transfer gate 234*a*, and the drive signal ComB is supplied to an input end of the transfer gate 234*b*. Output ends of the transfer gates 234*a* and 234*b* are coupled to each other and are coupled to the electrode 360, which is one end of the piezoelectric element 60. The input end of the transfer gate 234*c* is coupled to the electrode 360 of the piezoelectric element 60 together with the output ends of the transfer gates 234*a* and 234*b*. As illustrated in FIG. 12, the output end of the transfer gate 234*c* is commonly coupled to the output end of the transfer gate 234*c* of m selection circuits 230 of the drive signal selection circuit 200.

The transfer gate 234*a* conducts the input end and the output end to each other when the logic level of the selection signal Sa is a H level, and does not conduct the input end and the output end to each other when the logic level of the selection signal Sa is an L level. The transfer gate 234*b* conducts the input end and the output end to each other when the logic level of the selection signal Sb is a H level, and does not conduct the input end and the output end to each other when the logic level of the selection signal Sb is an L level. The transfer gate 234*c* conducts the input end and the output end to each other when the logic level of the selection signal Sc is a H level, and does not conduct the input end and the output end to each other when the logic level of the selection signal Sc is an L level. In the following description, the conduction between the input end and the output end may be referred to as "turned-on", and the non-conduction between the input end and the output end may be referred to as "turned-off".

The transfer gate 234*a* is turned on to output the drive signal ComA from the drive signal selection circuit 200 as the drive signal Vin, and the transfer gate 234*b* is turned on to output the drive signal ComB from the drive signal selection circuit 200 as the drive signal Vin. The drive signal Vin output from the drive signal selection circuit 200 is supplied to the electrode 360 which is one end of the piezoelectric element 60. In addition, when the transfer gate 234*c* is turned on, the residual vibration signal Vout generated in accordance with the drive of the piezoelectric element 60 is acquired by the drive signal selection circuit 200. The drive signal selection circuit 200 outputs the acquired residual vibration signal Vout to the residual vibration detection circuit 54.

Figure 15:
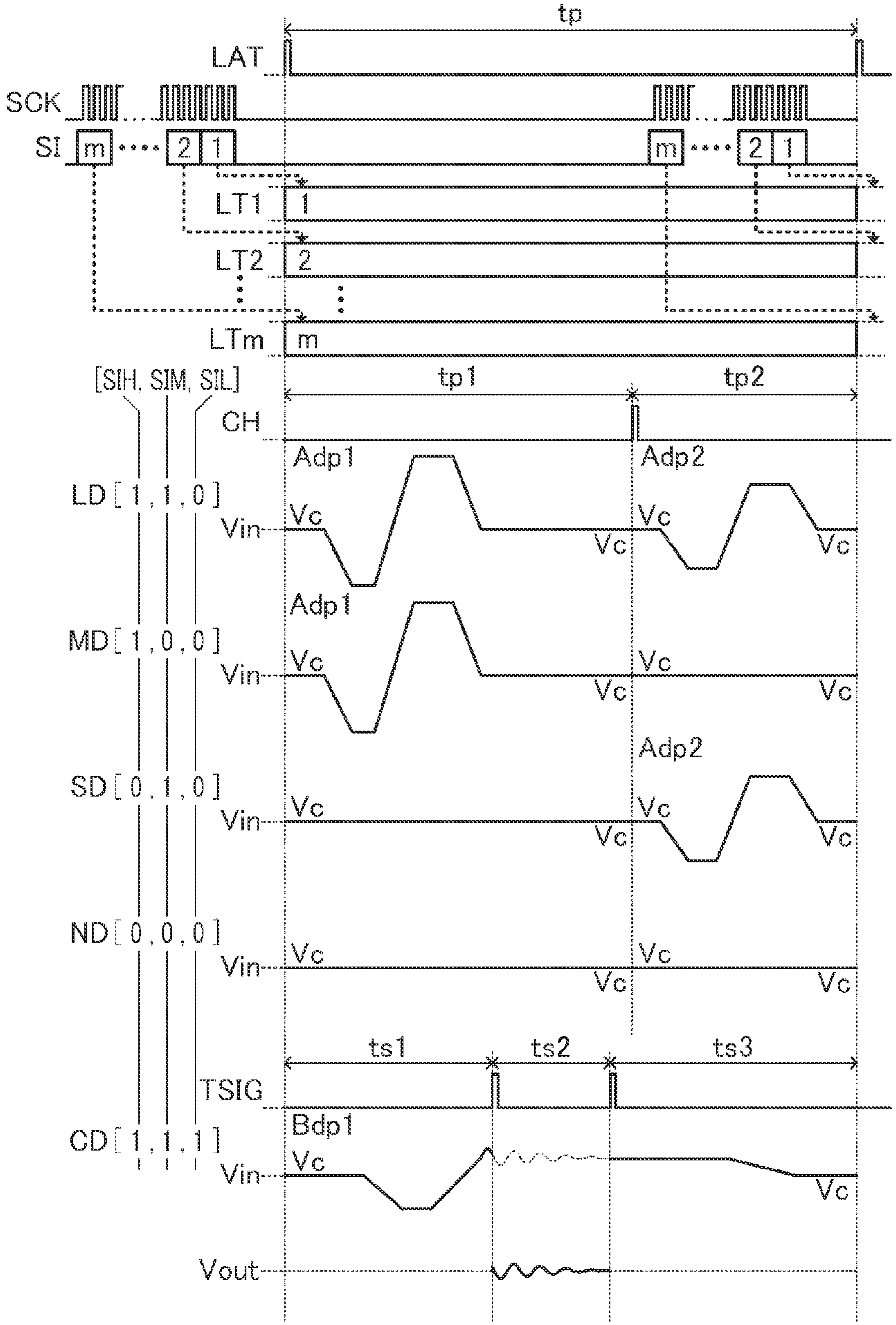
FIG. 15 is a diagram illustrating an example of an operation of the drive signal selection circuit.

The operation of the drive signal selection circuit 200 configured as described above will be described in detail. FIG. 15 is a diagram illustrating an example of an operation of the drive signal selection circuit 200. The print data signals SI are serially supplied to the drive signal selection circuit 200 in synchronization with the clock signal SCK and sequentially transferred in the shift register 222 that corresponds to the piezoelectric element 60. In addition, when the supply of the clock signal SCK is stopped, the 3-bit print data SId [SIH, SIM, SIL] that corresponds to the piezoelectric element 60 is held in each of the shift registers 222.

Thereafter, when the latch signal LAT rises, each of the latch circuits 224 simultaneously latches the print data SId [SIH, SIM, SIL] held in the shift register 222. In FIG. 15, LT1, LT2, . . . , and LTm indicate the print data SId [SIH, SIM, SIL] held by the shift registers 222 of the first stage, the second stage, . . . , the m-th stage and latched by the corresponding latch circuit 224.

The decoder 226 outputs the logic levels of the selection signals Sa, Sb, and Sc in the print cycle tp with the contents illustrated in FIG. 13, according to the latched print data SId [SIH, SIM, SIL].

When the print data SId [SIH, SIM, SIL]=[1, 1, 0], the decoder 226 outputs a logic level of the selection signal Sa as a H level and a H level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3. Accordingly, the selection circuit 230 selects the drive waveform Adp1 of the drive signal ComA within the period tp1, and selects the drive waveform Adp2 of the drive signal ComA within the period tp2. As a result, the drive signal selection circuit 200 outputs the drive signal Vin that corresponds to the "large dot LD" illustrated in FIG. 15. When the drive signal Vin corresponding to the "large dot LD" is supplied to the piezoelectric element 60, a medium amount of ink is ejected from the corresponding nozzle 321 within the period tp1, and a small amount of ink is ejected from the corresponding nozzle 321 within the period tp2. As a result, in the print cycle tp, a medium amount of ink and a small amount of ink landing on the medium P are combined to form a large dot LD on the medium P.

When the print data Sid [SIH, SIM, SIL]=[1, 0, 0], the decoder 226 outputs a logic level of the selection signal Sa as a H level and an L level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3. Accordingly, the selection circuit 230 selects the drive waveform Adp1 of the drive signal ComA within the period tp1, and selects neither of the drive signals ComA and ComB within the period tp2. As a result, the drive signal selection circuit 200 outputs the drive signal Vin that corresponds to the "medium dot MD" illustrated in FIG. 15. When the drive signal Vin corresponding to the "medium dot MD" is supplied to the piezoelectric element 60, a medium amount of ink is ejected from the corresponding nozzle 321 within the period tp1, and the ink is not ejected from the corresponding nozzle 321 within the period tp2. As a result, in the print cycle tp, a medium amount of ink lands on the medium P, and the medium dot MD is formed at the medium P.

When the print data Sid [SIH, SIM, SIL]=[0, 1, 0], the decoder 226 outputs a logic level of the selection signal Sa as an L level and a H level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3. Accordingly, the selection circuit 230 selects neither of the drive signals ComA and ComB within the period tp1, and selects the drive waveform Adp2 of the drive signal ComA within the period tp2. As a result, the drive signal selection circuit 200 outputs the drive signal Vin that corresponds to the "small dot SD" illustrated in FIG. 15. When the drive signal Vin corresponding to the "small dot SD" is supplied to the piezoelectric element 60, the ink is not ejected from the corresponding nozzle 321 within the period tp1, and a small amount of ink is ejected from the corresponding nozzle 321 within the period tp2. As a result, in the print cycle tp, a small amount of ink lands on the medium P, and the small dot SD is formed at the medium P.

When the print data Sid [SIH, SIM, SIL]=[0, 0, 0], the decoder 226 outputs a logic level of the selection signal Sa as an L level and an L level within the periods tp1 and tp2, outputs a logic level of the selection signal Sb as an L level, an L level, and an L level within the periods ts1, ts2, and ts3, and outputs a logic level of the selection signal Sc as an L level, an L level, and an L level within the periods ts1, ts2, and ts3. Accordingly, the selection circuit 230 selects neither of the drive signals ComA and ComB within the period tp1, and selects neither of the drive signals ComA and ComB within the period tp2. As a result, the drive signal selection circuit 200 outputs the drive signal Vin that corresponds to the "non-recording ND" illustrated in FIG. 15. When the drive signal Vin corresponding to the "non-recording ND" is supplied to the piezoelectric element 60, the ink is not ejected from the corresponding nozzle 321 within the period tp1, and the ink is not ejected from the corresponding nozzle 321 within the period tp2. As a result, in the print cycle tp, the ink does not land on the medium P, and dots are not formed at the medium P.

When the print data Sid [SIH, SIM, SIL]=[1, 1, 1], the decoder 226 outputs a logic level of the selection signal Sa as an L level and an L level within the periods tp1 and tp2, outputs a logic level of the selection signal Sb as a H level, an L level, and a H level within the periods ts1, ts2, and ts3, and outputs a logic level of the selection signal Sc as an L level, a H level, and an L level within the periods ts1, ts2, and ts3. As a result, the selection circuit 230 selects the drive waveform Bdp1 of the drive signal ComB within the period ts1, acquires the residual vibration signal Vout generated after the drive waveform Bdp1 is supplied to the piezoelectric element 60 within the period ts2, and outputs the residual vibration signal Vout from the drive signal selection circuit 200 to select the drive waveform Bdp3 of the drive signal ComB within the period ts3. As a result, the drive signal selection circuit 200 outputs the drive signal Vin corresponding to the "inspection CD" illustrated in FIG. 15 to the piezoelectric element 60 within the periods ts1 and ts3, and acquires the residual vibration signal Vout generated after the drive waveform Bdp1 is supplied to the piezoelectric element 60 within the period ts2. Then, the drive signal selection circuit 200 outputs the acquired residual vibration signal Vout to the residual vibration detection circuit 54. In this case, in the print cycle tp, the ink is not ejected from the corresponding nozzle 321, and therefore, dots are not formed at the medium P.

As described above, the drive signal selection circuit 200 selects or does not select the drive waveforms Adp1 and Adp2 of the drive signal ComA and the drive waveforms Bdp1, Bdp2, and Bdp3 of the drive signal Comb of the drive signal COM, which is output by the drive circuit 50, based on the clock signal SCK, the print data signal SI, the latch signal LAT, the change signal CH, and the inspection timing signal TSIG, to generate the drive signal Vin, supply the drive signal Vin to the corresponding piezoelectric element 60, and output the residual vibration signal Vout, which is generated after the piezoelectric element 60 is driven in accordance with the drive signal Vin, to the residual vibration detection circuit 54.

As described above, in the control signal Ctrl-H input to the print head 22 of the head unit 20, the latch signal LAT is a signal for defining the print cycle tp, which is an ejection cycle of the ink from the print head 22, the change signal CH is a signal for defining the switching timing between the drive waveform Adp1 and the drive waveform Adp2 of the drive signal ComA supplied to the print head 22, the print data signal SI is a signal for defining the waveform selection of the drive waveforms Adp1, Adp2, Adp3, Bdp1, Bdp2, and Bdp3, which are signal waveforms of the drive signals ComA and ComB supplied to the print head 22, and the inspection timing signal TSIG is a signal for defining a timing when the residual vibration signal Vout is acquired as inspection of the ejection state of the ink from the nozzle 321.

A relationship between the residual vibration signal Vout acquired by the drive signal selection circuit 200 and the ejection state of the ink from the nozzle 321 will be described. When the drive signal Vin is supplied to the piezoelectric element 60, the vibration plate 350 is displaced, and the internal pressure of the pressure chamber 312 changes. When the supply of the drive signal Vin to the piezoelectric element 60 is subsequently stopped, damped vibration occurs in the vibration plate 350 in accordance with the change in the internal pressure of the pressure chamber 312. In this case, the piezoelectric element 60 is displaced by the damped vibration of the vibration plate 350. As a result, a signal in response to the damped vibration from the piezoelectric element 60 is output from the drive signal selection circuit 200 as the residual vibration signal Vout, and is input to the residual vibration detection circuit 54.

Figure 16:
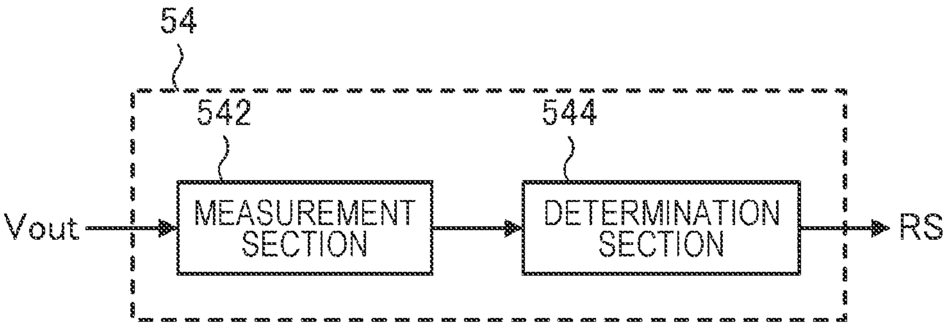
FIG. 16 is a diagram illustrating a functional configuration of a residual vibration detection circuit.

FIG. 16 is a diagram illustrating a functional configuration of the residual vibration detection circuit 54. As illustrated in FIG. 16, the residual vibration detection circuit 54 includes a measurement section 542 and a determination section 544.

The residual vibration signal Vout is input to the measurement section 542. The measurement section 542 calculates the cycle, the amplitude, and the like of the residual vibration signal Vout, and outputs a calculation result to the determination section 544. The determination section 544 determines the ejection state of the ink from the nozzle 321 to be inspected based on the calculation results such as the cycle and the amplitude of the residual vibration signal Vout calculated by the measurement section 542. Then, the determination section 544 generates a determination result signal RS representing the determination result and outputs the determination result signal RS to the control circuit 100.

Figure 17:
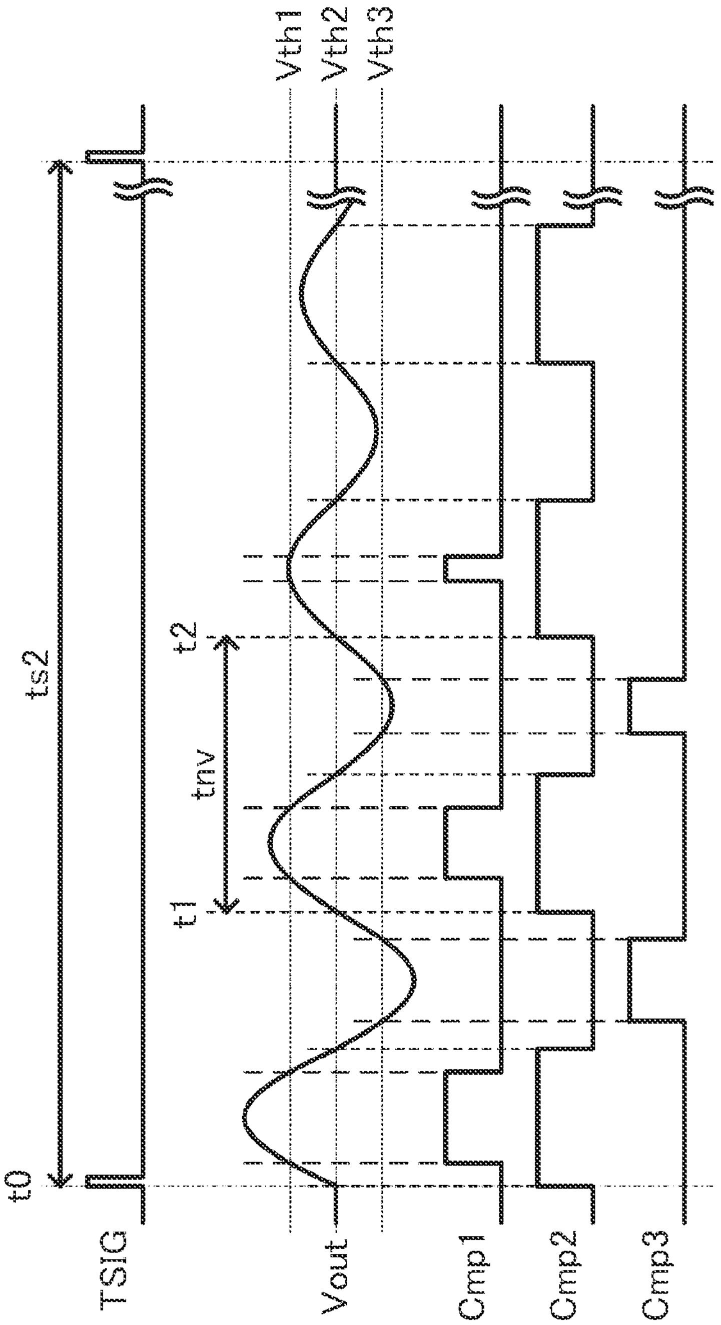
FIG. 17 is a diagram for explaining an example of an operation of a measurement section.

FIG. 17 is a diagram for explaining an example of an operation of the measurement section 542. As illustrated in FIG. 17, when the print data Sid [SIH, SIM, SIL]=[1, 1, 1] corresponding to the nozzle 321 to be inspected and the piezoelectric element 60, the selection control circuit 220 outputs a logic level of the selection signal Sa as an L level and an L level within the periods tp1 and tp2, outputs a logic level of the selection signal Sb as a H level, an L level, and a H level within the periods ts1, ts2, and ts3, and outputs a logic level of the selection signal Sc as an L level, a H level, and an L level within the periods ts1, ts2, and ts3. Therefore, the drive signal selection circuit 200 acquires the residual vibration signal Vout within the period ts2 and outputs the residual vibration signal Vout to the residual vibration detection circuit 54.

The residual vibration signal Vout output by the drive signal selection circuit 200 is input to the measurement section 542 of the residual vibration detection circuit 54. The measurement section 542 compares the input residual vibration signal Vout with a threshold potential Vth2, which is a potential at an amplitude center level of the residual vibration signal Vout, a threshold potential Vth1, which is higher than the threshold potential Vth2, and a threshold potential Vth3, which is lower than the threshold potential Vth2. Then, the measurement section 542 generates a comparison signal Cmp1 that becomes a high level when the potential of the residual vibration signal Vout is equal to or higher than the threshold potential Vth1, a comparison signal Cmp2 that becomes a high level when the potential of the residual vibration signal Vout is equal to or higher than the threshold potential Vth2, and a comparison signal Cmp3 that becomes a high level when the potential of the residual vibration signal Vout is less than the threshold potential Vth3.

A measurement section 542 measures a time tnv from a time t1 at which the comparison signal Cmp2 first falls to an L level and then rises to a H level after the start time t0 of the period ts2 to a time t2 at which the comparison signal Cmp2 first falls to an L level and then rises to a H level after the time t1, and outputs the time tnv to the determination section 544.

Further, when the ink is not normally ejected from the nozzle 321 to be inspected because the pressure chamber 312 is not filled with the ink or the like, the amplitude of the residual vibration signal Vout becomes small. The measurement section 542 generates an amplitude determination value Ap which is set to "1" when the comparison signal Cmp1 is at a high level within any of the periods from time t1 to time t2 and the comparison signal Cmp3 is at a high level within any of the periods from time t1 to time t2, and which is set to "0" in other cases, and outputs the amplitude determination value Ap to the determination section 544.

The determination section 544 determines whether or not ejection abnormality has occurred in the nozzle 321 to be inspected based on the time tnv and the amplitude determination value Ap input from the measurement section 542, and when the ejection abnormality has occurred, the determination section 544 determines the cause of ejection abnormality and outputs the determination result signal RS indicating the determination result to the control circuit 100.

In this case, the causes of ejection abnormality in which the ink is not normally ejected from the corresponding nozzle 321 even though the operation for ejecting the ink is performed includes: (1) mixing of air bubbles into the pressure chamber 312, (2) thickening of the ink in the pressure chamber 312 caused by drying or the like, (3) adhesion of foreign matter such as paper dust to the vicinity of the outlet of the nozzle 321, and the like.

When air bubbles are mixed in the pressure chamber 312, it is considered that the total weight of the ink filling the pressure chamber 312 decreases and the inertance decreases. In addition, when air bubbles adhere near the nozzle 321, it is assumed that the diameter of the nozzle 321 is increased by the size of the diameter, and thus, it is considered that the acoustic resistance is reduced. Therefore, when the ejection abnormality occurs due to air bubbles mixed in the pressure chamber 312, the frequency of the residual vibration signal Vout is higher than when the ejection state is normal. Accordingly, when the ejection abnormality occurs due to air bubbles mixed in the pressure chamber 312, the time tnv becomes less than a predetermined threshold time Tth1.

Further, when the ink near the nozzle 321 dries and thickened, the ink in the pressure chamber 312 becomes confined in the pressure chamber 312. In such a case, it is considered that the acoustic resistance increases. Therefore, when the ink near the nozzle 321 in the pressure chamber 312 is thickened, the frequency of the residual vibration signal Vout becomes lower than when the ejection state is normal. Therefore, when the ink near the nozzle 321 in the pressure chamber 312 is thickened, the time tnv becomes longer than a predetermined threshold time Tth3.

Moreover, when foreign matter such as paper dust adheres near the outlet of the nozzle 321, ink seeps out from inside the pressure chamber 312 via the foreign matter such as paper dust, and thus it is considered that the inertance increases. In addition, it is considered that the acoustic resistance increases due to the fibers of the paper dust adhering near the outlet of the nozzle 321. Therefore, when foreign matter such as paper dust adheres near the outlet of the nozzle 321, the frequency of the residual vibration signal Vout is lower than when the ejection state is normal, and is higher than when the ink near the nozzle 321 in the pressure chamber 312 is thickened. Therefore, when foreign matter such as paper dust adheres near the outlet of the nozzle 321, the time tnv is longer than a predetermined threshold time Tth2 and is equal to or less than the threshold time Tth3 described above.

When the ejection abnormality due to the causes (1) to (3) does not occur, that is, when the ink ejection from the nozzle 321 is normal, the time tnv is equal to or longer than the threshold time Tth1 and equal to or shorter than the threshold time Tth2.

As described above, the determination section 544 determines the ejection state of the ink from the nozzle 321 to be inspected based on the time tnv corresponding to the cycle of the residual vibration signal Vout and the amplitude determination value Ap of the residual vibration signal Vout. FIG. 18 is a diagram illustrating an example of a determination logic of the ejection state of the ink from the nozzle 321 by the determination section 544.

When the input amplitude determination value Ap is "0", the determination section 544 determines that some ejection abnormality such as the pressure chamber 312 not being filled with the ink occurred although the cause cannot be specified, and sets the determination result signal RS to "5". Thereafter, the determination section 544 determines the ejection state of the ink from the nozzle 321 based on the time tnv. Specifically, when the time tnv is shorter than the threshold time Tth2, the determination section 544 determines that the ejection abnormality has occurred in due to air bubbles, and sets the determination result signal RS to "2". Further, when the time tnv is equal to or longer than the threshold time Tth1 and equal to or shorter than the threshold time Tth2, the determination section 544 determines that the ejection state of the ink from the nozzle 321 is normal, and sets the determination result signal RS to "1". Further, when the time tnv is longer than the threshold time Tth2 and equal to or shorter than the threshold time Tth3, the determination section 544 determines that ejection abnormality has occurred due to adhesion of foreign matter, and sets the determination result signal RS to "3". Further, when the time tnv is longer than the threshold time Tth3, the determination section 544 determines that the ejection abnormality has occurred due to thickening, and sets the determination result signal RS to "4".

The determination section 544 outputs the determination result signal RS in which "1" to "5" are set to the control circuit 100. Accordingly, the residual vibration detection circuit 54 determines whether or not the ejection abnormality has occurred in the nozzle 321 to be inspected, and when the ejection abnormality has occurred, the cause of the ejection abnormality is determined. Then, the determination result signal RS in which "1" to "5" is set is output to the control circuit 100 as a signal indicating the determination result.

That is, the residual vibration signal Vout, which is acquired and output by the drive signal selection circuit 200, is a signal according to the ejection state of the ink from the print head 22, and the residual vibration detection circuit 54 determines a state of the nozzle 321 to be inspected based on the input residual vibration signal Vout.

Configuration and Operation of Temperature Information Output Circuit

Figure 19:
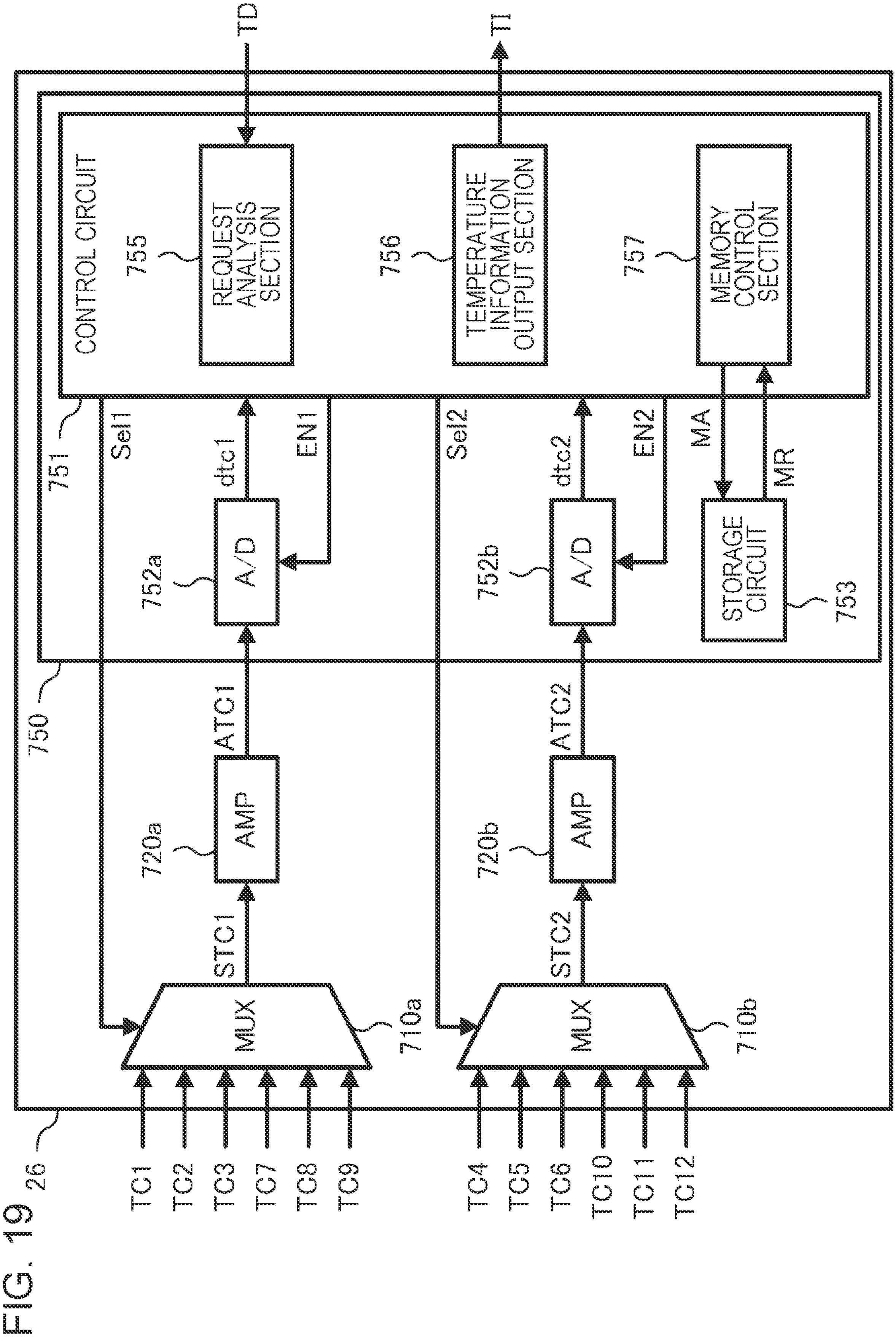
FIG. 19 is a diagram illustrating an example of a functional configuration of a temperature information output circuit.

Next, a configuration and an operation of the temperature information output circuit 26 will be described. FIG. 19 is a diagram illustrating an example of a functional configuration of the temperature information output circuit 26. The temperature information output circuit 26 acquires the head temperature signals TC1 to TC12 output by the print heads 22-1 to 22-12, respectively, and generates the temperature information signal TI based on the head temperature information tc1 to tc12 of the head temperature signals TC1 to TC12, respectively, according to the temperature acquisition request signal TD. Then, the temperature information output circuit 26 outputs the generated temperature information signal TI to the control circuit 100 as a signal corresponding to the temperature of the print heads 22-1 to 22-12.

As illustrated in FIG. 19, the temperature information output circuit 26 includes the temperature information selection circuits 710*a* and 710*b*, the amplification circuits 720*a* and 720*b*, and the output control circuit 750.

The temperature information selection circuit 710*a* includes, for example, a multiplexer. The head temperature signals TC1 to TC3 and TC7 to TC9 and a selector signal Sel1 are input to the temperature information selection circuit 710*a*. Then, the temperature information selection circuit 710*a* selects one of the head temperature signals TC1 to TC3 and TC7 to TC9 based on the selector signal Sel1, or does not select any of the head temperature signals TC1 to TC3 and TC7 to TC9, and outputs one of the head temperature signals TC1 to TC3 and TC7 to TC9 as a selection temperature signal STC1. When neither of the head temperature signals TC1 to TC3 and TC7 to TC9 is selected, the temperature information selection circuit 710*a* outputs a signal whose logic level is an L level as the selection temperature signal STC1. The selection temperature signal STC1, which is output when the temperature information selection circuit 710*a* does not select any of the head temperature signals TC1 to TC3 and TC7 to TC9, may be a signal having a constant voltage value, and the logic level is not limited to a constant signal at an L level.

The amplification circuit 720*a* includes, for example, an operational amplifier. The selection temperature signal STC1 output by the temperature information selection circuit 710*a* is input to the amplification circuit 720*a*. Then, the amplification circuit 720*a* outputs the amplification temperature signal ATC1 obtained by amplifying the input selection temperature signal STC1.

The temperature information selection circuit 710*b* includes, for example, a multiplexer. The head temperature signals TC4 to TC6 and TC10 to TC12 and a selector signal Sel2 are input to the temperature information selection circuit 710*b*. Then, the temperature information selection circuit 710*b* selects one of the head temperature signals TC4 to TC6 and TC10 to TC12 based on the selector signal Sel2, or does not select any of the head temperature signals TC4 to TC6 and TC10 to TC12, and outputs one of the head temperature signals TC4 to TC6 and TC10 to TC12 as a selection temperature signal STC2. When neither of the head temperature signals TC4 to TC6 and TC10 to TC12 is selected, the temperature information selection circuit 710*b* outputs a signal whose logic level is an L level as the selection temperature signal STC2. The selection temperature signal STC2, which is output when the temperature information selection circuit 710*b* does not select any of the head temperature signals TC4 to TC6 and TC10 to TC12, may be a signal having a constant voltage value, and the logic level is not limited to a constant signal at an L level.

The amplification circuit 720*b* includes, for example, an operational amplifier. The selection temperature signal STC2 output by the temperature information selection circuit 710*b* is input to the amplification circuit 720*b*. Then, the amplification circuit 720*b* outputs the amplification temperature signal ATC2 obtained by amplifying the input selection temperature signal STC2.

The output control circuit 750 includes a control circuit 751, AD conversion circuits 752*a* and 752*b*, and a storage circuit 753. The temperature acquisition request signal TD and the amplification temperature signals ATC1 and ATC2 input from the control circuit 100 are input to the output control circuit 750. Then, the output control circuit 750 calculates the temperature of the print head 22 selected by the input temperature acquisition request signal TD based on the amplification temperature signals ATC1 and ATC2, and outputs the temperature information signal TI indicating the temperature.

The amplification temperature signal ATC1 output by the amplification circuit 720*a* and an enable signal EN1 output by the control circuit 751 are input to the AD conversion circuit 752*a*. The AD conversion circuit 752*a* converts the amplification temperature signal ATC1, which is input within a period in which the input enable signal EN1 is validated, into a digital signal, and outputs the digital signal. That is, the AD conversion circuit 752*a* generates and outputs a digital signal according to the temperature of the print head 22 selected by the temperature information selection circuit 710*a* within the period in which the enable signal EN1 is validated, which is a digital signal based on the voltage value of the head temperature information tc of the head temperature signal TC that is input within the period in which the enable signal EN1 is validated, among the head temperature signals TC selected by the temperature information selection circuit 710*a*. In the following description, the digital signal output by the AD conversion circuit 752*a* may be referred to as digital temperature information dtc1.

The amplification temperature signal ATC2 output by the amplification circuit 720*b* and an enable signal EN2 output by the control circuit 751 are input to the AD conversion circuit 752*b*. The AD conversion circuit 752*b* converts the amplification temperature signal ATC2, which is input within a period in which the input enable signal EN2 is validated, into a digital signal, and outputs the digital signal. That is, the AD conversion circuit 752*b* generates and outputs a digital signal according to the temperature of the print head 22 selected by the temperature information selection circuit 710*b* within the period in which the enable signal EN2 is validated, which is a digital signal based on the voltage value of the head temperature information tc of the head temperature signal TC that is input within the period in which the enable signal EN2 is validated, among the head temperature signals TC selected by the temperature information selection circuit 710*b*. In the following description, the digital signal output by the AD conversion circuit 752*b* may be referred to as digital temperature information dtc2.

The control circuit 751 includes a request analysis section 755, a temperature information output section 756, and a memory control section 757.

The temperature acquisition request signal TD is input to the request analysis section 755. The request analysis section 755 analyzes the input temperature acquisition request signal TD, and outputs the selector signals Sel1 and Sel2, the enable signals EN1 and EN2, and a memory control signal MA to be described later according to the analysis result.

The temperature information output section 756 outputs the temperature of the print head 22 according to the analysis result of the temperature acquisition request signal TD in the request analysis section 755 as the temperature information signal TI. For example, when the temperature acquisition request signal TD includes an acquisition request of the temperature of the print head 22-*p* (p is any of 1 to 12), the temperature information output section 756 calculates the temperature of the print head 22-*p* from at least one of the digital temperature information dtc1, the digital temperature information dtc2, and information stored in the storage circuit 753 according to the analysis result of the temperature acquisition request signal TD in the request analysis section 755, and outputs the temperature information signal TI including the calculation result.

The memory control section 757 generates the memory control signal MA for controlling the storage circuit 753, outputs the memory control signal MA to the storage circuit 753, and acquires a response of the storage circuit 753 to the memory control signal MA as a memory read signal MR. For example, a memory control section 757 associates the input digital temperature information dtc1 and dtc2 with the print heads 22-1 to 22-12, generates the memory control signal MA for storing in the storage circuit 753, and outputs the memory control signal to the storage circuit 753. As a result, the digital temperature information dtc1 and dtc2 are stored in the storage circuit 753 while being associated with any of the print heads 22-1 to 22-12. In addition, the memory control section 757 generates the memory control signal MA for reading the digital temperature information dtc1 or the digital temperature information dtc2 corresponding to the print head 22-*p* from the storage circuit 753, and outputs the memory control signal MA to the storage circuit 753. The storage circuit 753 reads the digital temperature information dtc1 or the digital temperature information dtc2 corresponding to the print head 22-*p* based on the input memory control signal MA, and outputs the digital temperature information dtc1 or the digital temperature information dtc2 as the memory read signal MR. By acquiring the memory read signal MR, the memory control section 757 acquires the digital temperature information dtc1 or the digital temperature information dtc2 corresponding to the print head 22-*p*.

The temperature information output circuit 26 configured as described above acquires the head temperature signals TC1 to TC12 output by the print heads 22-1 to 22-12, respectively. Then, the temperature information output circuit 26 calculates the temperature of the corresponding print heads 22-1 to 22-12 based on the acquired head temperature signals TC1 to TC12, and outputs the temperature information signal TI including the calculation result.

As described above, in the print head 22 of the present embodiment, the temperature detection circuit 24 including the resistance wiring 401 provided inside the print head 22 detects the temperature of the ink stored in the pressure chamber 312, which is the temperature of the pressure chamber 312 of the print head 22. That is, the temperature detection circuit 24 detects the temperature of the ink located near the pressure chamber 312 and stored in the pressure chamber 312. Accordingly, the temperature detection circuit 24 can accurately detect the temperature of the ink stored in the pressure chamber 312, which is the temperature of the pressure chamber 312 in the temperature detection circuit 24.

Meanwhile, when the temperature detection circuit 24 including the resistance wiring 401 provided inside the print head 22 is located near the pressure chamber 312 of the print head 22 and detects the temperature of the ink stored in the pressure chamber 312, which is the temperature of the corresponding pressure chamber 312, the resistance wiring 401 of the temperature detection circuit 24 includes a thin and long wiring pattern in terms of improving detection accuracy of the temperature of the temperature detection circuit 24 and reducing the size of the print head 22. In this manner, in terms of reducing the risk of abnormality such as disconnection of the resistance wiring 401, it is difficult to increase the voltage value of the voltage signal supplied to the resistance wiring 401, and as a result, the voltage value of the head temperature signal TC output by the temperature detection circuit 24 becomes small. Furthermore, in the temperature detection circuit 24 of the present embodiment, which uses a characteristic that the resistance value of the resistance wiring 401 changes depending on the temperature to output the head temperature signal TC having a voltage value that changes depending on the temperature, the voltage value of the head temperature signal TC output by the temperature detection circuit 24 is a low voltage. Therefore, the amount of change of the voltage value of the head temperature signal TC according to the temperature change of the pressure chamber 312 is also reduced.

That is, the temperature detection circuit 24 including the resistance wiring 401 provided inside the print head 22 is applied to detect the temperature of the ink stored in the pressure chamber 312, which is the temperature of the pressure chamber 312 of the print head 22, the voltage value of the head temperature signal TC output by the temperature detection circuit 24 becomes small, and the amount of change in the voltage value with respect to the change in the temperature detected by the temperature detection circuit 24 is also reduced. As a result, there is a risk that the influence of noise on the head temperature signal TC increases, and reliability of the temperature information signal TI output by the temperature information output circuit 26 based on the head temperature signal TC is deteriorated.

To solve the problem, in the liquid ejecting apparatus 1 and the head unit 20 of the present embodiment, the temperature information output circuit 26 controls the acquisition timing for acquiring the head temperature signal TC to reduce the degree of influence of noise on the head temperature signal TC used for generating the temperature information signal TI by the temperature information output circuit 26, so that the risk of deteriorating the reliability of the temperature information signal TI output by the temperature information output circuit 26 is reduced. That is, it is possible to improve the reliability of the temperature information signal TI including the information about the temperature of the print heads 22-1 to 22-12 output by the temperature information output circuit 26.

Specifically, the temperature information output circuit 26 output the temperature information signal TI based on the head temperature signal TC acquired within a period in which the logic levels of the latch signal LAT, print data signal SI, change signal CH, and the inspection timing signal TSIG, which are the control signals Ctrl-H serving as signals for controlling the ejection of the ink from the print head 22, do not change. Accordingly, the risk that noise generated due to the change in the logic levels of the latch signal LAT, print data signal SI, change signal CH, and the inspection timing signal TSIG, which are the control signals Ctrl-H, is superimposed on the head temperature signal TC, which is based on the temperature information signal TI output by the temperature information output circuit 26, is reduced. As a result, the reliability of the temperature information signal TI including the information about the temperature of the print heads 22-1 to 22-12 output by the temperature information output circuit 26, is improved.

Figure 20:
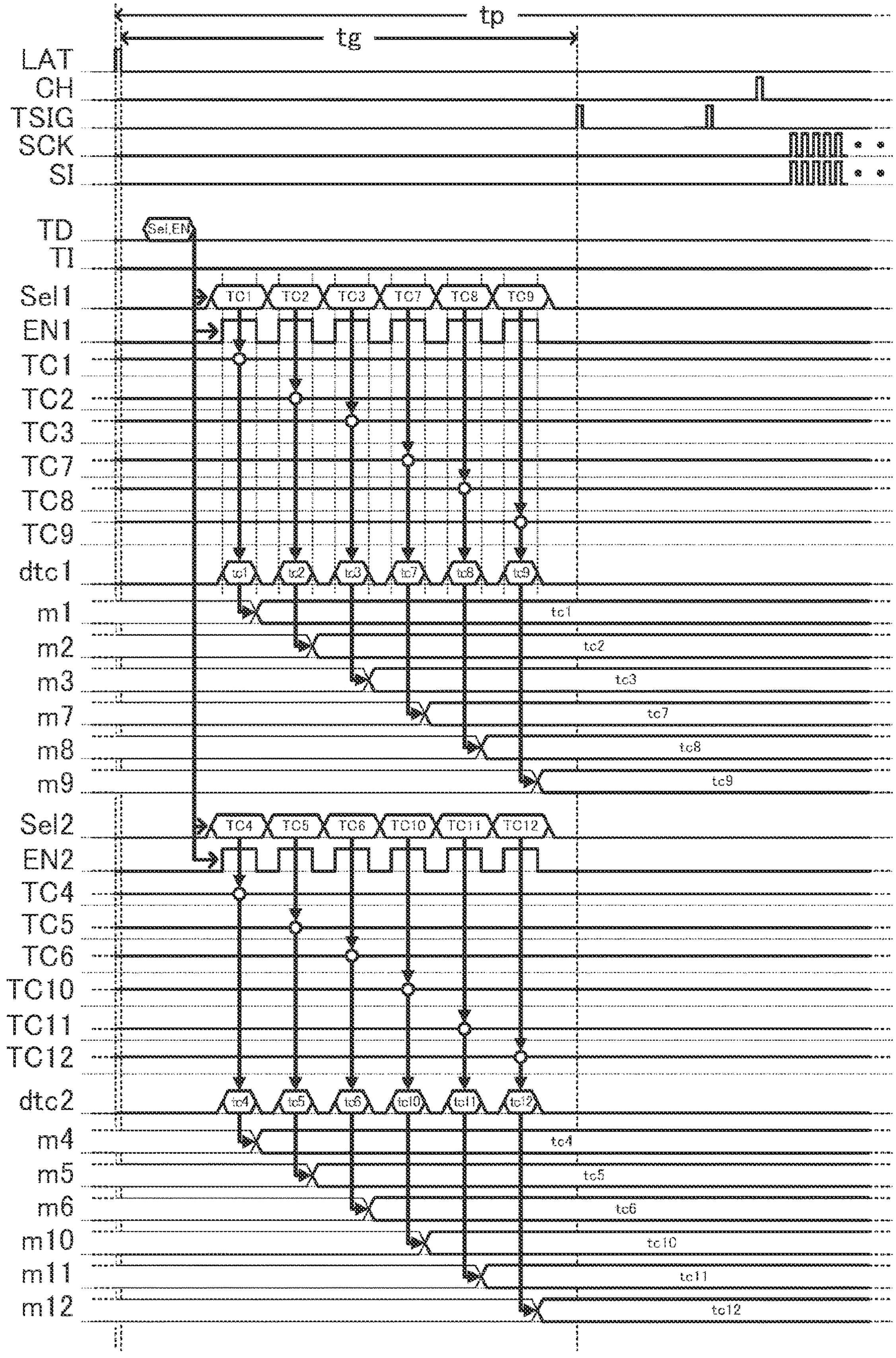
FIG. 20 is a diagram illustrating an example of an acquisition timing when head temperature information is acquired by the temperature information output circuit.

FIG. 20 is a diagram illustrating an example of the acquisition timing when the head temperature information tc1 to tc12 is acquired by the temperature information output circuit 26. FIG. 20 illustrates, in addition to the signals used for the various processing of the temperature information output circuit 26, the latch signal LAT, the print data signal SI, the change signal CH, and the inspection timing signal TSIG, which are the control signal Ctrl-H for controlling the ejection of the ink from the print head 22, and regions m1 to m12 indicating storage regions of the storage circuit 753. The description is made in which the regions m1 to m12 indicating the storage regions of the storage circuit 753 are provided corresponding to the print heads 22-1 to 22-12. Specifically, the description is made in which the region m1 corresponds to the print head 22-1, information corresponding to the print head 22-1 is stored in the region m1, the region mp corresponds to the print head 22-*p*, and information corresponding to the print head 22-*p* is stored in the region mp.

As illustrated in FIG. 20, the temperature information output circuit 26 of the present embodiment acquires the head temperature information tc1 to tc12 of the head temperature signals TC1 to TC12 corresponding to the print heads 22-1 to 22-12, respectively, within an acquisition period tg until any of the print data signal SI, the change signal CH, and the inspection timing signal TSIG rises after the latch signal LAT falls in the print cycle tp. That is, the temperature information output circuit 26 acquires the head temperature information tc1 to tc12 in a period in which the logic levels of the latch signal LAT, the print data signal SI, the change signal CH, and the inspection timing signal TSIG do not change. Then, the temperature information output circuit 26 stores the acquired head temperature information tc1 to tc12 in the storage circuit 753.

Specifically, the control circuit 100 of the control unit 10 sets the logic level of the latch signal LAT to a H level, and then outputs the temperature acquisition request signal TD for controlling outputs of the selector signals Sel1 and Sel2 and the enable signals EN1 and EN2 to the temperature information output circuit 26.

The request analysis section 755 of the control circuit 751 of the temperature information output circuit 26 analyzes the input temperature acquisition request signal TD. Then, the control circuit 751 generates the selector signals Sel1 and Sel2 and the enable signals EN1 and EN2 based on the analysis result of the request analysis section 755, and sequentially outputs the selector signals Sel1 and Sel2 and the enable signals EN1 and EN2.

Specifically, based on the analysis result of the temperature acquisition request signal TD by the request analysis section 755, the control circuit 751 outputs the selector signal Sel1 for selecting the head temperature signal TC1 by the temperature information selection circuit 710*a* and the selector signal Sel2 for selecting the head temperature signal TC4 by the temperature information selection circuit 710*b*. As a result, the temperature information selection circuit 710*a* outputs the head temperature signal TC1 as the selection temperature signal STC1, and the temperature information selection circuit 710*b* outputs the head temperature signal TC4 as the selection temperature signal STC2.

Thereafter, the control circuit 751 outputs the enable signal EN1 for enabling AD conversion in the AD conversion circuit 752*a* and the enable signal EN2 for enabling AD conversion in the AD conversion circuit 752*b* based on the analysis result of the request analysis section 755. Accordingly, the AD conversion circuit 752*a* generates the digital temperature signal dtc1 based on the head temperature information tc1 of the head temperature signal TC1 input to the temperature information output circuit 26 within the period in which the enable signal EN1 is validated, and outputs the digital temperature information dtc1 to the control circuit 751, and the AD conversion circuit 752*b* generates the digital temperature signal dtc2 based on the head temperature information tc4 of the head temperature signal TC4 input to the temperature information output circuit 26 within the period in which the enable signal EN2 is validated, and outputs the digital temperature information dtc2 to the control circuit 751.

The memory control section 757 of the control circuit 751 stores the digital temperature information dtc1 input from the AD conversion circuit 752*a* in the region m1 of the storage circuit 753 as a signal according to the temperature of the print head 22-1, and stores the digital temperature information dtc2 input from the AD conversion circuit 752*b* in the region m4 of the storage circuit 753 as a signal according to the temperature of the print head 22-4.

Thereafter, the control circuit 751 outputs the enable signal EN1 for invalidating the AD conversion of the AD conversion circuit 752*a* and the enable signal EN2 for invalidating the AD conversion of the AD conversion circuit 752*b*. After the AD conversion of the AD conversion circuit 752*a* and the AD conversion circuit 752*b* is invalid, the control circuit 751 outputs the selector signal Sel1 for selecting the head temperature signal TC2 by the temperature information selection circuit 710*a* and the selector signal Sel2 for selecting the head temperature signal TC5 by the temperature information selection circuit 710*b*.

That is, the control circuit 751 validates the enable signal EN1 within a period in which a logic level of the selector signal Sel1 is constant, which is a period in which the selector signal Sel1 for selecting a predetermined head temperature signal TC by the temperature information selection circuit 710*a* is output, and changes the logic level of the selector signal Sel1 for selecting the head temperature signal TC by the temperature information selection circuit 710*a* after the enable signal EN1 is invalid. As a result, the risk that noise generated due to the switching of the logic level of the selector signal Sel1 is superimposed on the digital temperature information dtc1 input from the AD conversion circuit 752*a*, is reduced. Similarly, the control circuit 751 validates the enable signal EN2 within a period in which a logic level of the selector signal Sel2 is constant, which is a period in which the selector signal Sel2 for selecting a predetermined head temperature signal TC by the temperature information selection circuit 710*b* is output, and changes the logic level of the selector signal Sel2 for selecting the head temperature signal TC by the temperature information selection circuit 710*b* after the enable signal EN2 is invalid. As a result, the risk that noise generated due to the switching of the logic level of the selector signal Sel2 is superimposed on the digital temperature information dtc2 input from the AD conversion circuit 752*b*, is reduced.

Thereafter, similarly, the control circuit 751 outputs the enable signal EN1 for validating the AD conversion of the AD conversion circuit 752*a* and the enable signal EN2 for validating the AD conversion of the AD conversion circuit 752*b*. Thus, the AD conversion circuit 752*a* outputs, to the control circuit 751, the digital temperature information dtc1 based on the head temperature information tc2 of the head temperature signal TC2 input to the temperature information output circuit 26, within the period in which the enable signal EN1 is validated, and the AD conversion circuit 752*b* generates the digital temperature information dtc2 based on the head temperature information tc5 of the head temperature signal TC5 input to the temperature information output circuit 26, within the period in which the enable signal EN2 is validated, and outputs the digital temperature information dtc2 to the control circuit 751. The memory control section 757 of the control circuit 751 stores the digital temperature information dtc1 input from the AD conversion circuit 752*a* in the region m2 of the storage circuit 753 as a signal according to the temperature of the print head 22-2, and stores the digital temperature information dtc2 input from the AD conversion circuit 752*b* in the region m5 of the storage circuit 753 as a signal according to the temperature of the print head 22-5.

Thereafter, the control circuit 751 outputs the enable signal EN1 for invalidating the AD conversion of the AD conversion circuit 752*a* and the enable signal EN2 for invalidating the AD conversion of the AD conversion circuit 752*b*. After the AD conversion of the AD conversion circuit 752*a* and the AD conversion circuit 752*b* is invalid, the control circuit 751 outputs the selector signal Sel1 for selecting the head temperature signal TC3 by the temperature information selection circuit 710*a* and the selector signal Sel2 for selecting the head temperature signal TC6 by the temperature information selection circuit 710*b*.

Thereafter, similarly, the control circuit 751 outputs the enable signal EN1 for validating the AD conversion of the AD conversion circuit 752*a* and the enable signal EN2 for validating the AD conversion of the AD conversion circuit 752*b*. Thus, the AD conversion circuit 752*a* outputs, to the control circuit 751, the digital temperature information dtc1 based on the head temperature information tc3 of the head temperature signal TC3 input to the temperature information output circuit 26, within the period in which the enable signal EN1 is validated, and the AD conversion circuit 752*b* generates the digital temperature information dtc2 based on the head temperature information tc6 of the head temperature signal TC6 input to the temperature information output circuit 26, within the period in which the enable signal EN2 is validated, and outputs the digital temperature information dtc2 to the control circuit 751. The memory control section 757 of the control circuit 751 stores the digital temperature information dtc1 input from the AD conversion circuit 752*a* in the region m3 of the storage circuit 753 as a signal according to the temperature of the print head 22-3, and stores the digital temperature information dtc2 input from the AD conversion circuit 752*b* in the region m6 of the storage circuit 753 as a signal according to the temperature of the print head 22-6.

Thereafter, the control circuit 751 outputs the enable signal EN1 for invalidating the AD conversion of the AD conversion circuit 752*a* and the enable signal EN2 for invalidating the AD conversion of the AD conversion circuit 752*b*. After the AD conversion of the AD conversion circuit 752*a* and the AD conversion circuit 752*b* is invalid, the control circuit 751 outputs the selector signal Sel1 for selecting the head temperature signal TC7 by the temperature information selection circuit 710*a* and the selector signal Sel2 for selecting the head temperature signal TC10 by the temperature information selection circuit 710*b*.

Thereafter, similarly, the control circuit 751 outputs the enable signal EN1 for validating the AD conversion of the AD conversion circuit 752*a* and the enable signal EN2 for validating the AD conversion of the AD conversion circuit 752*b*. Thus, the AD conversion circuit 752*a* outputs, to the control circuit 751, the digital temperature information dtc1 based on the head temperature information tc7 of the head temperature signal TC7 input to the temperature information output circuit 26, within the period in which the enable signal EN1 is validated, and the AD conversion circuit 752*b* generates the digital temperature information dtc2 based on the head temperature information tc10 of the head temperature signal TC10 input to the temperature information output circuit 26, within the period in which the enable signal EN2 is validated, and outputs the digital temperature information dtc2 to the control circuit 751. The memory control section 757 of the control circuit 751 stores the digital temperature information dtc1 input from the AD conversion circuit 752*a* in the region m7 of the storage circuit 753 as a signal according to the temperature of the print head 22-7, and stores the digital temperature information dtc2 input from the AD conversion circuit 752*b* in the region m10 of the storage circuit 753 as a signal according to the temperature of the print head 22-10.

Thereafter, the control circuit 751 outputs the enable signal EN1 for invalidating the AD conversion of the AD conversion circuit 752*a* and the enable signal EN2 for invalidating the AD conversion of the AD conversion circuit 752*b*. After the AD conversion of the AD conversion circuit 752*a* and the AD conversion circuit 752*b* is invalid, the control circuit 751 outputs the selector signal Sel1 for selecting the head temperature signal TC8 by the temperature information selection circuit 710*a* and the selector signal Sel2 for selecting the head temperature signal TC11 by the temperature information selection circuit 710*b*.

Thereafter, similarly, the control circuit 751 outputs the enable signal EN1 for validating the AD conversion of the AD conversion circuit 752*a* and the enable signal EN2 for validating the AD conversion of the AD conversion circuit 752*b*. Thus, the AD conversion circuit 752*a* outputs, to the control circuit 751, the digital temperature information dtc1 based on the head temperature information tc8 of the head temperature signal TC8 input to the temperature information output circuit 26, within the period in which the enable signal EN1 is validated, and the AD conversion circuit 752*b* generates the digital temperature information dtc2 based on the head temperature information tc11 of the head temperature signal TC11 input to the temperature information output circuit 26, within the period in which the enable signal EN2 is validated, and outputs the digital temperature information dtc2 to the control circuit 751. The memory control section 757 of the control circuit 751 stores the digital temperature information dtc1 input from the AD conversion circuit 752*a* in the region m8 of the storage circuit 753 as a signal according to the temperature of the print head 22-8, and stores the digital temperature information dtc2 input from the AD conversion circuit 752*b* in the region m11 of the storage circuit 753 as a signal according to the temperature of the print head 22-11.

Thereafter, the control circuit 751 outputs the enable signal EN1 for invalidating the AD conversion of the AD conversion circuit 752*a* and the enable signal EN2 for invalidating the AD conversion of the AD conversion circuit 752*b*. After the AD conversion of the AD conversion circuit 752*a* and the AD conversion circuit 752*b* is invalid, the control circuit 751 outputs the selector signal Sel1 for selecting the head temperature signal TC9 by the temperature information selection circuit 710*a* and the selector signal Sel2 for selecting the head temperature signal TC12 by the temperature information selection circuit 710*b*.

Thereafter, similarly, the control circuit 751 outputs the enable signal EN1 for validating the AD conversion of the AD conversion circuit 752*a* and the enable signal EN2 for validating the AD conversion of the AD conversion circuit 752*b*. Thus, the AD conversion circuit 752*a* outputs, to the control circuit 751, the digital temperature information dtc1 based on the head temperature information tc9 of the head temperature signal TC9 input to the temperature information output circuit 26, within the period in which the enable signal EN1 is validated, and the AD conversion circuit 752*b* generates the digital temperature information dtc2 based on the head temperature information tc12 of the head temperature signal TC12 input to the temperature information output circuit 26, within the period in which the enable signal EN2 is validated, and outputs the digital temperature information dtc2 to the control circuit 751. The memory control section 757 of the control circuit 751 stores the digital temperature information dtc1 input from the AD conversion circuit 752*a* in the region m9 of the storage circuit 753 as a signal according to the temperature of the print head 22-9, and stores the digital temperature information dtc2 input from the AD conversion circuit 752*b* in the region m12 of the storage circuit 753 as a signal according to the temperature of the print head 22-12.

As described above, the temperature information output circuit 26 of the present embodiment acquires the head temperature information tc1 to tc12 of the head temperature signals TC1 to TC12 corresponding to the print heads 22-1 to 22-12, respectively, within an acquisition period tg until any of the print data signal SI, the change signal CH, and the inspection timing signal TSIG rises after the latch signal LAT falls in the print cycle tp. That is, the temperature information output circuit 26 acquires the head temperature information tc1 to tc12 in a period in which the logic levels of the latch signal LAT, the print data signal SI, the change signal CH, and the inspection timing signal TSIG do not change, and stores the information based on the acquired head temperature information tc1 to tc12 in the regions m1 to m12 of the storage circuit 753. As a result, the regions m1 to m12 of the storage circuit 753 stores the head temperature information tc1 to tc12 of the head temperature signals TC1 to TC12, in which the influence of noise caused due to the change in the logic levels of the latch signal LAT, the print data signal SI, the change signal CH, and the inspection timing signal TSIG is reduced.

Thereafter, when the temperature acquisition request signal TD for requesting the acquisition of the temperature of the print head 22-*p* is input to the temperature information output circuit 26, the request analysis section 755 analyzes the temperature acquisition request signal TD, and according to the analysis result, the memory control section 757 generates the memory control signal MA for reading the head temperature information tcp corresponding to the temperature of the print head 22-*p* from the storage circuit 753, and outputs the memory control signal MA to the storage circuit 753. The storage circuit 753 reads digital information based on the head temperature information tcp corresponding to the temperature of the print head 22-*p* stored in the region mp according to the input memory control signal MA, and outputs the digital information to the memory control section 757 as the memory read signal MR. Then, the temperature information output section 756 calculates the temperature of the print head 22-*p* from the digital information based on the head temperature information tcp corresponding to the temperature of the print head 22-*p* of the memory read signal MR, which is acquired by the memory control section 757, and outputs the temperature of the print head 22-*p* from the temperature information output circuit 26 as the temperature information signal TI.

As described above, in the liquid ejecting apparatus 1 and the head unit 20 of the present embodiment, the temperature information output circuit 26 of the head unit 20 acquires the head temperature information tc of the head temperature signal TC corresponding to the print heads 22-1 to 22-12, respectively, within the period in which the logic levels of the latch signal LAT, the print data signal SI, the change signal CH, and the inspection timing signal TSIG, which are the control signals Ctrl-H serving as a signal for controlling the ejection of the ink from the print head 22, do not change, and stores the digital signal corresponding to the acquired head temperature information tc in the storage circuit 753. Thereafter, the temperature information output circuit 26 analyzes the temperature acquisition request signal TD, acquires the digital signal corresponding to the temperature of the print head 22 corresponding to the analysis result from the corresponding storage region of the storage circuit 753, and calculates the temperature according to the acquired digital signal. Assuming that the calculated temperature is the temperature of the print head 22 according to the temperature acquisition request signal TD, the temperature information output circuit 26 generates the temperature information signal TI including the corresponding temperature and outputs the temperature information signal TI from the temperature information output circuit 26.

Accordingly, the risk that noise generated due to the change in the logic levels of the latch signal LAT, print data signal SI, change signal CH, and the inspection timing signal TSIG, which are the control signals Ctrl-H, is superimposed on the digital signal according to the head temperature information tc of the head temperature signal TC stored in the storage circuit 753, which is the head temperature signal TC based on the temperature information signal TI output by the temperature information output circuit 26, is reduced. As a result, the reliability of the temperature information signal TI including the information about the temperature of the print heads 22-1 to 22-12 output by the temperature information output circuit 26, is improved.

Moreover, as described above, the control circuit 751 validates the enable signal EN1 within a period in which a logic level of the selector signal Sel1 is constant, which is a period in which the selector signal Sel1 for selecting a predetermined head temperature signal TC by the temperature information selection circuit 710*a* is output, and changes the logic level of the selector signal Sel1 for selecting the head temperature signal TC by the temperature information selection circuit 710*a* after the enable signal EN1 is invalid. As a result, the risk that noise generated due to the switching of the logic level of the selector signal Sel1 is superimposed on the digital temperature information dtc1 input from the AD conversion circuit 752*a*, is reduced. Similarly, the control circuit 751 validates the enable signal EN2 within a period in which a logic level of the selector signal Sel2 is constant, which is a period in which the selector signal Sel2 for selecting a predetermined head temperature signal TC by the temperature information selection circuit 710*b* is output, and changes the logic level of the selector signal Sel2 for selecting the head temperature signal TC by the temperature information selection circuit 710*b* after the enable signal EN2 is invalid.

As a result, the risk that noise generated due to the switching of the logic level of the selector signal Sel2 is superimposed on the digital temperature information dtc2 input from the AD conversion circuit 752*b*, is reduced. Accordingly, the risk that noise is superimposed on the digital signal according to the head temperature information tc of the head temperature signal TC stored in the storage circuit 753 is further reduced. As a result, the reliability of the temperature information signal TI including the information about the temperature of the print heads 22-1 to 22-12 output by the temperature information output circuit 26 is further improved.

In the temperature information output circuit 26 configured as described above, at least a part of the temperature information selection circuit 710*a* is mounted on the head substrate 520 as the above-described integrated circuit 553*a*, at least a part of the temperature information selection circuit 710*b* is mounted on the head substrate 520 as the above-described integrated circuit 553*b*, at least a part of the amplification circuit 720*a* is mounted on the head substrate 520 as the above-described integrated circuit 555*a*, at least a part of the amplification circuit 720*b* is mounted on the head substrate 520 as the above-described integrated circuit 555*b*, and at least a part of the output control circuit 750 is mounted on the head substrate 520 as the above-described integrated circuit 551. That is, the temperature information output circuit 26 is provided on the head substrate 520.

As illustrated in FIG. 9, the integrated circuit 553*a* constituting at least a part of the temperature information selection circuit 710*a* is located closer to the side 523 than the side 524 between the connector 550 located along the side 523 and the electrode groups 532-1 to 532-12 and the FPC insertion holes 531-1 to 531-12 in the head substrate 520, and the print heads 22-1 to 22-3 and 22-7 to 22-9 for outputting the head temperature signals TC1 to TC3 and TC7 to TC9 input to the temperature information selection circuit 710*a* is located closer to the side 523 than the side 524 of the head substrate 520. In addition, the integrated circuit 553*b* constituting at least a part of the temperature information selection circuit 710*b* is located closer to the side 524 than the side 523 between the connector 550 located along the side 524 and the electrode groups 532-1 to 532-12 and the FPC insertion holes 531-1 to 531-12 in the head substrate 520, and the print heads 22-4 to 22-6 and 22-10 and 22-11 for outputting the head temperature signals TC4 to TC6 and TC10 and TC11 input to the temperature information selection circuit 710*b* is located closer to the side 524 than the side 523 of the head substrate 520. That is, the temperature information selection circuit 710*a* is located close to the print heads 22-1 to 22-3 and 22-7 to 22-9 for outputting the head temperature signals TC1 to TC3 and TC7 to TC9 to the temperature information selection circuit 710*a*, and the temperature information selection circuit 710*b* is located close to the print heads 22-4 to 22-6 and 22-10 and 22-12 for outputting the head temperature signals TC4 to TC6 and TC10 and TC12 to the temperature information selection circuit 710*b*.

The head temperature signals TC1 to TC12 output by the print heads 22-1 to 22-12 are analog signals having the voltage values that change depending on the temperature, which are signals that uses a characteristic that the resistance value of the resistance wiring 401 changes depending on the temperature. The voltage values of the head temperature signals TC1 to TC12 are small, and thus the amount of change of the voltage values of the head temperature signals TC1 to TC12 are further reduced. Therefore, the head temperature signals TC1 to TC12 are easily affected by noise, and when the noise is superimposed on the head temperature signals TC1 to TC12, the detection accuracy of the temperature of the print heads 22-1 to 22-12 may be deteriorated.

In the liquid ejecting apparatus 1 of the present embodiment, the print heads 22-1 to 22-3 and 22-7 to 22-9 are located near the temperature information selection circuit 710*a*, and the print heads 22-4 to 22-6 and 22-10 to 22-12 are located near the temperature information selection circuit 710*b*, so that it is possible to reduce the wiring length of the wirings Wtc-1 to Wtc-12 through which the head temperature signals TC1 to TC12 propagate to the temperature information selection circuits 710*a* and 710*b*. Accordingly, the risk that noise is superimposed on the head temperature signals TC1 to TC12 propagating through the wirings Wtc-1 to Wtc-12 is reduced, and the signal accuracy of the head temperature signals TC1 to TC12 input to the temperature information selection circuits 710*a* and 710*b* is improved. As a result, the detection accuracy of the temperature of the print heads 22-1 to 22-12 is improved.

Moreover, the integrated circuit 555*a* constituting at least a part of the amplification circuit 720*a* is located closer to the side 523 than the side 524 between the connector 550 located along the side 523 and the electrode groups 532-1 to 532-12 and the FPC insertion holes 531-1 to 531-12 in the head substrate 520, and the integrated circuit 555*b* constituting at least a part of the amplification circuit 720*b* is located closer to the side 524 than the side 523 between the connector 550 located along the side 524 and the electrode groups 532-1 to 532-12 and the FPC insertion holes 531-1 to 531-12 in the head substrate 520. That is, the amplification circuit 720*a* is located near the temperature information selection circuit 710*a* for outputting the selection temperature signal STC1 to the amplification circuit 720*a*, and the amplification circuit 720*b* is located near the temperature information selection circuit 710*b* for outputting the selection temperature signal STC2 to the amplification circuit 720*b*.

The selection temperature signals STC1 and STC2 output by the temperature information selection circuits 710*a* and 710*b* are signals for selecting any of the head temperature signals TC1 to TC12, and thus, the selection temperature signals STC1 and STC2 are also easily affected by noise similar to the head temperature signals TC1 to TC12.

In the liquid ejecting apparatus 1 of the present embodiment, the temperature information selection circuit 710*a* is located near the amplification circuit 720*a*, and the temperature information selection circuit 710*b* is located near the amplification circuit 720*b*, so that it is possible to reduce the wiring length of the wiring pattern for propagating the selection temperature signals STC1 and STC2. Accordingly, the risk that noise is superimposed on the selection temperature signals STC1 and STC2 is reduced, and as a result, the detection accuracy of the temperature of the print heads 22-1 to 22-12 is improved.

Furthermore, it is preferable that in the head substrate 520, at least a part of any of wiring Wlat through which the latch signal LAT propagates, wiring Wch through which the change signal CH propagates, wirings Wsi-1 to Wsi-12 through which the print data signals SI1 to SI12 propagate, wiring Wsck through which the clock signal SCK propagates, and wiring Wtsig through which the inspection timing signal TSIG propagates is located adjacent to at least a part of any f wirings Wtc-1 to Wtc-12 through which the head temperature signals TC1 to TC12 propagate, the wirings serving as the wiring patterns for propagating the control signal Ctrl-H.

As described above, the temperature information output circuit 26 acquires the head temperature signals TC1 to TC12 input within the period in which the logic levels of the latch signal LAT, the change signal CH, the print data signals SI1 to SI12, the clock signal SCK, and the inspection timing signal TSIG, which are control signals Ctrl-H, are constant. In other words, the logic levels of the latch signal LAT, the change signal CH, the print data signals SI1 to SI12, the clock signal SCK, and the inspection timing signal TSIG are not converted within the period in which the temperature information output circuit 26 acquires the head temperature signals TC1 to TC12. Within such a period in which the temperature information output circuit 26 acquires the head temperature signals TC1 to TC12, the wiring pattern for propagating any of the latch signal LAT, the change signal CH, the print data signals SI1 to SI12, the clock signal SCK, and the inspection timing signal TSIG, which have the constant logic level, is located adjacent to the wiring pattern for propagating the head temperature signals TC1 to TC12, so that the wiring pattern for propagating any of the latch signal LAT, the change signal CH, the print data signals SI1 to SI12, the clock signal SCK, and the inspection timing signal TSIG functions as shield wiring of the wiring pattern for propagating the head temperature signals TC1 to TC12. As a result, the risk that noise is superimposed on the head temperature signals TC1 to TC12 acquired by the temperature information output circuit 26 is further reduced.

On the other hand, it is preferable that in the head substrate 520, the wiring pattern for propagating a ground potential is located between the wirings Wo-1 to Wo-12 through which the residual vibration signal Vout propagates and the wiring Wo according to the ejection state of the ink from the print head 22, and the wirings Wtc-1 to Wtc-12 through which the head temperature signals TC1 to TC12 propagate. Similar to the head temperature signals TC1 to TC12, the residual vibration signal Vout is also a signal having a small voltage value, and such a residual vibration signal Vout having the small voltage value is preferably shielded in the wiring pattern for propagating the ground potential, and accordingly, the signal quality of the residual vibration signal Vout can be enhanced.

In this case, the drive signal COM is an example of a drive signal, and in consideration of the fact that the drive signal Vin is generated by selecting or not selecting the drive waveforms Adp1, Adp2 of the drive signal ComA in the drive signal COM and the drive waveforms Bdp1, Bdp2, Bdp3 of the drive signal ComB in the drive signal COM, the drive signal Vin is also an example of a drive signal. The drive waveform Adp1 of the drive signal ComA in the drive signal COM is an example of a first drive waveform, and the drive waveform Adp2 of the drive signal ComA in the drive signal COM is an example of a second drive waveform.

Further, the control signal Ctrl-H, which controls the ejection and includes the latch signal LAT, the change signal CH, the print data signal SI, and the clock signal SCK, is an example of a logic signal, any of the wiring Wlat through which the latch signal LAT propagates, wiring Wch through which the change signal CH propagates, the wirings Wsi-1 to Wsi-12 through which the print data signals SI1 to SI12 propagate, and the wiring Wsck through which the clock signal SCK propagates is an example of wiring through which the logic signal propagates, any of the wirings Wtc-1 to Wtc-12 through which the head temperature signals TC1 to TC12 propagate is an example of wiring through which the head temperature signal propagates, and any of the wirings Wo-1 to Wo-12 through which the residual vibration signal Vout propagates, and the wiring Wo is an example of wiring through which the residual vibration signal propagates.

Further, the electrode 360 of the piezoelectric element 60 is an example of a first electrode, the electrode 380 of the piezoelectric element 60 is an example of a second electrode, the temperature detection circuit 24, and more specifically, the resistance wiring 401 of the temperature detection circuit 24 is an example of a temperature detection section, and The direction along the Z axis is an example of a stacking direction.

3. Operational Effect

As described above, in the liquid ejecting apparatus 1 and the head unit 20 of the present embodiment, the print head 22 includes the resistance wiring 401 which is located on the other side of the vibration plate 350 in the direction along the Z axis, detects the head temperature information tc corresponding to the temperature of the pressure chamber 312, and outputs the head temperature information tc as the head temperature signal TC. That is, the temperature detection circuit 24 that detects the temperature of the pressure chamber 312 is located near the pressure chamber 312. Accordingly, the detection accuracy of the temperature of the pressure chamber 312, which is detected by the resistance wiring 401, is improved. As a result, the control unit 10 can perform ejection control of the ink from the print head 22 suitable for the temperature of the ink in the pressure chamber 312.

In this case, in the liquid ejecting apparatus 1 and the head unit 20 of the present embodiment, at least a part of the resistance wiring 401 is stacked on the vibration plate 350. Accordingly, the resistance wiring 401 can be disposed closer to the pressure chamber 312 than the resistance wiring 401, and as a result, the detection accuracy of the temperature of the pressure chamber 312 in the resistance wiring 401 is further improved.

Moreover, in the liquid ejecting apparatus 1 and the head unit 20 of the present embodiment, the temperature information output circuit 26 outputs the temperature information signal TI based on the head temperature signal TC, which is acquired within the period in which the logic levels of the latch signal LAT, the print data signal SI, the change signal CH, and the inspection timing signal TSIG, which are the control signals Ctrl-H for controlling the ejection of the ink from the print head 22, do not change, so that the risk that noise generated due to the change in the logic levels of the latch signal LAT, the print data signal SI, the change signal CH, and the inspection timing signal TSIG, which are the control signals Ctrl-H, is superimposed on the temperature information signal TI output by the temperature information output circuit 26, is reduced. As a result, the reliability of the temperature information signal TI including the information about the temperature of the print heads 22-1 to 22-12 output by the temperature information output circuit 26, is improved.

In this case, the temperature information output circuit 26 outputs the temperature information signal TI based on the head temperature signal TC, which is acquired within the period in which the logic levels of the latch signal LAT, the print data signal SI, the change signal CH, and the inspection timing signal TSIG, which are the control signals Ctrl-H for controlling the ejection of the ink from the print head 22, do not change, so that the risk that noise generated due to the change in the logic levels of the latch signal LAT, the print data signal SI, the change signal CH, and the inspection timing signal TSIG, which are the control signals Ctrl-H, is superimposed on the temperature information signal TI output by the temperature information output circuit 26, is reduced. Therefore, the risk that the size of the head unit 20 including the head substrate 520 and the head substrate 520 is increased without the need of adding the shield wiring for the purpose of protecting the head temperature signal TC from noise, is reduced.

That is, without increasing the size of the liquid ejecting apparatus 1 and the head unit 20, it is possible to reduce the risk that noise generated due to the change in the logic levels of the latch signal LAT, print data signal SI, change signal CH, and the inspection timing signal TSIG, which are the control signals Ctrl-H, is superimposed on the temperature information signal TI output by the temperature information output circuit 26.

4. Modification Example

In the liquid ejecting apparatus 1 and the head unit 20 of the present embodiment described above, the description is made in which the acquisition timing of the head temperature signal TC in the temperature information output circuit 26 is controlled based on the temperature acquisition request signal TD. However, for example, at least one of the latch signal LAT, the change signal CH, the print data signal SI, the clock signal SCK, and the inspection timing signal TSIG is input to the temperature information output circuit 26, and the temperature information output circuit 26 may determine a period in which the logic levels of the latch signal LAT, the change signal CH, the print data signal SI, the clock signal SCK, and the inspection timing signal TSIG are constant, based on the logic levels of the input latch signal LAT, print data signal SI, change signal CH, and inspection timing signal TSIG, and may acquire the head temperature signal TC in the temperature information output circuit 26.

Moreover, in the above-described embodiment, the description is made in which the temperature information output circuit 26 acquires all of the head temperature signals TC1 to TC12 within the acquisition period tg that is continuously provided in the print cycle tp, but the temperature information output circuit 26 may acquire the head temperature signals TC1 to TC12 by dividing the print cycle over a plurality of print cycles tp.

The embodiment has been described above, but the present disclosure is not limited to the embodiments and the modification examples, and can be implemented in various aspects without departing from the gist thereof. For example, the above-described embodiment can be combined as appropriate.

The present disclosure includes substantially the same configurations (for example, configurations having the same functions, methods, and results, or configurations having the same objects and effects) as the configurations described in the embodiment. Further, the present disclosure includes configurations in which non-essential parts of the configuration described in the embodiment are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiment.

The following contents are derived from the above-described embodiment.

An aspect of a head unit is a head unit that ejects a liquid by receiving a drive signal corrected based on a temperature information signal, the head unit including: a print head that ejects the liquid by receiving a logic signal and the drive signal; and a temperature information output circuit that outputs the temperature information signal indicating a temperature of the print head, in which the print head includes: a piezoelectric element including a first electrode, a second electrode, and a piezoelectric body, having the piezoelectric body that is located between the first electrode and the second electrode in a stacking direction in which the first electrode, the second electrode, and the piezoelectric body are stacked, and driven by receiving the drive signal; a vibration plate located on one side of the piezoelectric element in the stacking direction and deformed due to drive of the piezoelectric element; a pressure chamber substrate located on one side of the vibration plate in the stacking direction and provided with a pressure chamber having a volume that changes due to deformation of the vibration plate; a nozzle for ejecting the liquid according to change in the volume of the pressure chamber; and a temperature detection section located on another side of the vibration plate in the stacking direction to detect head temperature information corresponding to a temperature of the pressure chamber and output the head temperature information as a head temperature signal, the logic signal is a signal for controlling ejection of the liquid from the print head, and the temperature information output circuit outputs the temperature information signal based on the head temperature signal acquired during a period when a logic level of the logic signal does not change.

According to the head unit, the temperature information output circuit outputs the temperature information signal based on the head temperature signal, which is acquired in the period in which the logic level of the logic signal for controlling the ejection of the liquid from the print head does not change, so that the risk that noise occurs in the head temperature signal, which is acquired by the temperature information output circuit, due to the change in logic level of the logic signal, is reduced. That is, the acquisition accuracy of the temperature of the print head in the temperature information output circuit is improved.

In the aspect of the head unit, the logic signal may be a signal that defines an ejection cycle of the liquid from the print head.

In the aspect of the head unit, the drive signal may include a first drive waveform and a second drive waveform, and the logic signal may be a signal that defines a switching timing between the first drive waveform and the second drive waveform, which are supplied to the print head.

In the aspect of the head unit, the logic signal may be a signal that defines waveform selection of the drive waveform of the drive signal supplied to the print head.

In the aspect of the head unit, at least a part of the temperature detection section may be stacked on the vibration plate.

According to the head unit, since the temperature detection section is provided near the pressure chamber, the acquisition accuracy of the temperature of the ink stored in the pressure chamber, which is the temperature of the pressure chamber detected by the temperature detection section, is improved.

The aspect of the head unit may further include a head substrate to which the print head is coupled, in which the temperature information output circuit may be provided on the head substrate, and in the head substrate, at least a part of wiring through which the logic signal propagates may be located adjacent to at least a part of wiring through which the head temperature signal propagates.

According to the head unit, the temperature information output circuit outputs the temperature information signal based on the head temperature signal, which is acquired in the period in which the logic level of the logic signal for controlling the ejection of the liquid from the print head does not change, and therefore, the logic signal functions as a shield wiring when the temperature information output circuit acquires the head temperature signal. As a result, the risk that noise is superimposed on the head temperature signal is further reduced. As a result, the acquisition accuracy of the temperature of the print head in the temperature information output circuit is further improved.

In the aspect of the head unit, the head substrate may include wiring through which a residual vibration signal according to the ejection state of the liquid from the print head propagates, and in the head substrate, wiring through which a ground signal propagates may be located between the wiring through which the head temperature signal propagates and the wiring through which the residual vibration signal propagates.

According to the head unit, the risk of superimposing the head temperature signal on the residual vibration signal is reduced. As a result, the accuracy of the residual vibration signal is improved, and the ejection state of the liquid from the print head can be acquired in more detail.

An aspect of a liquid ejecting apparatus includes a drive signal output circuit that outputs a drive signal corrected based on a temperature information signal; and a head unit that ejects a liquid by receiving the drive signal, in which the head unit includes: a print head that ejects the liquid by receiving a logic signal and the drive signal; and a temperature information output circuit that outputs the temperature information signal indicating a temperature of the print head, the print head includes: a piezoelectric element including a first electrode, a second electrode, and a piezoelectric body, having the piezoelectric body that is located between the first electrode and the second electrode in a stacking direction in which the first electrode, the second electrode, and the piezoelectric body are stacked, and driven by receiving the drive signal; a vibration plate located on one side of the piezoelectric element in the stacking direction and deformed due to drive of the piezoelectric element; a pressure chamber substrate located on one side of the vibration plate in the stacking direction and provided with a pressure chamber having a volume that changes due to deformation of the vibration plate; a nozzle for ejecting the liquid according to change in the volume of the pressure chamber; and a temperature detection section located on another side of the vibration plate in the stacking direction to detect head temperature information corresponding to a temperature of the pressure chamber and output the head temperature information as a head temperature signal, the logic signal is a signal for controlling ejection of the liquid from the print head, and the temperature information output circuit outputs the temperature information signal based on the head temperature signal acquired during a period when a logic level of the logic signal does not change.

According to the liquid ejecting apparatus, the temperature information output circuit of the head unit outputs the temperature information signal based on the head temperature signal, which is acquired in the period in which the logic level of the logic signal for controlling the ejection of the liquid from the print head does not change, so that the risk that noise occurs in the head temperature signal, which is acquired by the temperature information output circuit, due to the change in logic level of the logic signal, is reduced. That is, the acquisition accuracy of the temperature of the print head in the temperature information output circuit is improved.

In the aspect of the liquid ejecting apparatus, the logic signal may be a signal that defines an ejection cycle of the liquid from the print head.

In the aspect of the liquid ejecting apparatus, the drive signal may include a first drive waveform and a second drive waveform, and the logic signal may be a signal that defines a switching timing between the first drive waveform and the second drive waveform, which are supplied to the print head.

In the aspect of the liquid ejecting apparatus, the logic signal may be a signal that defines waveform selection of the drive waveform of the drive signal supplied to the print head.

In the aspect of the liquid ejecting apparatus, at least a part of the temperature detection section may be stacked on the vibration plate.

According to the liquid ejecting apparatus, since the temperature detection section of the print head is provided near the pressure chamber, the acquisition accuracy of the temperature of the ink stored in the pressure chamber, which is the temperature of the pressure chamber detected by the temperature detection section, is improved.

In the aspect of the liquid ejecting apparatus, the head unit may include a head substrate to which the print head is coupled, and the temperature information output circuit may be provided on the head substrate, and in the head substrate, at least a part of wiring through which the logic signal propagates may be located adjacent to at least a part of wiring through which the head temperature signal propagates.

According to the liquid ejecting apparatus, the temperature information output circuit of the head unit outputs the temperature information signal based on the head temperature signal, which is acquired in the period in which the logic level of the logic signal for controlling the ejection of the liquid from the print head does not change, and therefore, the logic signal functions as a shield wiring when the temperature information output circuit acquires the head temperature signal. As a result, the risk that noise is superimposed on the head temperature signal is further reduced. As a result, the acquisition accuracy of the temperature of the print head in the temperature information output circuit is further improved.

In the aspect of the liquid ejecting apparatus, the head substrate may include wiring through which a residual vibration signal according to the ejection state of the liquid from the print head propagates, and in the head substrate, wiring through which a ground signal propagates may be located between the wiring through which the head temperature signal propagates and the wiring through which the residual vibration signal propagates.

According to the liquid ejecting apparatus, the risk of superimposing the head temperature signal on the residual vibration signal is reduced. As a result, the accuracy of the residual vibration signal is improved, and the ejection state of the liquid from the print head can be acquired in more detail.

What is claimed is:

1. A head unit that ejects a liquid by receiving a drive signal corrected based on a temperature information signal, the head unit comprising:

a print head that ejects the liquid by receiving a logic signal and the drive signal;

a temperature information output circuit that outputs the temperature information signal indicating a temperature of the print head; and a head substrate coupled to the print head, wherein the print head includes:

a piezoelectric element including a first electrode, a second electrode, and a piezoelectric body, having the piezoelectric body that is located between the first electrode and the second electrode in a stacking direction in which the first electrode, the second electrode, and the piezoelectric body are stacked, and driven by receiving the drive signal;

a vibration plate located on one side of the piezoelectric element in the stacking direction and deformed due to drive of the piezoelectric element;

a pressure chamber substrate located on one side of the vibration plate in the stacking direction and provided with a pressure chamber having a volume that changes due to deformation of the vibration plate;

a nozzle for ejecting the liquid according to change in the volume of the pressure chamber; and a temperature detection section located on another side of the vibration plate in the stacking direction to detect head temperature information corresponding to a temperature of the pressure chamber and output the head temperature information as a head temperature signal, the logic signal is a signal for controlling ejection of the liquid from the print head, the temperature information output circuit outputs the temperature information signal based on the head temperature signal acquired during a period when a logic level of the logic signal does not change, the temperature information output circuit is provided on the head substrate, the head substrate includes wiring through which a residual vibration signal according to an ejection state of the liquid from the print head propagates, and in the head substrate, at least a part of wiring through which the logic signal propagates is located adjacent to at least a part of wiring through which the head temperature signal propagates, and wiring through which a ground signal propagates is located between the wiring through which the head temperature signal propagates and the wiring through which the residual vibration signal propagates.

2. The head unit according to claim 1, wherein the logic signal is a signal that defines an ejection cycle of the liquid from the print head.

3. The head unit according to claim 1, wherein the drive signal includes a first drive waveform and a second drive waveform, and the logic signal is a signal that defines a switching timing between the first drive waveform and the second drive waveform, which are supplied to the print head.

4. The head unit according to claim 1, wherein the logic signal is a signal that defines waveform selection of a drive waveform of the drive signal supplied to the print head.

5. The head unit according to claim 1, wherein the piezoelectric body continuously extends from a center position at which the piezoelectric body covers the pressure chamber to an outer position located outward beyond an inner wall of the pressure chamber substrate that defines the pressure chamber, the temperature detection section is embedded in the piezoelectric body at a location between a position corresponding to the inner wall of the pressure chamber substrate and the outer position, and at least a part of the temperature detection section is stacked on the vibration plate.

6. A liquid ejecting apparatus comprising:

a drive signal output circuit that outputs a drive signal corrected based on a temperature information signal; and a head unit that ejects a liquid by receiving the drive signal, wherein the head unit includes:

a print head that ejects the liquid by receiving a logic signal and the drive signal;

a temperature information output circuit that outputs the temperature information signal indicating a temperature of the print head; and a head substrate coupled to the print head, the print head includes:

a piezoelectric element including a first electrode, a second electrode, and a piezoelectric body, having the piezoelectric body that is located between the first electrode and the second electrode in a stacking direction in which the first electrode, the second electrode, and the piezoelectric body are stacked, and driven by receiving the drive signal;

a vibration plate located on one side of the piezoelectric element in the stacking direction and deformed due to drive of the piezoelectric element;

a pressure chamber substrate located on one side of the vibration plate in the stacking direction and provided with a pressure chamber having a volume that changes due to deformation of the vibration plate;

a nozzle for ejecting the liquid according to change in the volume of the pressure chamber; and a temperature detection section located on another side of the vibration plate in the stacking direction to detect head temperature information corresponding to a temperature of the pressure chamber and output the head temperature information as a head temperature signal, the logic signal is a signal for controlling ejection of the liquid from the print head, the temperature information output circuit outputs the temperature information signal based on the head temperature signal acquired during a period when a logic level of the logic signal does not change, the temperature information output circuit is provided on the head substrate, the head substrate includes wiring through which a residual vibration signal according to an ejection state of the liquid from the print head propagates, and in the head substrate, at least a part of wiring through which the logic signal propagates is located adjacent to at least a part of wiring through which the head temperature signal propagates, and wiring through which a ground signal propagates is located between the wiring through which the head temperature signal propagates and the wiring through which the residual vibration signal propagates.

7. The liquid ejecting apparatus according to claim 6, wherein the logic signal is a signal that defines an ejection cycle of the liquid from the print head.

8. The liquid ejecting apparatus according to claim 6, wherein the drive signal includes a first drive waveform and a second drive waveform, and the logic signal is a signal that defines a switching timing between the first drive waveform and the second drive waveform, which are supplied to the print head.

9. The liquid ejecting apparatus according to claim 6, wherein the logic signal is a signal that defines waveform selection of a drive waveform of the drive signal supplied to the print head.

10. The liquid ejecting apparatus according to claim 6, wherein the piezoelectric body continuously extends from a center position at which the piezoelectric body covers the pressure chamber to an outer position located outward beyond an inner wall of the pressure chamber substrate that defines the pressure chamber, the temperature detection section is embedded in the piezoelectric body at a location between a position corresponding to the inner wall of the pressure chamber substrate and the outer position, and at least a part of the temperature detection section is stacked on the vibration plate.

* * * * *